US012056342B2

(12) United States Patent
Morag

(10) Patent No.: US 12,056,342 B2
(45) Date of Patent: *Aug. 6, 2024

(54) DEVICE, METHOD, AND GRAPHICAL USER INTERFACE FOR PRESENTING REPRESENTATIONS OF MEDIA CONTAINERS

(71) Applicant: Apple Inc., Cupertino, CA (US)

(72) Inventor: Ofer Morag, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,459

(22) Filed: Dec. 22, 2021

(65) Prior Publication Data

US 2022/0113861 A1  Apr. 14, 2022

Related U.S. Application Data

(63) Continuation of application No. 15/978,119, filed on May 12, 2018, now Pat. No. 11,237,711.
(Continued)

(51) Int. Cl.
*G06F 3/04847* (2022.01)
*G06F 3/0485* (2022.01)
(Continued)

(52) U.S. Cl.
CPC ........ *G06F 3/04847* (2013.01); *G06F 3/0485* (2013.01); *G06F 16/637* (2019.01);
(Continued)

(58) Field of Classification Search
CPC ............... G06F 3/04847; G06F 16/637; G06F 16/9535; G06F 16/9536; G06F 16/639; G06F 3/0485; G06F 21/604
See application file for complete search history.

(56) References Cited

U.S. PATENT DOCUMENTS 8,826,646 B2   9/2014  Waletzek et al.
2006/0143236 A1*  6/2006  Wu ..................... G06F 16/4387
(Continued)

FOREIGN PATENT DOCUMENTS

CN    102224500 A   10/2011
CN    104113787 A   10/2014
(Continued)

OTHER PUBLICATIONS

International Preliminary Report on Patentability for PCT/US2018/023513 mailed Dec. 3, 2019.
(Continued)

*Primary Examiner* — James T Tsai
(74) *Attorney, Agent, or Firm* — Fernando & Partners, LLP

(57) ABSTRACT

A device receives a request to enroll in music sharing. After receiving the request, the device displays an enrollment user interface that includes concurrently displaying representations of a plurality of playlists created by a first user and privacy settings for the plurality of playlists. The privacy settings have default values. The enrollment user interface includes a first affordance that corresponds to a first playlist of the plurality of playlists, and a second affordance that corresponds to a second playlist of the plurality of playlists. The device receives one or more user inputs changing the privacy settings from corresponding default privacy settings to user-specified privacy settings. After completing enrollment, the device provides access to the plurality of playlists of the first user to other users with a predetermined relationship to the first user based on the privacy settings for the plurality of playlists.

25 Claims, 67 Drawing Sheets

Related U.S. Application Data

(60) Provisional application No. 62/514,608, filed on Jun. 2, 2017.

(51) Int. Cl.
    *G06F 16/635*     (2019.01)
    *G06F 16/638*     (2019.01)
    *G06F 16/9535*    (2019.01)
    *G06F 16/9536*    (2019.01)
    *G06F 21/60*      (2013.01)

(52) U.S. Cl.
    CPC ........ *G06F 16/639* (2019.01); *G06F 16/9535* (2019.01); *G06F 16/9536* (2019.01); *G06F 21/604* (2013.01)

(56) References Cited

U.S. PATENT DOCUMENTS

| | | |
|---|---|---|
| 2006/0170945 A1 | 8/2006 | Bill |
| 2006/0239131 A1 | 10/2006 | Nathan et al. |
| 2008/0212944 A1 | 9/2008 | Khedouri et al. |
| 2009/0276855 A1* | 11/2009 | Anderson ............. H04W 12/08 709/201 |
| 2010/0031366 A1 | 2/2010 | Knight et al. |
| 2012/0096526 A1 | 4/2012 | Brahmanapalli et al. |
| 2012/0215684 A1 | 8/2012 | Kidron |
| 2012/0215816 A1* | 8/2012 | Kidron ................. G06F 16/637 707/E17.032 |
| 2012/0233120 A1 | 9/2012 | Nijim et al. |
| 2013/0198633 A1* | 8/2013 | Hyman ..................... G06F 3/01 715/716 |
| 2014/0114966 A1 | 4/2014 | Bilinski et al. |
| 2014/0123006 A1* | 5/2014 | Chen ................ H04N 21/26258 715/716 |
| 2014/0279034 A1 | 9/2014 | Samuel |
| 2015/0205971 A1 | 7/2015 | Sanio et al. |
| 2016/0048589 A1 | 2/2016 | Modi |
| 2016/0275588 A1 | 9/2016 | Ye et al. |
| 2017/0075468 A1* | 3/2017 | Dziuk ................... H04L 65/764 |
| 2018/0192142 A1 | 7/2018 | Paul |
| 2018/0225081 A1* | 8/2018 | Dange ................... G06F 16/639 |
| 2019/0297048 A1 | 9/2019 | Yao et al. |
| 2019/0341037 A1* | 11/2019 | Bromand ................ G06F 3/167 |

FOREIGN PATENT DOCUMENTS

| | | |
|---|---|---|
| CN | 104660496 A | 5/2015 |
| WO | 2012050927 A2 | 4/2012 |
| WO | 2017027204 A1 | 2/2017 |

OTHER PUBLICATIONS

Communication Pursuant to Rule 164(2)(b) and Article 94(3) dated Jan. 13, 2021, European Application No. 18719335.4, pp. 1-11.
Chinese First Office Action issued Nov. 23, 2022, CN Application No. 2018800357119, pp. 1-17 (Includes English Language reporting letter and summary).
Office Action for corresponding Chinese Application No. 2018800357119 dated Jul. 30, 2023.

* cited by examiner

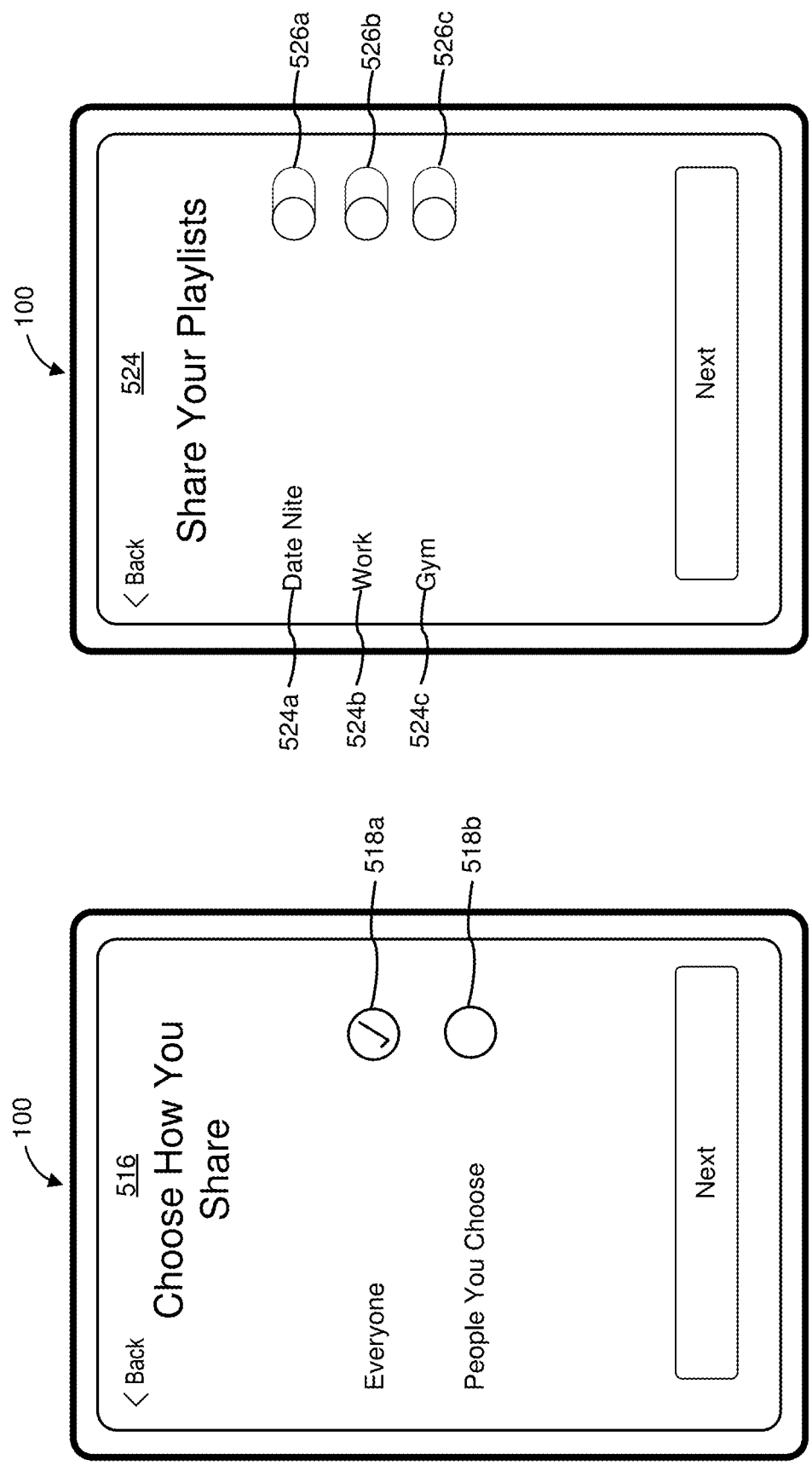

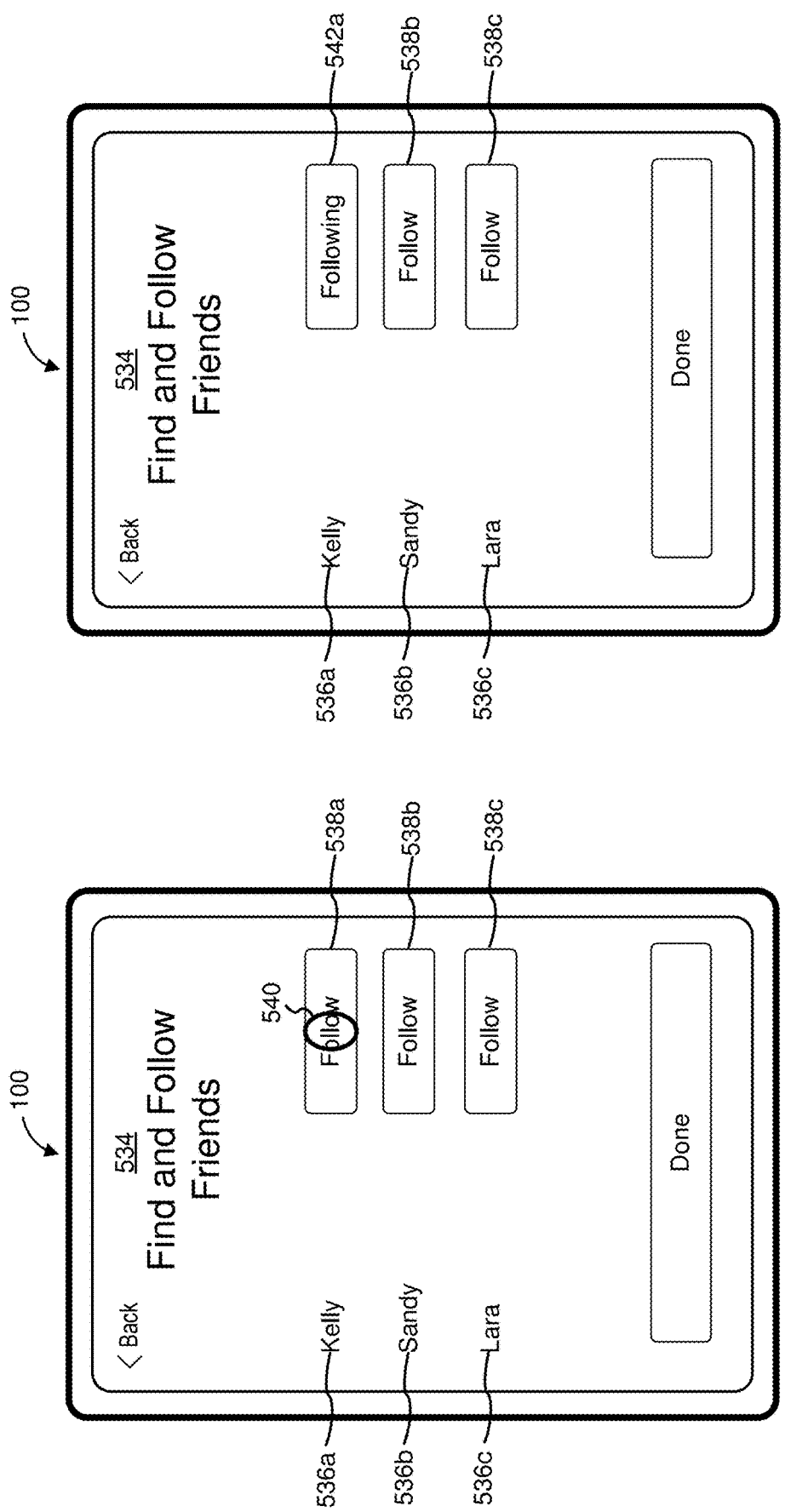

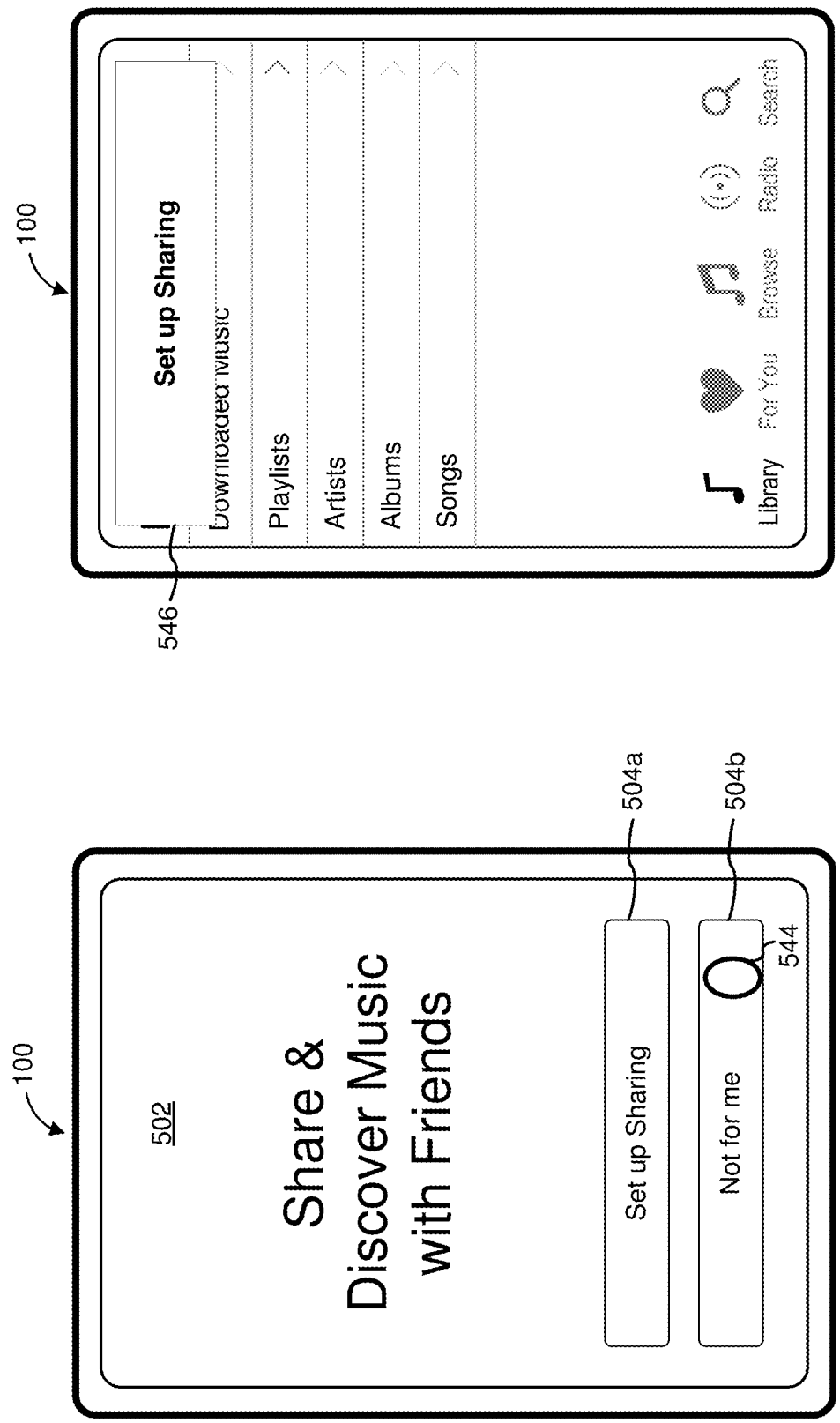

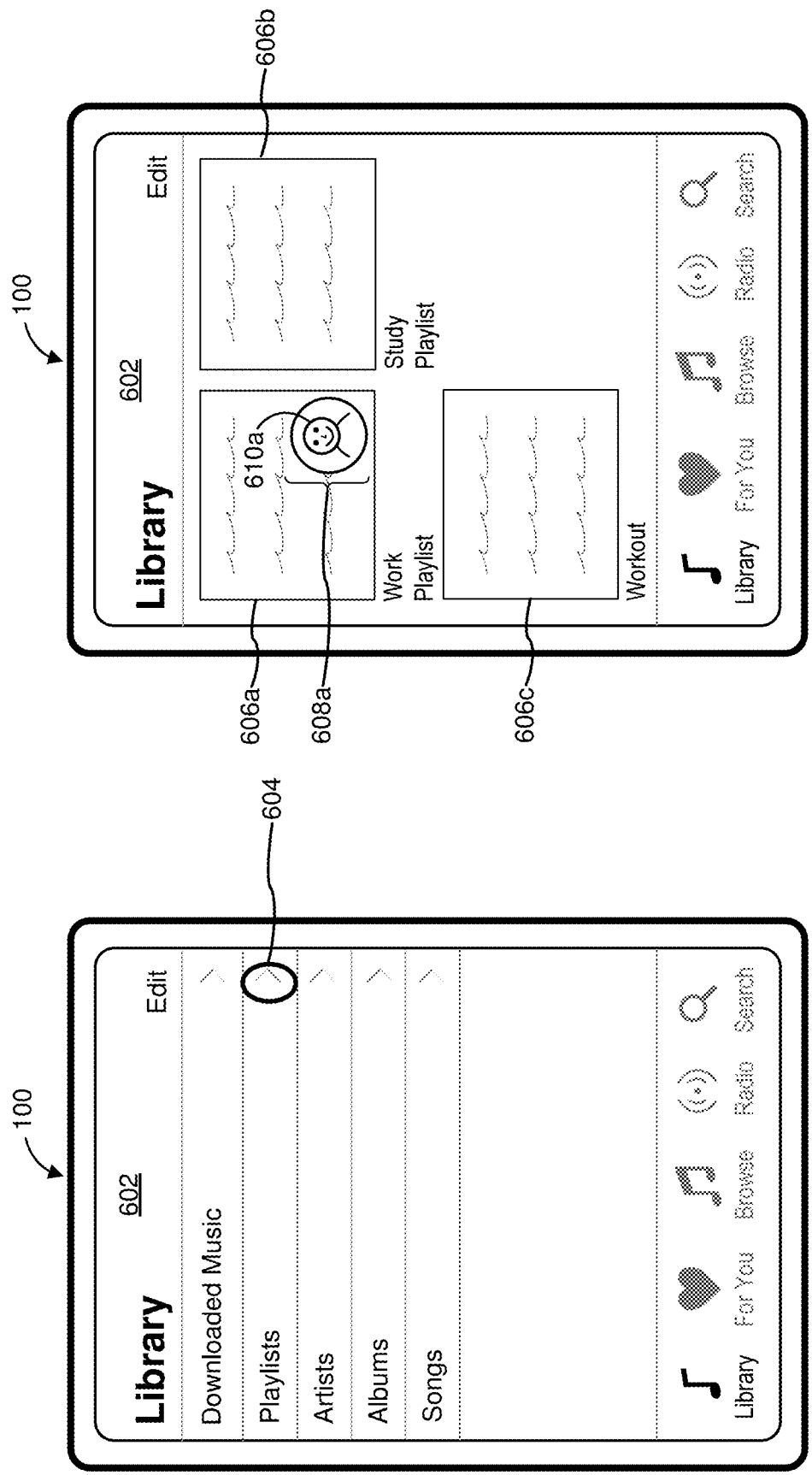

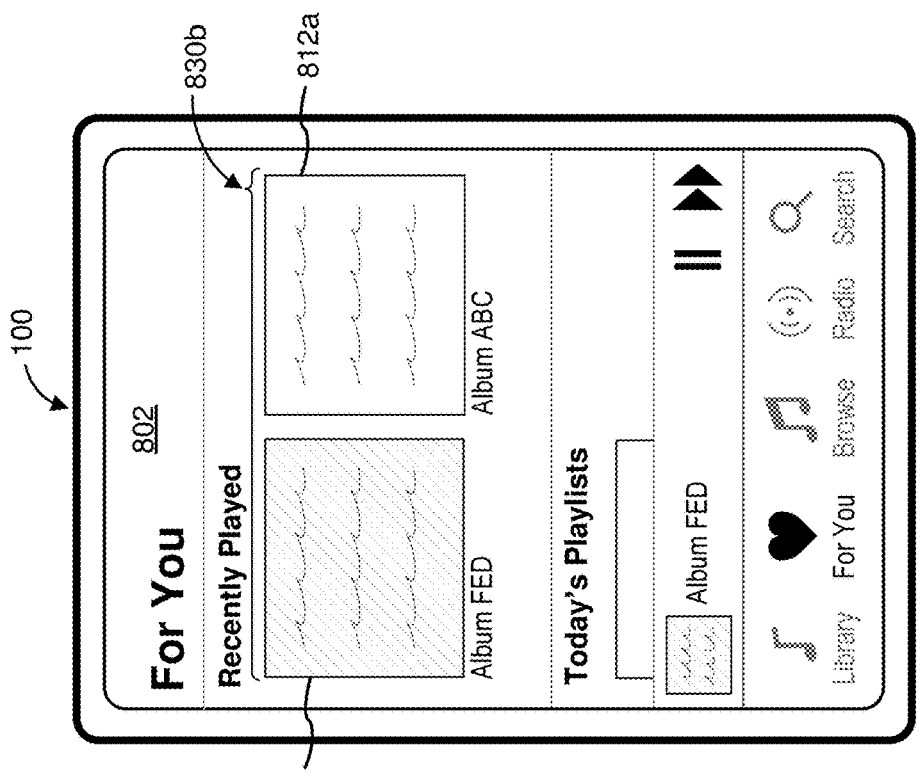
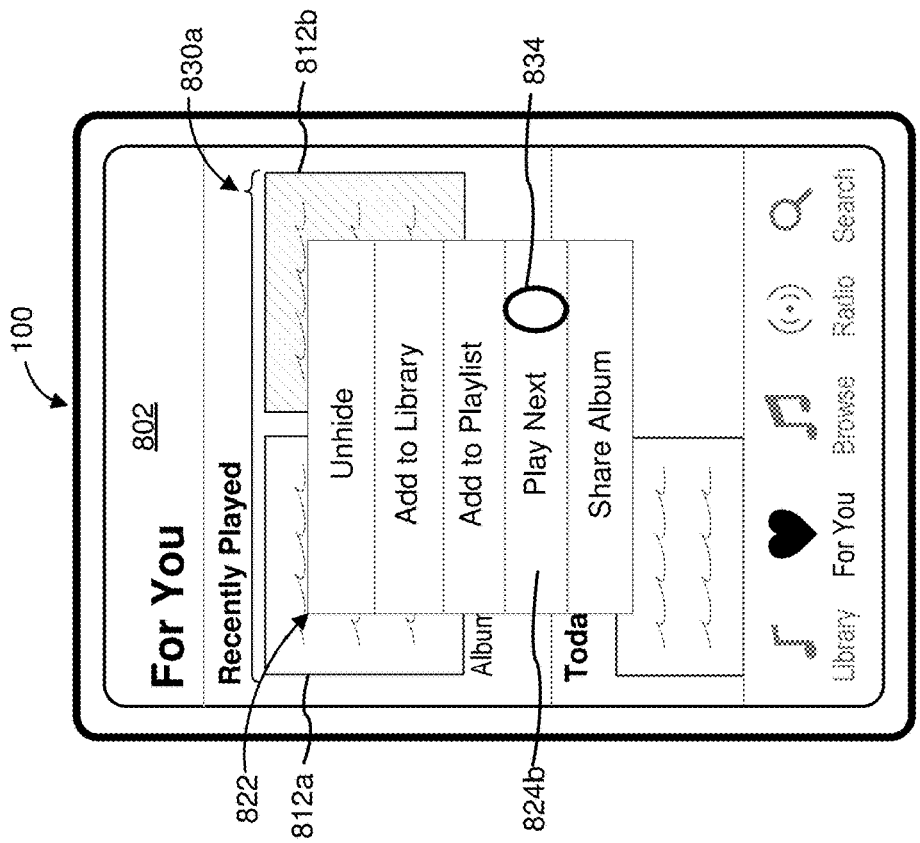
Figure 8L
Figure 8K

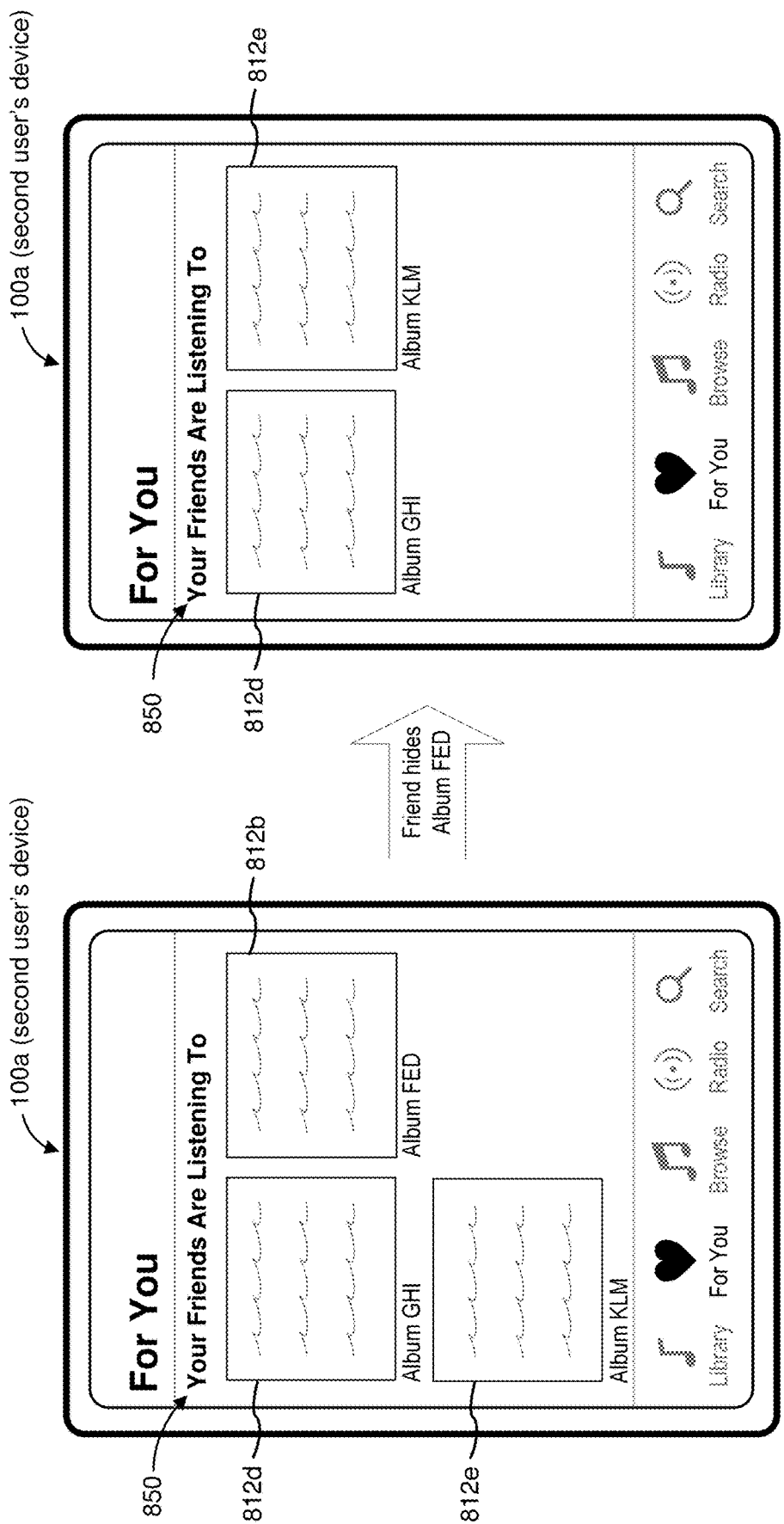

(A)

During the enrollment:
    Display, on the display, a plurality of representations of other users that do not have a predetermined relationship with the first user;
    Display, on the display, relationship affordances corresponding with the other users, wherein each relationship affordance, when activated, triggers the establishment of the predetermined relationship with the user corresponding with the affordance — 924

The representations of the other users are selected for inclusion in the plurality of representations of other users based on a comparison of music preferences of the first user to music preferences of a plurality of candidate users other than the first user,
    A first subset, less than all, of the candidate users are included in the plurality of representations users based on the similarity of their music preferences to the music preferences of the first user; and
    A second subset, less than all, of the candidate users are excluded from the plurality of representations of users based on the similarity of their music preferences to the music preferences of the first user; and
    The users in the first subset of the candidate users have music preferences that are closer to music preferences of the first user than the users in the second set of candidate users — 926

Display, on the display, a plurality of representations of other users that do not have a predetermined relationship with the first user, wherein displaying the representations of the other users comprises:
    Arrange the representations of the other users based on a degree of similarity between the music preference of the first user and the music preferences of the other users that do not have a predetermined relationship with the first user — 928

Display, on the display, a plurality of representations of other users that do not have a predetermined relationship with the first user, wherein displaying the representations of the other users comprises concurrently displaying:
    A graphical indication of the music preferences of a first user of the other users along with information identifying the first user; and
    A graphical indication of the music preferences of a second user of the other users along with information identifying the second user — 930

Display, on the display, a plurality of representations of other users that do not have a predetermined relationship with the first user, wherein displaying the representations of the other users comprises:
    Selecting the other users based on one or more of:
    A geographic location of the first user; and
    A social network associated with the device — 932

942 Prior to displaying the enrollment user interface:

Determine whether or not the first user is subscribed to a subscription-based music streaming service;

In response to determining that the first user is subscribed to the subscription-based music streaming service, display the enrollment user interface; and In response to determining that the first user is not subscribed to the subscription-based music streaming service, forgo display of the enrollment user interface

---

944 The enrollment user interface includes a third affordance that, when activated, changes the default values of the privacy settings for the plurality of playlists

---

946 The representations of the plurality of playlists are scrollable

---

948 The default values of the privacy settings for the plurality of playlists indicate that the plurality of playlists are private

950 The one or more user inputs changes the privacy settings for the first playlist from private to public, and wherein other users are provided access to the first playlist in response to the privacy settings for the first playlist being changed from private to public

1002 — At a device including a display and one or more input devices:
Display, on the display, a media browsing user interface for a first user
(A)

1004 — While displaying the media browsing user interface, receive, via the one or more input devices, an input that corresponds to a request to display a different view of the media browsing user interface
In response to the input, concurrently displaying, within the media browsing user interface a plurality of representations of containers of media items: a representation of a first media container and a representation of a second media container
(B)

(C)

1006 — In accordance with a determination that the first media container meets engagement criteria for the first user, wherein the engagement criteria for a respective media container include a criterion that other users with whom the first user has a predetermined relationship have engaged with media in the respective media container, display an engagement marker for the representation of the first media container to indicate that users with which the first user has the predetermined relationship have engaged with one or more media items in the first media container
(D)

(E)

1008 — In accordance with a determination that the media container does not meet the engagement criteria for the first user, the representation of the first media container is displayed without displaying an engagement marker for the representation of the first media container (F)

1010 — In accordance with a determination that the second media container meets engagement criteria for the first user, display an engagement marker for the representation of the second media container to indicate that users with which the first user has the predetermined relationship have engaged with one or more media items in the second media container
In accordance with a determination that the second media container does not meet the engagement criteria for the first user, the representation of the second media container is displayed without displaying an engagement marker for the representation of the second media container

---
Display, on the display, a notification indicating that at least one of the other users has engaged with one or more media items in one or more of the plurality of containers of media items ⌐1022

---

○ D

1006

The engagement marker for the representation of the first container of media items indicates a type of engagement that at least one of the other users had with the first container of media items ⌐1024

In accordance with a determination that the type of engagement is a first type of engagement, the engagement marker includes a first symbol indicative of the first score; and
In accordance with a determination that the type of engagement is a second type of engagement wherein, the second type of engagement is different from the first type of engagement, the engagement marker includes a second symbol that is different from the first symbol ⌐1026

Wherein in accordance with a determination that the type of engagement includes the at least one of the other users assigning a third score to the first media container, the engagement marker does not include a third symbol indicative of the third score, the third score being less than the first score ⌐1028

○ E
↓

Determine whether the other users have engaged one or more of the first media container and the second media container ⌐1030

The engagement criteria for determining that a respective other user has engaged with a respective media container comprises one or more of:
   A criterion that is met when the respective other user has listened to the respective media container more than a threshold amount;
   A criterion that is met when the respective other user has explicitly indicated a preference for the respective media container;
   A criterion that is met when the respective other user has added the respective media container or a media item from the respective media container to a media library;
   A criterion that is met when the respective other user has added the respective media container or a media item from the respective media container to a playlist; and
   A criterion that is met when the respective other user has downloaded the respective media container or a media item from the respective media container to a respective device associated with the respective user ⌐1032

Figure 10C

```
┌─────────────────────────────────────────────────────────────────┐
│   The engagement criteria for determining that a respective     │
│ other user has engaged with a respective media container        │
│ includes a criterion that is met when a number of interactions  ├─1034
│ of the other users with the respective media container meets    │
│ a threshold quantity of interactions                            │
│  ┌───────────────────────────────────────────────────────────┐  │
│  │    In accordance with a determination that the engagement │  │
│  │ criteria includes an explicit criteria, determine whether │  │
│  │ the number of interactions is greater than a first        │  │
│  │ threshold; and                                            │  │
│  │    In accordance with a determination that the engagement │  ├─1036
│  │ criteria includes an implicit criteria, determine whether │  │
│  │ the number of interactions is greater than a second       │  │
│  │ threshold, wherein the second threshold is greater than   │  │
│  │ the first threshold                                       │  │
│  └───────────────────────────────────────────────────────────┘  │
└─────────────────────────────────────────────────────────────────┘
```

```
┌─────────────────────────────────────────────────────────────────┐
│   Display a badge indicating that other users engaged with the  │
│ one or more media items in the first media container;           │
│   Detect, via the one or more input devices, a user input on    │
│ the badge; and                                                  ├─1038
│   In response to detecting the user input on the badge, display │
│ selectable affordances corresponding with the other users that  │
│ engaged with the one or more media items in the first media     │
│ container, each selectable affordance corresponds with a        │
│ respective one of the other users                               │
│  ┌───────────────────────────────────────────────────────────┐  │
│  │   Detect, via the one or more input devices, a user input │  │
│  │ activating one of the selectable affordances; and         │  │
│  │   In response to detecting the user input activating the  │  ├─1040
│  │ one of the selectable affordances, display a user profile │  │
│  │ for a respective one of the other users that engaged with │  │
│  │ one or more media items in the first media container      │  │
│  └───────────────────────────────────────────────────────────┘  │
└─────────────────────────────────────────────────────────────────┘
```

At a device including a display and one or more input devices:

Display, on the display a media browsing user interface for a media application;
    While displaying the media browsing user interface, receive, via the one or more input devices, a request to display recently played media containers; and
    In response to receiving the request to display the recently played media containers, display a plurality of representations of media containers that are marked as having been recently played by a user, wherein the plurality of representations of media containers include a first media container that was generated based on a verbal instruction requesting playback of media that matched a portion of the verbal instruction — 1102

> The first media container includes a representation of the verbal instruction that was used to generate the first media container. — 1104

> The first media container includes media items that are selected in accordance with a media taste profile of the user — 1106

> The first media container includes media items that other users are engaging with, wherein the other users have a predetermined relationship with the user — 1108
>
> > Receive, via the one or more input devices, a user input on the representation of the first media container;
> > In response to receiving the user input on the representation of the first media container, display affordances for other users that affect the first media container by engaging with media items;
> > Receive, via the one or more input devices, a user input on one of the affordances that corresponds with one of the other users; and
> > In response to receiving the user input on the one of the affordances, remove media items that the one of the other users engaged with from the first media container — 1110

1202 — At a device including a display and one or more input devices:
Display, on the display, a media engagement user interface that includes a plurality of representations of containers of media items for which a first user has met engagement criteria, wherein engagement of the first user with the plurality of containers of media items are visible to other users that have a predetermined relationship to the first user, wherein displaying the media engagement user interface includes concurrently displaying, on the display:

(A)
↓
(B)
↓

1204 — A representation of a first media container items; and (C)
↓
(D)
↓

1206 — A representation of a second media container;
Detect, via the one or more input devices, a sequence of one or more inputs that corresponds to a request to hide the engagement of the first user with a respective media container (E)
↓

1208 — In response to detecting, via the one or more input devices, the sequence of one or more inputs that corresponds to the request to hide the engagement of the first user with the respective media container:
In accordance with a determination that the sequence of one or more inputs corresponded to a request to hide the engagement of the first user with the first media container, change an appearance of the representation of the first media container without changing the appearance of the representation of the second media container, wherein the change to the representation of the first media container indicates that the engagement of the first user with the first media container is hidden from view by other users with the predetermined relationship to the first user; and (F)
↓
(G)
↓

1210 — In accordance with a determination that the sequence of one or more inputs corresponded to a request to hide the engagement of the first user with the second media container, changing an appearance of the representation of the second media container without changing the appearance of the representation of the first media container, wherein the change to the appearance of the representation of the second media container indicates that the engagement of the first user with the second media container is hidden from view by the other users with the predetermined relationship to the first user

Figure 12A

After the engagement of the first user with the first media container is hidden from view by the other users with the predetermined relationship to the first user:
  Forego display of the representation of the first media container on a public version of a profile page for the first user, wherein the public version of the profile page is visible to the other users that have the predetermined relationship with the first user; and
  Maintain display of the changed representation of the first media container on a private version of the profile page for the first user, wherein the private version of the profile page is only visible to the first user

1240

After the engagement of the first user with the first media container is hidden from view by the other users with the predetermined relationship to the first user:
  Receive, via the one or more input devices, a request to unhide the engagement of the first user with the first media container; and
  In response to receiving the request to unhide the engagement, revert the change in the appearance of the representation of the first media container wherein the change to the appearance of the representation of the first media container indicates that the engagement of the first user with the first media container is no longer hidden from view by the other users with the predetermined relationship to the first user.

DEVICE, METHOD, AND GRAPHICAL USER INTERFACE FOR PRESENTING REPRESENTATIONS OF MEDIA CONTAINERS

RELATED APPLICATION

This application is a continuation of U.S. patent application Ser. No. 15/978,119, filed on May 12, 2018, which claims priority to U.S. Provisional Patent Application No. 62/514,608, filed on Jun. 2, 2017, the entire contents of which are incorporated herein by reference.

TECHNICAL FIELD

This relates generally to electronic devices with touch-sensitive surfaces, including but not limited to electronic devices with touch-sensitive surfaces that enable the presentation of representations for media containers.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture, iPhoto, Photos from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for displaying and interacting with representations of media containers. Such methods and interfaces optionally complement or replace conventional methods for displaying and interacting with representations of media containers. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with a display, one or more input devices, a non-transitory memory and one or more processors coupled with the display, the one or more input devices and the non-transitory memory. The method includes receiving, via the one or more input devices, a request to enroll in music sharing, where enrollment in music sharing allows a first user to share music with other users. After receiving the request, the method includes displaying, on the display, an enrollment user interface that includes concurrently displaying representations of a plurality of playlists created by the first user and privacy settings for the plurality of playlists, where the privacy settings for the plurality of playlists have default values. The enrollment user interface includes a first affordance that corresponds to a first playlist of the plurality of playlists created by the first user, and a second affordance that corresponds to a second playlist of the plurality of playlists created by the first user. The method includes while displaying the privacy settings for the plurality of playlists, receiving, via the one or more input devices, one or more user inputs changing the privacy settings for one or more of the plurality of playlists from corresponding default privacy settings to user-specified privacy settings. The method includes after completing enrollment, providing access to the plurality of playlists of the first user to other users with a predetermined relationship to the first user based on the privacy settings for the plurality of playlists. In accordance with a determination that the one or more user inputs detected while displaying the enrollment user interface changed the default privacy settings for the first playlist, the method includes providing access to the first playlist of the first user to other users connected with the first user based on the user-specified privacy settings. In accordance with a determination that the one or more user inputs detected while displaying the enrollment user interface changed the default privacy settings for the second playlist, the method includes providing access to the second playlist of the first user to other users connected with the first user based on the user-specified privacy settings.

In accordance with some embodiments, an electronic device includes a display unit configured to display a user interface, one or more input units configured to receive user inputs, and a processing unit coupled with the display unit, and the one or more input units. The processing unit is configured to receive, via the one or more input devices, a request to enroll in music sharing, where enrollment in music sharing allows a first user to share music with other users. After receiving the request, the processing unit displays, on the display, an enrollment user interface that includes concurrently displaying representations of a plurality of playlists created by the first user and privacy settings for the plurality of playlists, where the privacy settings for the plurality of playlists have default values. The enrollment user interface includes a first affordance that corresponds to a first playlist of the plurality of playlists created by the first user, and a second affordance that corresponds to a second playlist of the plurality of playlists created by the first user. The processing unit is configured to while displaying the privacy settings for the plurality of playlists, receiving, via the one or more input devices, one or more user inputs changing the privacy settings for one or more of the plurality of playlists from corresponding default privacy settings to user-specified privacy settings. The processing unit is configured to after completing enrollment, providing access to the plurality of playlists of the first user to other users with a predetermined relationship to the first user based on the privacy settings for the plurality of playlists. In accordance with a determination that the one or more user inputs detected while displaying the enrollment user interface changed the default privacy settings for the first playlist, the processing unit provides access to the first playlist of the first user to other users connected with the first user based on the user-specified privacy settings. In accordance with a determination that the one or more user inputs detected while displaying the enrollment user interface changed the default privacy settings for the second playlist, the processing unit provides access to the second playlist of the first user to other users connected with the first user based on the user-specified privacy settings.

In accordance with some embodiments, a method is performed at a device with a display, one or more input devices, a non-transitory memory and one or more processors coupled with the display, the one or more input devices and the non-transitory memory. The method includes displaying, on the display, a media browsing user interface for a first user. The method includes while displaying the media browsing user interface, receiving, via the one or more input devices, an input that corresponds to a request to display a different view of the media browsing user interface. The method includes in response to the input, concurrently displaying, within the media browsing user interface a plurality of representations of containers of media items: a representation of a first media container and a representation of a second media container. In accordance with a determination that the first media container meets engagement criteria for the first user, where the engagement criteria for a respective media container include a criterion that other users with whom the first user has a predetermined relationship have engaged with media in the respective media container, the method includes displaying an engagement marker for the representation of the first media container to indicate that users with which the first user has the predetermined relationship have engaged with one or more media items in the first media container. In accordance with a determination that the first media container does not meet the engagement criteria for the first user, the method includes displaying the representation of the first media container without displaying an engagement marker for the representation of the first media container. In accordance with a determination that the second media container meets engagement criteria for the first user, the method includes displaying an engagement marker for the representation of the second media container to indicate that users with which the first user has the predetermined relationship have engaged with one or more media items in the second media container. In accordance with a determination that the second media container does not meet the engagement criteria for the first user, the method includes displaying the representation of the second media container without displaying an engagement marker for the representation of the second media container.

In accordance with some embodiments, an electronic device includes a display unit configured to display a user interface, one or more input units configured to receive user inputs, and a processing unit coupled with the display unit, and the one or more input units. The processing unit is configured to display, on the display unit, a media browsing user interface for a first user. The processing unit is configured to while displaying the media browsing user interface, receive, via the one or more input units, an input that corresponds to a request to display a different view of the media browsing user interface. In response to the input, the processing unit concurrently displays, within the media browsing user interface a plurality of representations of containers of media items including a representation of a first media container and a representation of a second media container. In accordance with a determination that the first media container meets engagement criteria for the first user, where the engagement criteria for a respective media container include a criterion that other users with whom the first user has a predetermined relationship have engaged with media in the respective media container, the processing unit displays an engagement marker for the representation of the first media container to indicate that users with which the first user has the predetermined relationship have engaged with one or more media items in the first media container. In accordance with a determination that the first media container does not meet the engagement criteria for the first user, the processing unit displays the representation of the first media container without displaying an engagement marker for the representation of the first media container. In accordance with a determination that the second media container meets engagement criteria for the first user, the processing unit displays an engagement marker for the representation of the second media container to indicate that users with which the first user has the predetermined relationship have engaged with one or more media items in the second media container. In accordance with a determination that the second media container does not meet the engagement criteria for the first user, the processing unit displays the representation of the second media container without displaying an engagement marker for the representation of the second media container.

In accordance with some embodiments, a method is performed at a device with a display, one or more input devices, a non-transitory memory and one or more processors coupled with the display, the one or more input devices and the non-transitory memory. The method includes displaying, on the display a media browsing user interface for a media application. The method includes while displaying the media browsing user interface, receiving, via the one or more input devices, a request to display recently played media containers. In response to receiving the request to display the recently played media containers, the method includes displaying a plurality of representations of media containers that are marked as having been recently played by a user, where the plurality of representations of media containers include a first media container that was generated based on a verbal instruction requesting playback of media that matched a portion of the verbal instruction.

In accordance with some embodiments, an electronic device includes a display unit configured to display a user interface, one or more input units configured to receive user inputs, and a processing unit coupled with the display unit, and the one or more input units. The processing unit is configured to display, on the display unit, a media browsing user interface for a media application. The processing unit is further configured to while displaying the media browsing user interface, receive, via the one or more input devices, a request to display recently played media containers. In response to receiving the request to display the recently played media containers, the processing unit displays a plurality of representations of media containers that are marked as having been recently played by a user, where the plurality of representations of media containers include a first media container that was generated based on a verbal instruction requesting playback of media that matched a portion of the verbal instruction.

In accordance with some embodiments, a method is performed at a device with a display, one or more input devices, a non-transitory memory and one or more processors coupled with the display, the one or more input devices and the non-transitory memory. The method includes displaying, on the display, a media engagement user interface that includes a plurality of representations of containers of media items for which a first user has met engagement criteria. The engagement of the first user with the plurality of containers of media items are visible to other users that have a predetermined relationship to the first user. Displaying the media engagement user interface includes concurrently displaying, on the display a representation of a first media container and a representation of a second media container. The method includes detecting, via the one or more input devices, a sequence of one or more inputs that corresponds to a request to hide the engagement of the first user with a respective media container. In response to detecting, via the one or more input devices, the sequence of one or more inputs that corresponds to the request to hide the engagement of the first user with the respective media container, the method includes, in accordance with a determination that the sequence of one or more inputs corresponded to a request to hide the engagement of the first user with the first media container, changing an appearance of the representation of the first media container without changing the appearance of the representation of the second media container. The change to the representation of the first media container indicates that the engagement of the first user with the first media container is hidden from view by other users with the predetermined relationship to the first user. In accordance with a determination that the sequence of one or more inputs corresponded to a request to hide the engagement of the first user with the second media container, the method includes changing an appearance of the representation of the second media container without changing the appearance of the representation of the first media container, where the change to the appearance of the representation of the second media container indicates that the engagement of the first user with the second media container is hidden from view by the other users with the predetermined relationship to the first user.

In accordance with some embodiments, an electronic device includes a display unit configured to display a user interface, one or more input units configured to receive user inputs, and a processing unit coupled with the display unit, and the one or more input units. The processing unit is configured to display, on the display unit, a media engagement user interface that includes a plurality of representations of containers of media items for which a first user has met engagement criteria. The engagement of the first user with the plurality of containers of media items are visible to other users that have a predetermined relationship to the first user. Displaying the media engagement user interface includes concurrently displaying, on the display a representation of a first media container and a representation of a second media container. The processing unit detects, via the one or more input devices, a sequence of one or more inputs that corresponds to a request to hide the engagement of the first user with a respective media container. In response to detecting, via the one or more input devices, the sequence of one or more inputs that corresponds to the request to hide the engagement of the first user with the respective media container, the processing unit, in accordance with a determination that the sequence of one or more inputs corresponded to a request to hide the engagement of the first user with the first media container, changes an appearance of the representation of the first media container without changing the appearance of the representation of the second media container. The change to the representation of the first media container indicates that the engagement of the first user with the first media container is hidden from view by other users with the predetermined relationship to the first user. In accordance with a determination that the sequence of one or more inputs corresponded to a request to hide the engagement of the first user with the second media container, the processing unit changes an appearance of the representation of the second media container without changing the appearance of the representation of the first media container, where the change to the appearance of the representation of the second media container indicates that the engagement of the first user with the second media container is hidden from view by the other users with the predetermined relationship to the first user.

Thus, electronic devices with displays and input devices are provided with faster, more efficient methods and interfaces for displaying affordances in accessibility mode. Such electronic devices improve the visibility of the affordances thereby improving the operability of the electronic devices. Such methods and interfaces may complement or replace conventional methods for displaying affordances in accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9F are flow diagrams illustrating a method of sharing music with other users in accordance with some embodiments.

FIGS. 10A-10E are flow diagrams illustrating a method of indicating engagement of other users in accordance with some embodiments.

FIGS. 11A-11D are flow diagrams illustrating a method of displaying representations of media containers that are marked as having been recently played by a user in accordance with some embodiments.

FIGS. 12A-12E are flow diagrams illustrating a method of allowing a first user to hide engagement of the first user with one or more media containers in accordance with some embodiments.

DESCRIPTION OF EMBODIMENTS

Typically, obtaining information that is stored as data encoded in an optical machine-readable format is an unintuitive, non-user-friendly experience. According, in embodiments described below, a device displays a notification when the device detects that a media capture preview, generated by a media capture user interface of a camera application, includes data encoded in the optical machine-readable format. Displaying the notification in the media capture user interface provides an intuitive and user-friendly experience. Moreover, detecting the data encoded in the optical machine-readable format while displaying the media capture user interface reduces the need to launch a user interface that is dedicated to detecting the data encoded in the machine-readable format.

Some devices do not provide an intuitive and user-friendly option for handling images that include data encoded in an optical machine-readable format. Accordingly, in embodiments described below, in response to an image including data encoded in an optical machine-readable format, a device displays information corresponding to the data encoded in the optical machine-readable format. The device displays the information corresponding to the data encoded in the optical machine-readable format in response to receiving a request for additional information about the image. If the image does not include the data encoded in the optical machine-readable format, then the device displays additional information about the image. Displaying the information corresponding to the data encoded in the optical machine-readable format provides the user an option to act on the information thereby improving the operability of the device and providing a better user experience.

Some devices do not provide an intuitive and user-friendly option to act upon various types of encoded features. Accordingly, in embodiments described below, a device detects proximity of the device to an encoded feature, and displays a notification that includes an indication indicating a type of the encoded feature. The notification provides the user with an option to act upon information that is stored in the encoded feature. Detecting and indicating various types of encoded features when the device is in proximity of the encoded features improves the operability of the device by providing the user with an option to act upon the encoded feature.

Figure 5B:
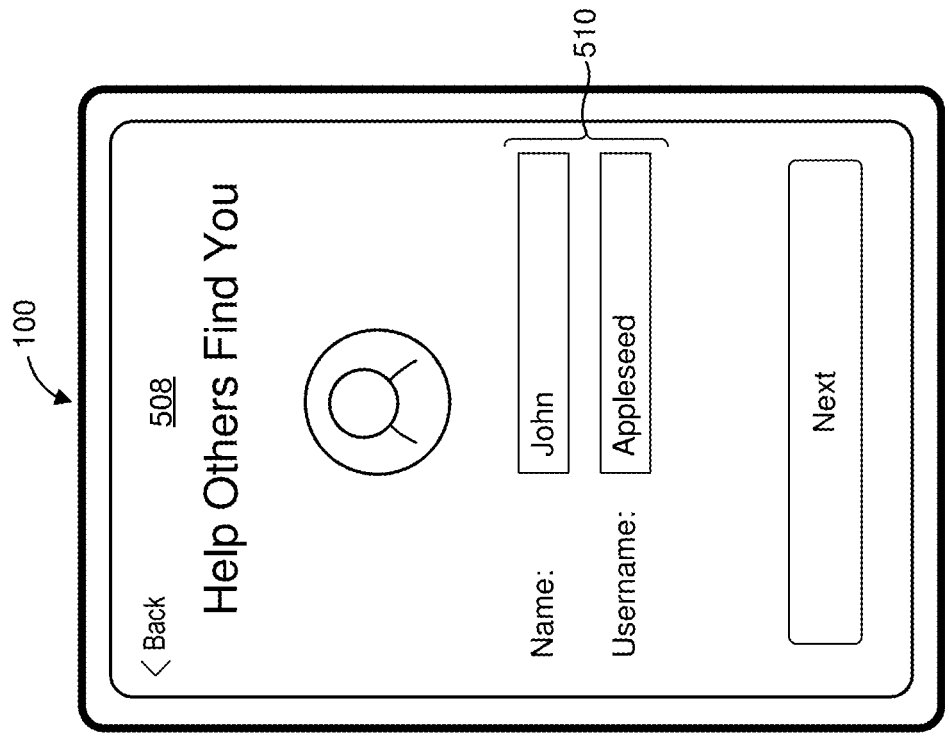
FIGS. 5A-5V illustrate example user interfaces for sharing music with other users in accordance with some embodiments.

Below, FIGS. 1A-1B, 2, and 3 provide a description of example devices. FIGS. 4A-4B, and 5A-5W illustrate example user interfaces for sharing music with other users. FIGS. 6A-6N illustrate example user interfaces for indicating engagement of other users with media containers of a first user. FIG. 7A-7T illustrate example user interfaces that display representations of media container that are marked as having been recently played by a user. FIGS. 8A-8X illustrate example user interfaces that allow a first user to hide engagement of the first user with one or more media containers. FIGS. 9A-9F illustrate a flow diagram of a method of sharing music with other users. The user interfaces in 5A-5V are used to illustrate the processes in FIGS. 9A-9F. FIGS. 10A-10E illustrate a flow diagram of indicating engagement of other users with one or more media containers of a first user. The user interfaces in 6A-6N are used to illustrate the processes in FIGS. 10A-10E. FIGS. 11A-11D illustrate a flow diagram of a method of displaying representations of media containers that are marked as having been recently played by a user. The user interfaces in 7A-7T are used to illustrate the processes in FIGS. 11A-11D. FIGS. 12A-12E illustrate a flow diagram of hiding engagement of a first user with one or more media containers. The user interfaces in 8A-8X are used to illustrate the processes in FIGS. 12A-12E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
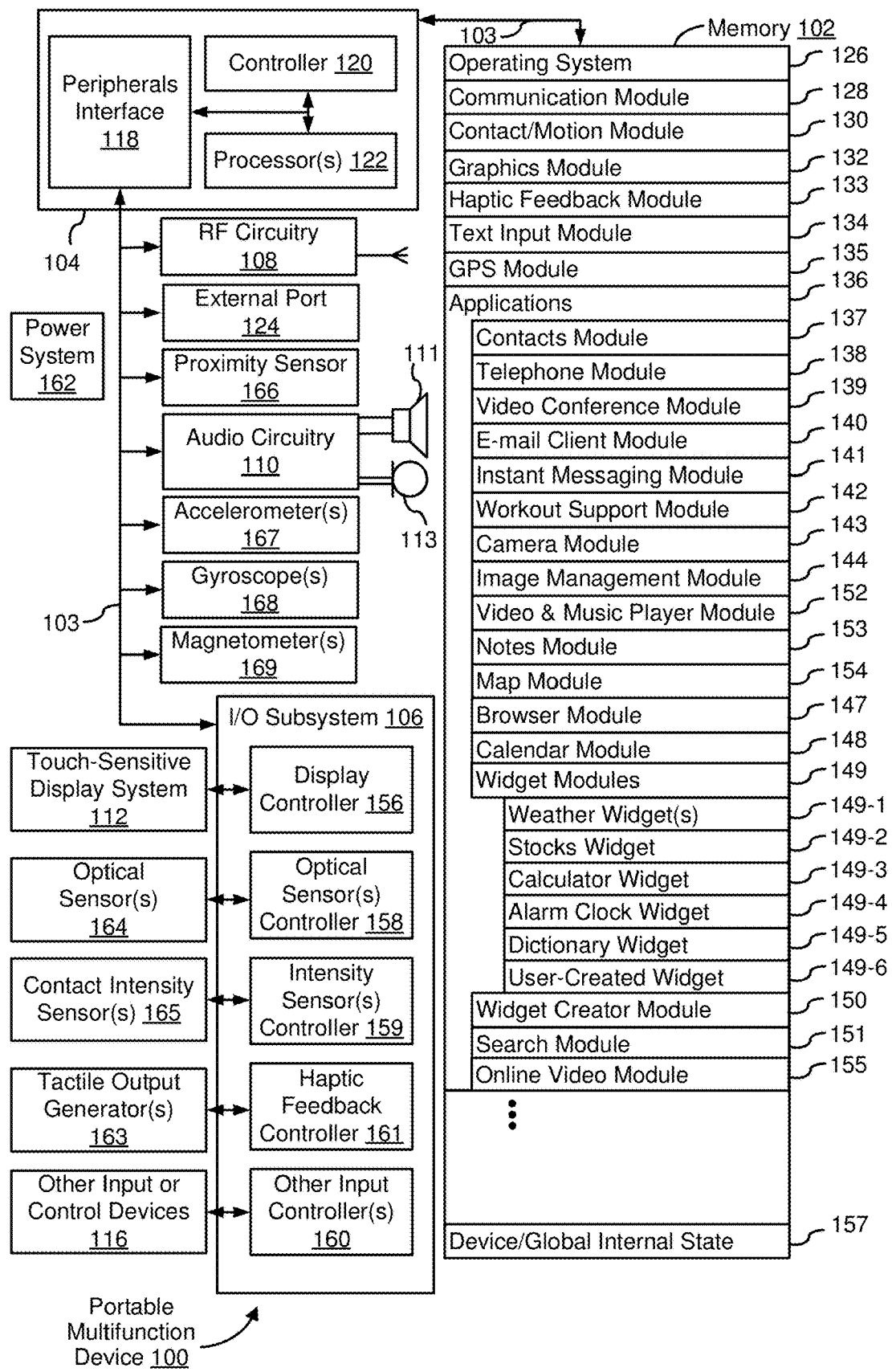
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
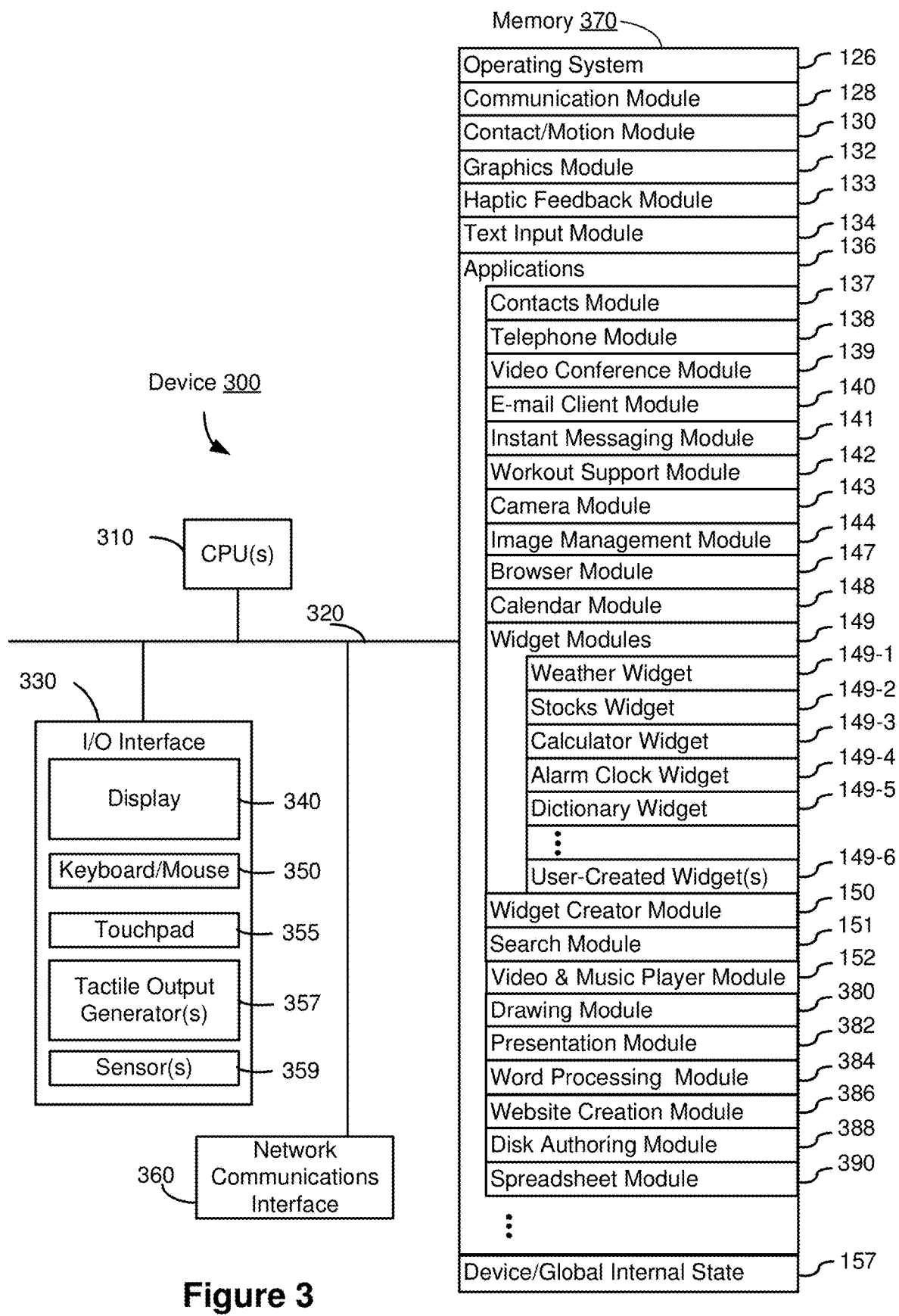
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
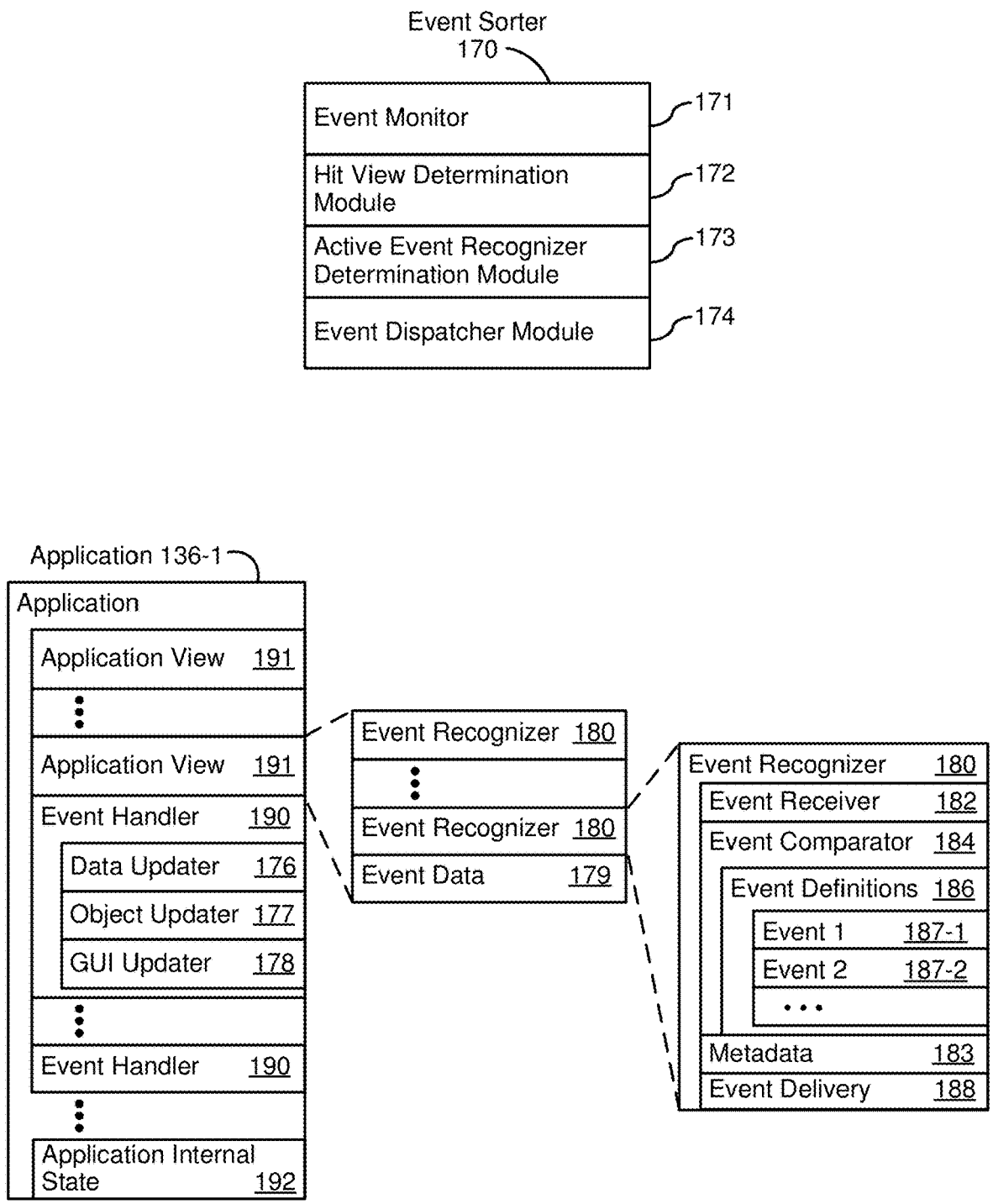
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
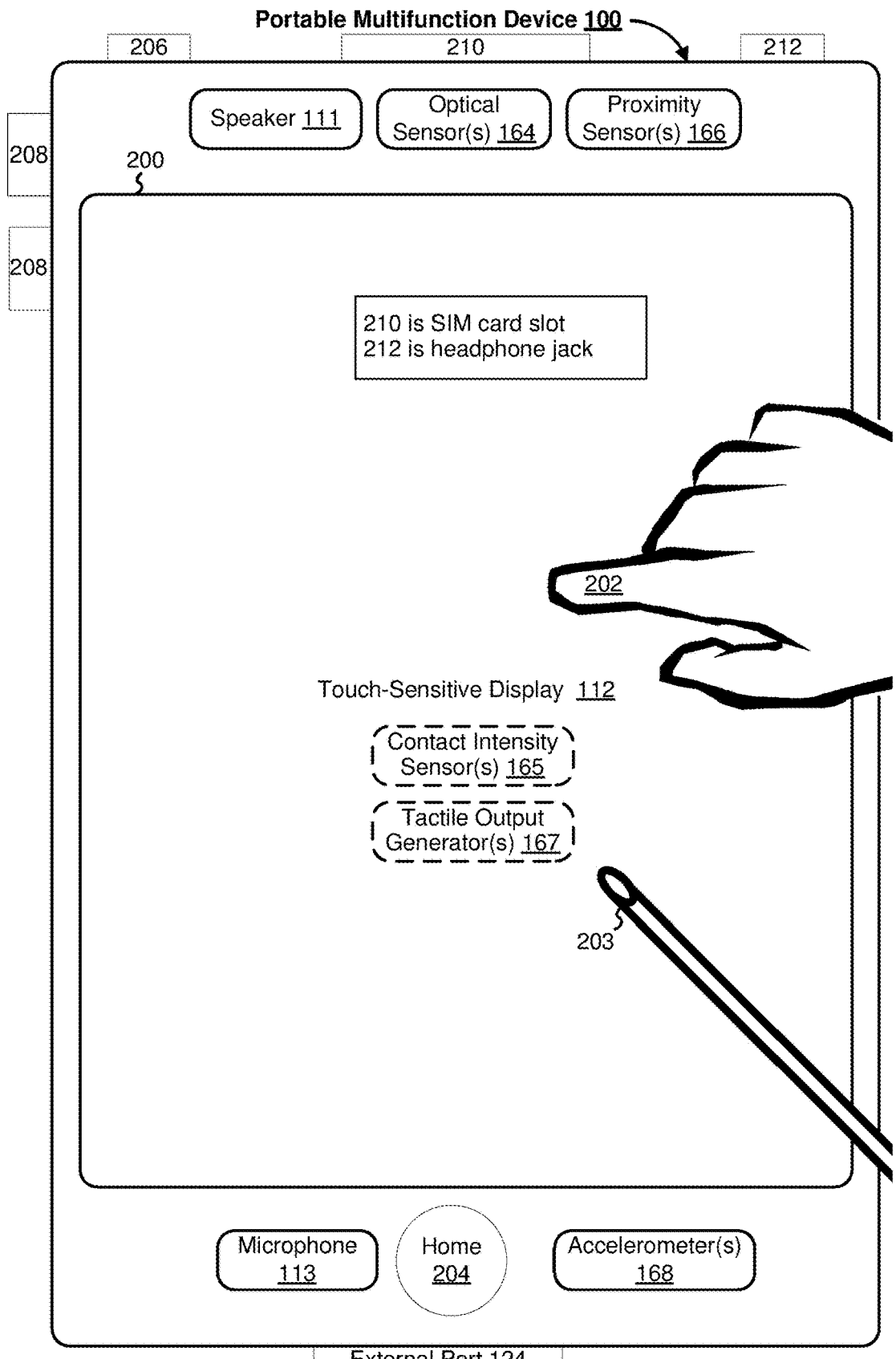
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
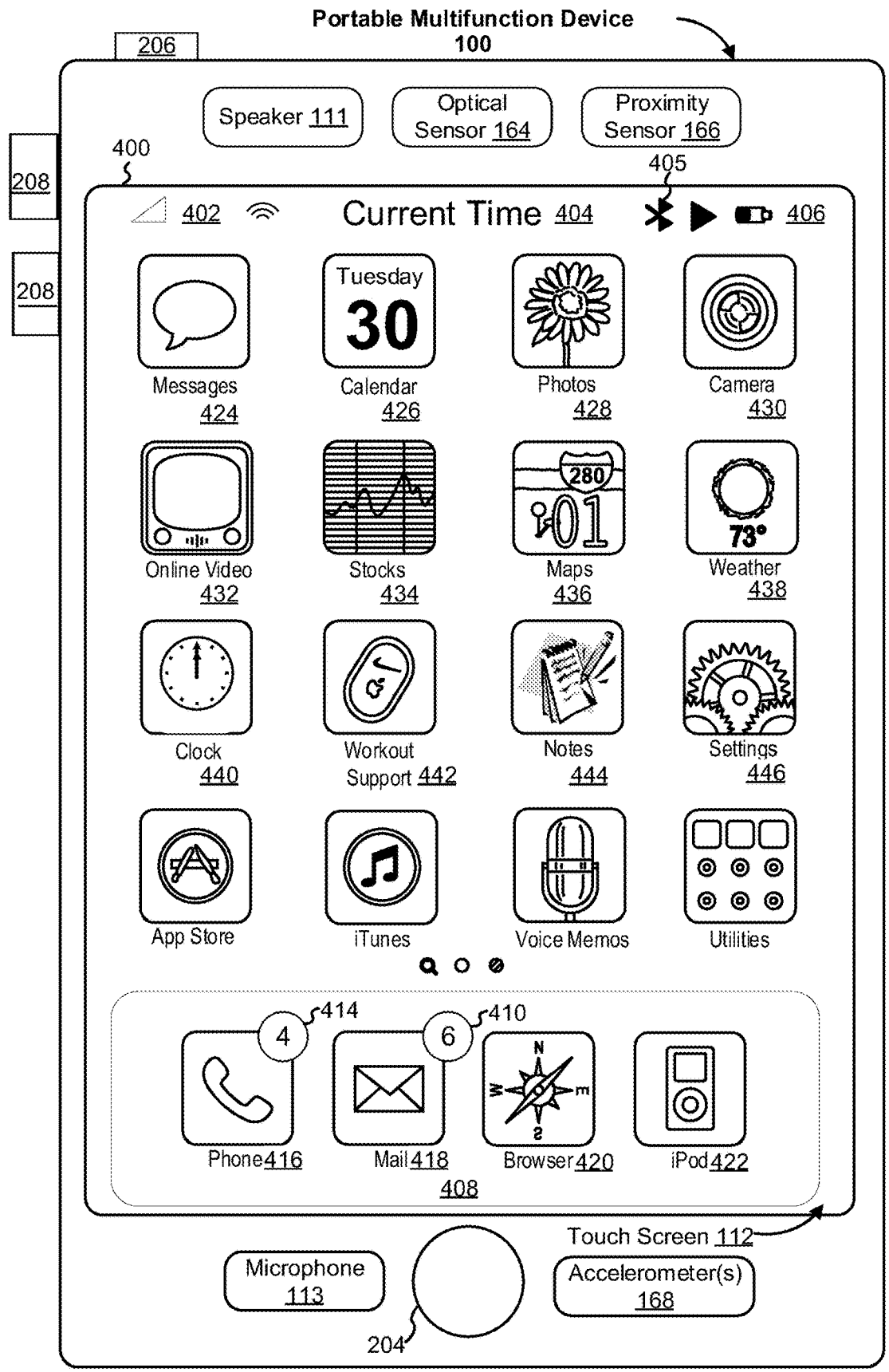
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
　Icon 416 for telephone module 138, labeled "Phone," which optionally includes an indicator 414 of the number of missed calls or voicemail messages;
　Icon 418 for e-mail client module 140, labeled "Mail," which optionally includes an indicator 410 of the number of unread e-mails;
　Icon 420 for browser module 147, labeled "Browser"; and
　Icon 422 for video and music player module 152, also referred to as iPod (trademark of Apple Inc.) module 152, labeled "iPod"; and
Icons for other applications, such as:
　Icon 424 for IM module 141, labeled "Text";
　Icon 426 for calendar module 148, labeled "Calendar";
　Icon 428 for image management module 144, labeled "Photos";
　Icon 430 for camera module 143, labeled "Camera";
　Icon 432 for online video module 155, labeled "Online Video";
　Icon 434 for stocks widget 149-2, labeled "Stocks";
　Icon 436 for map module 154, labeled "Map";
　Icon 438 for weather widget 149-1, labeled "Weather";
　Icon 440 for alarm clock widget 169-6, labeled "Clock";
　Icon 442 for workout support module 142, labeled "Workout Support";
　Icon 444 for notes module 153, labeled "Notes"; and
　Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
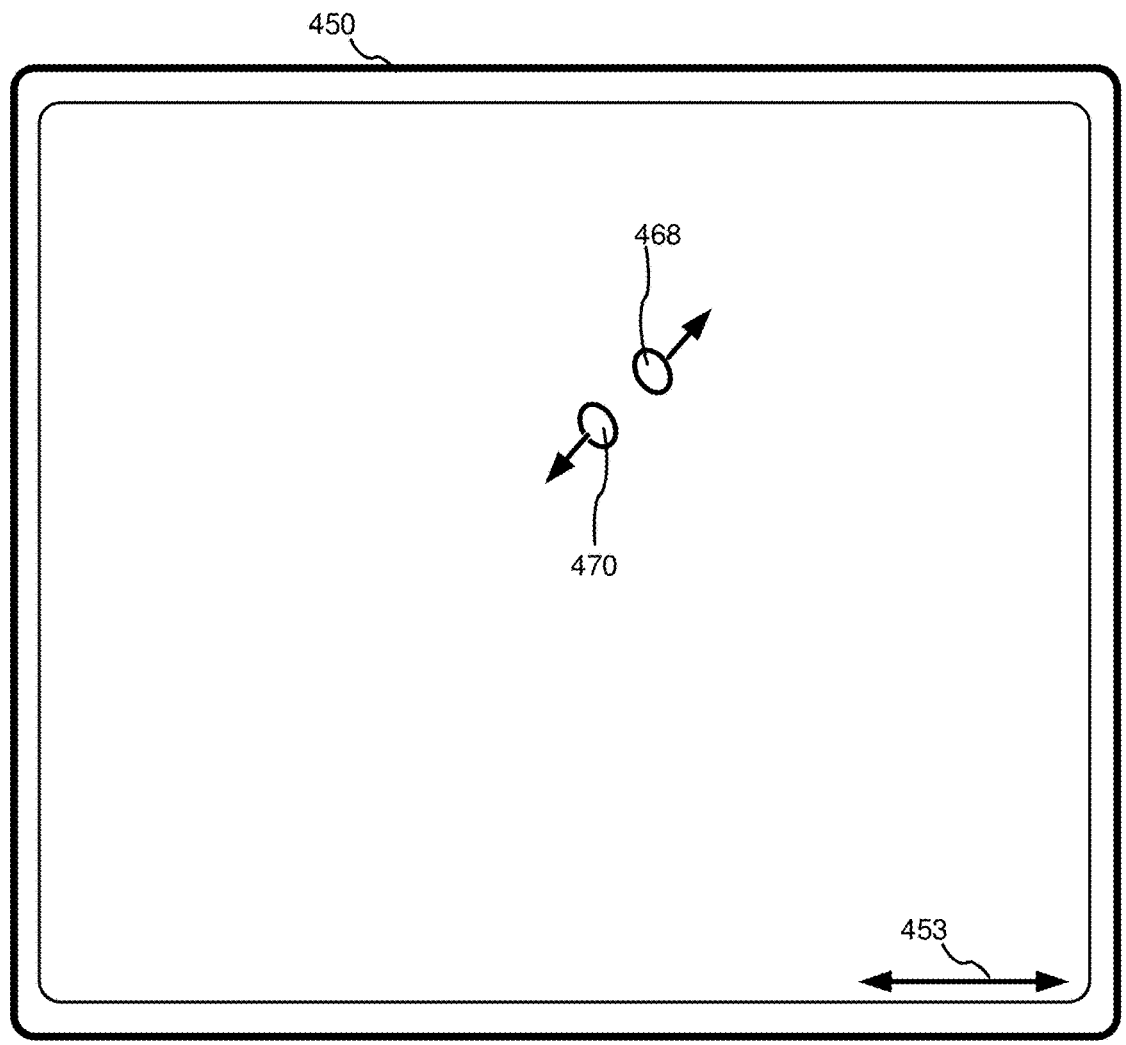
FIG. 4B illustrates an example user interface for a multifunction device with a touch-sensitive surface that is separate from the display in accordance with some embodiments.
Figure 4B:
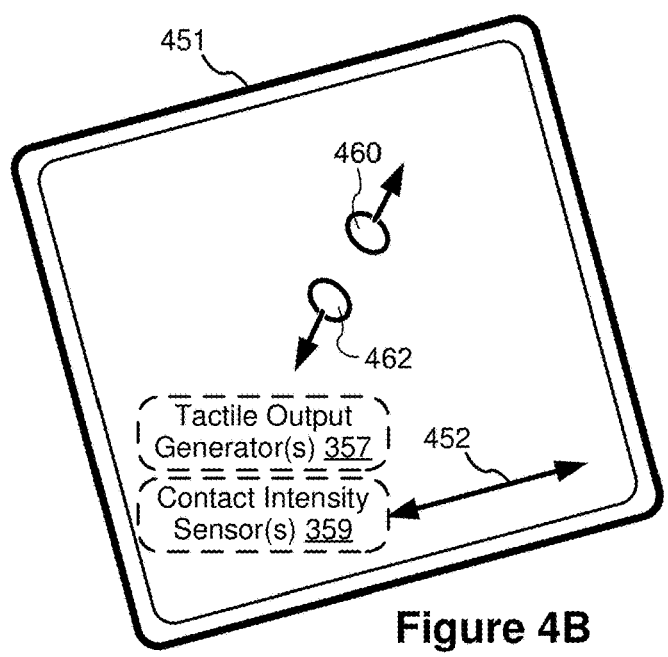

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed toward embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 5A:
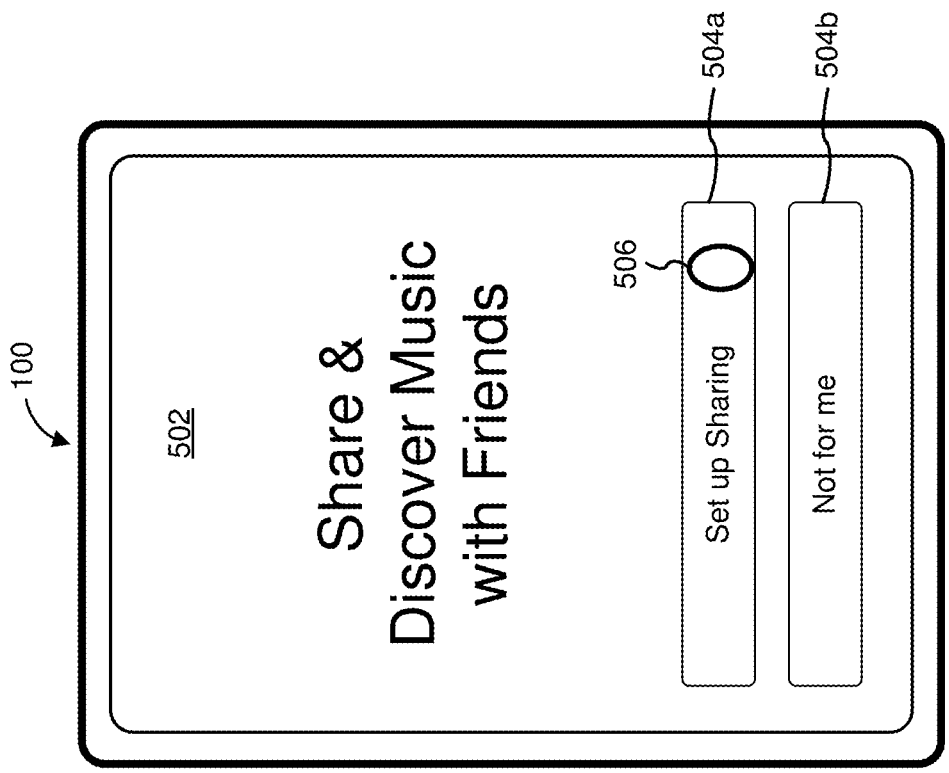
Figure 5F:
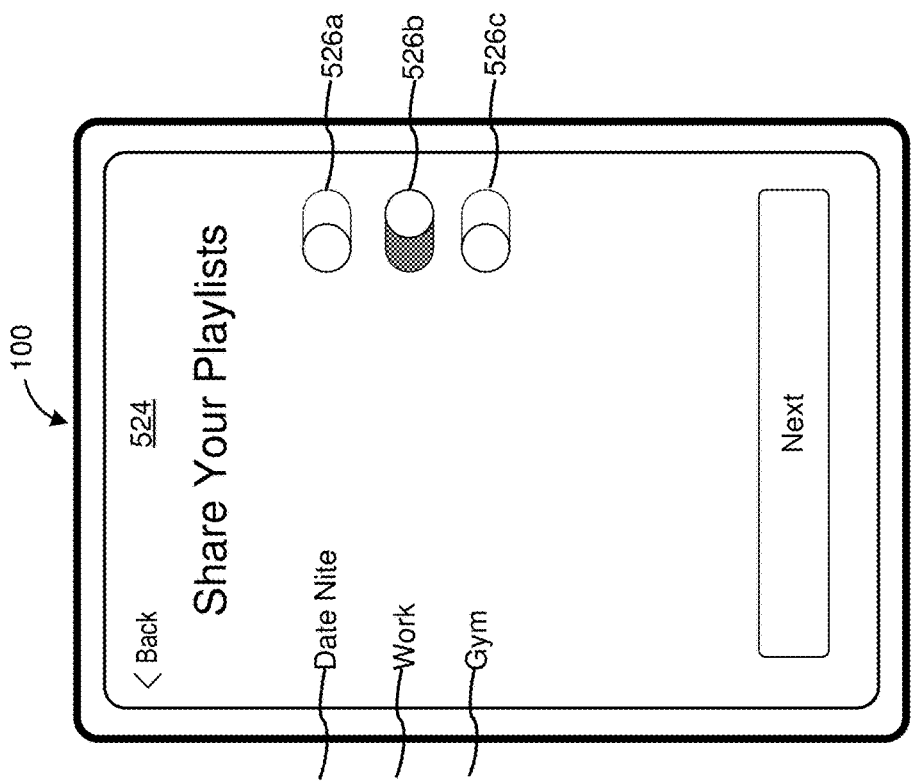
Figure 5E:
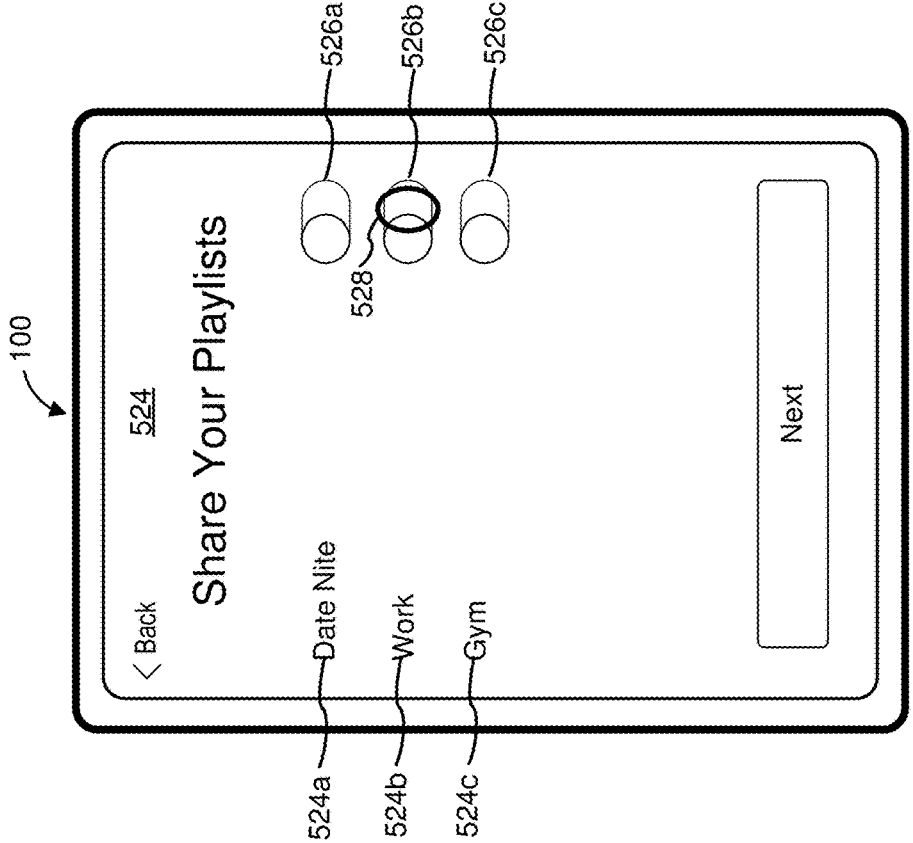
Figure 5H:
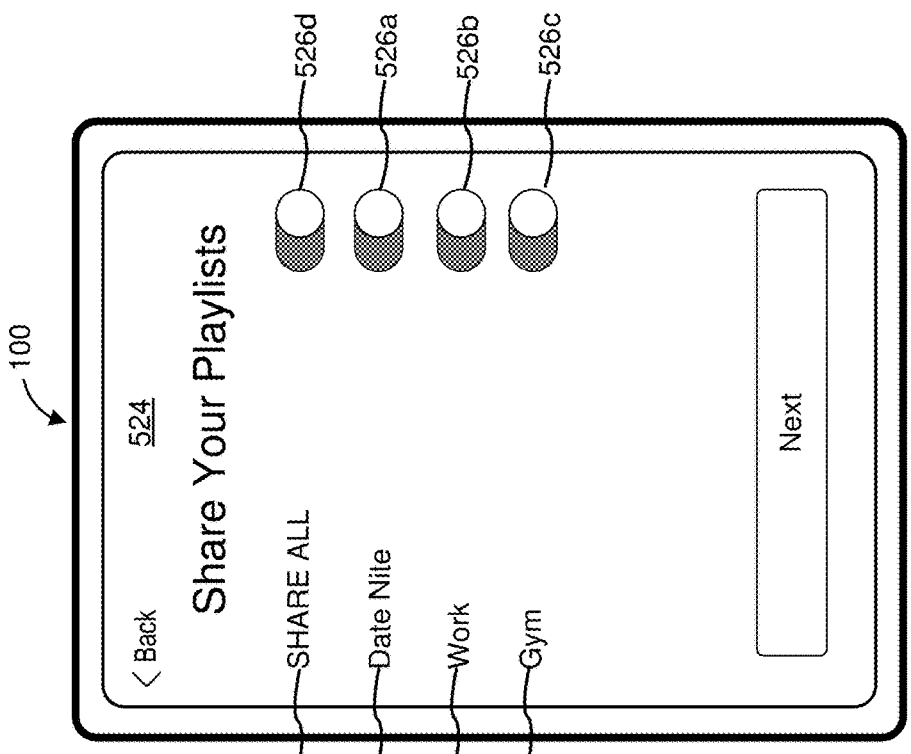
Figure 5G:
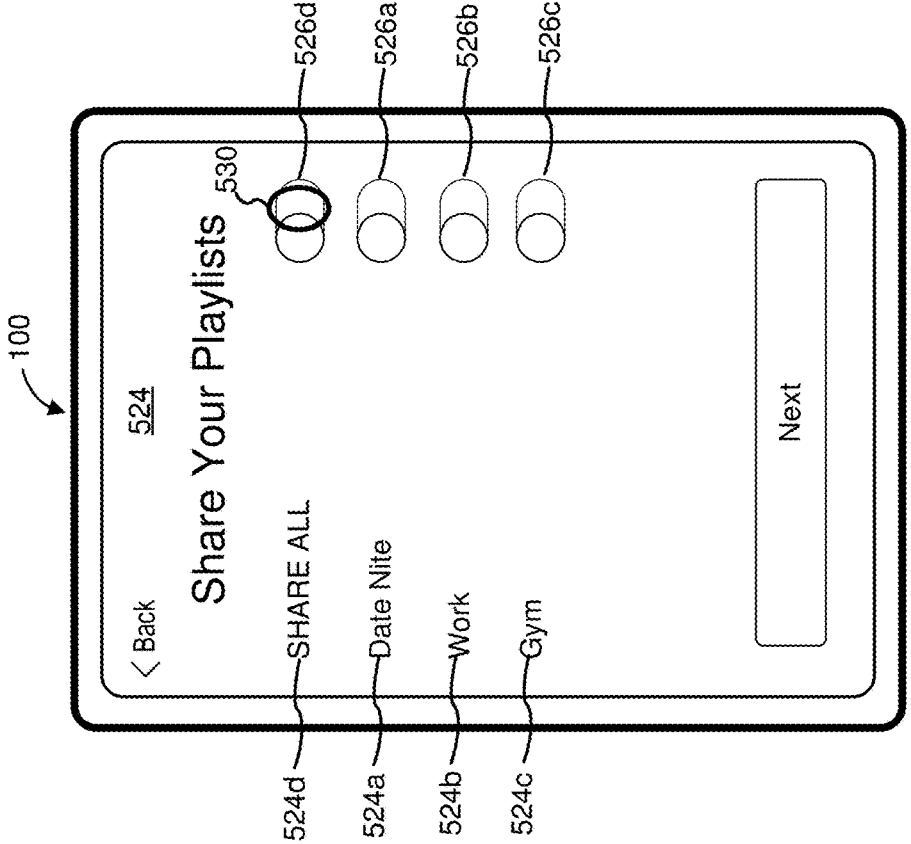
Figures 5M, 5N:
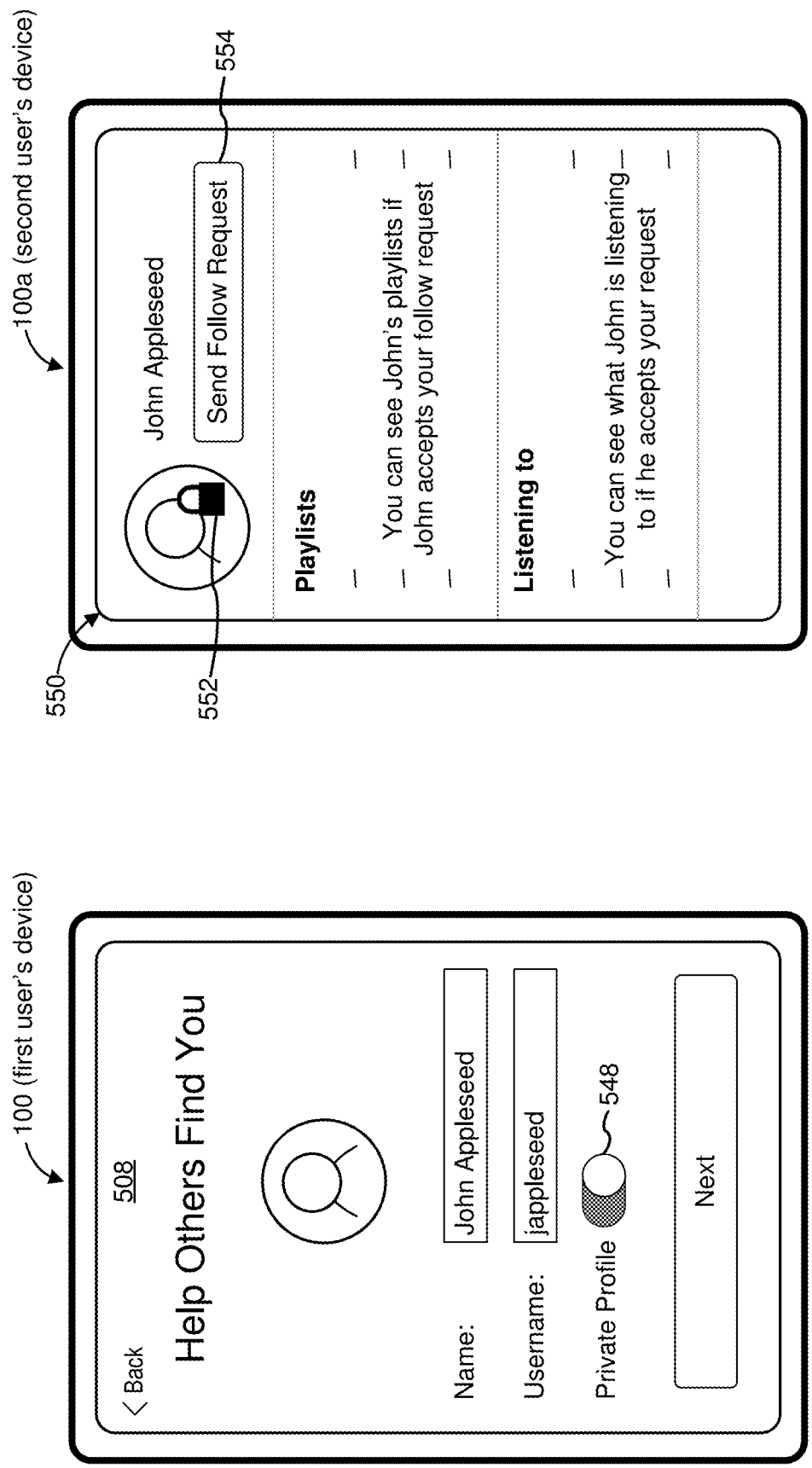
Figure 5P:
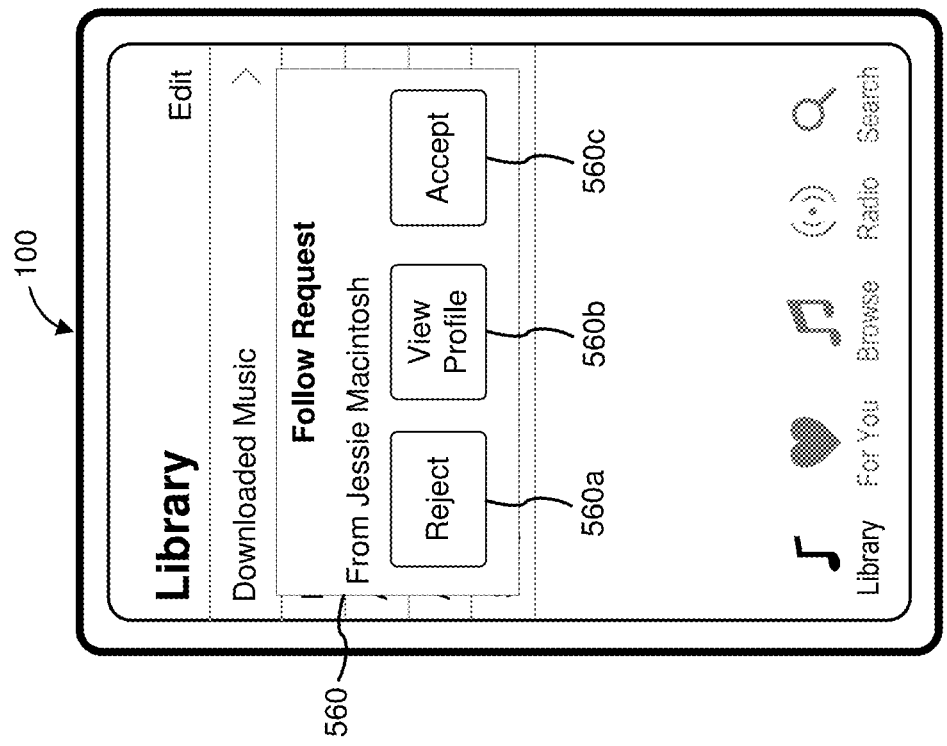
Figure 5O:
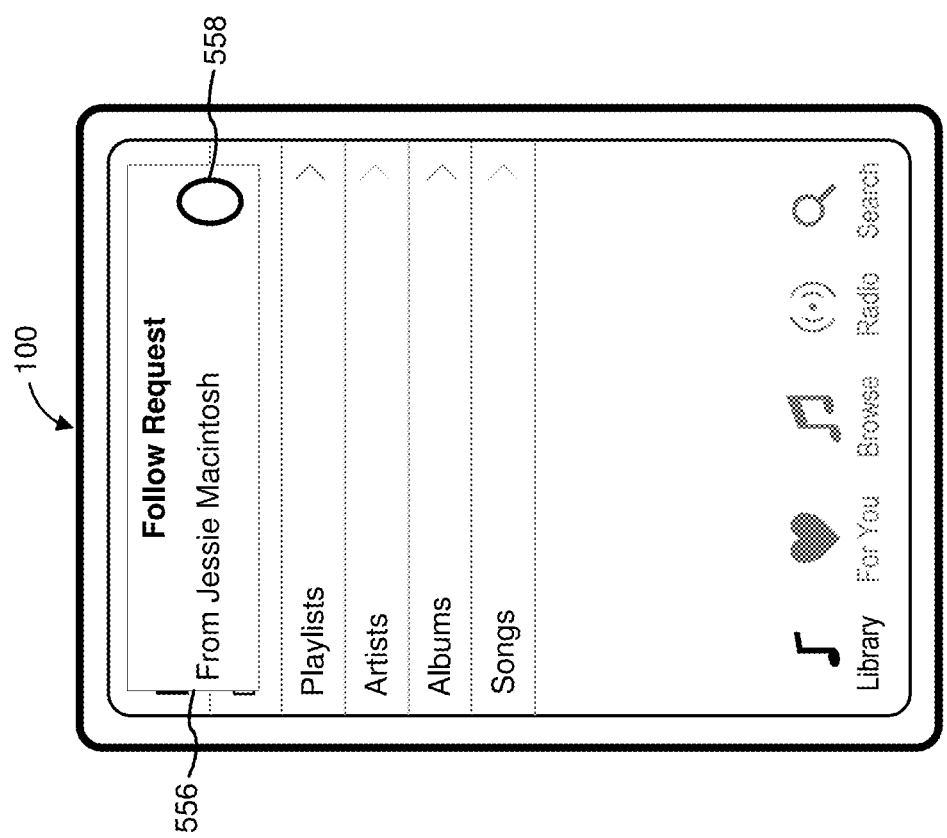
Figure 5R:
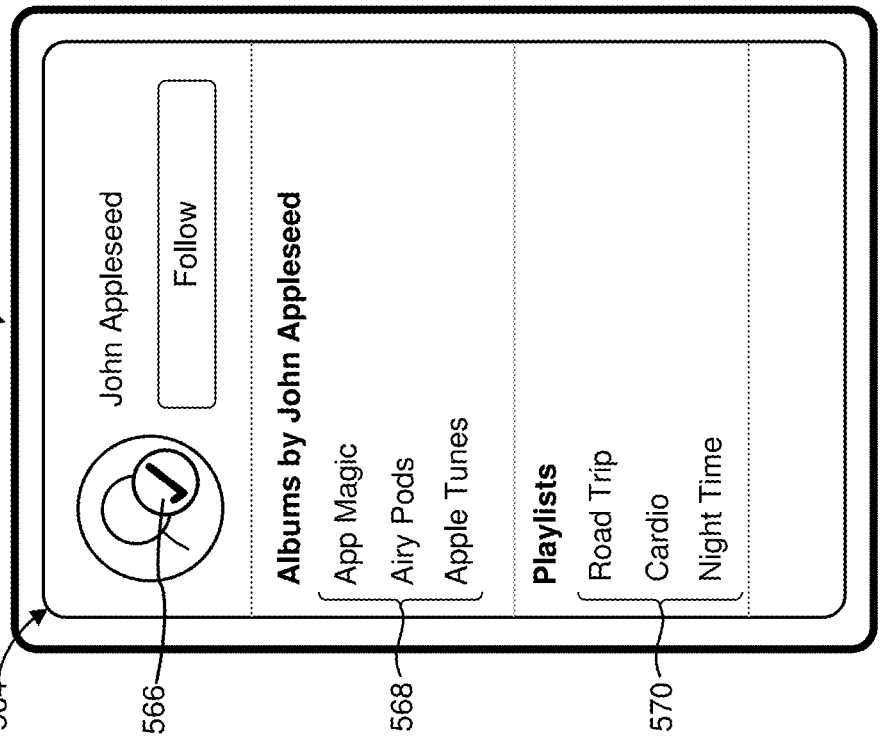
Figure 5Q:
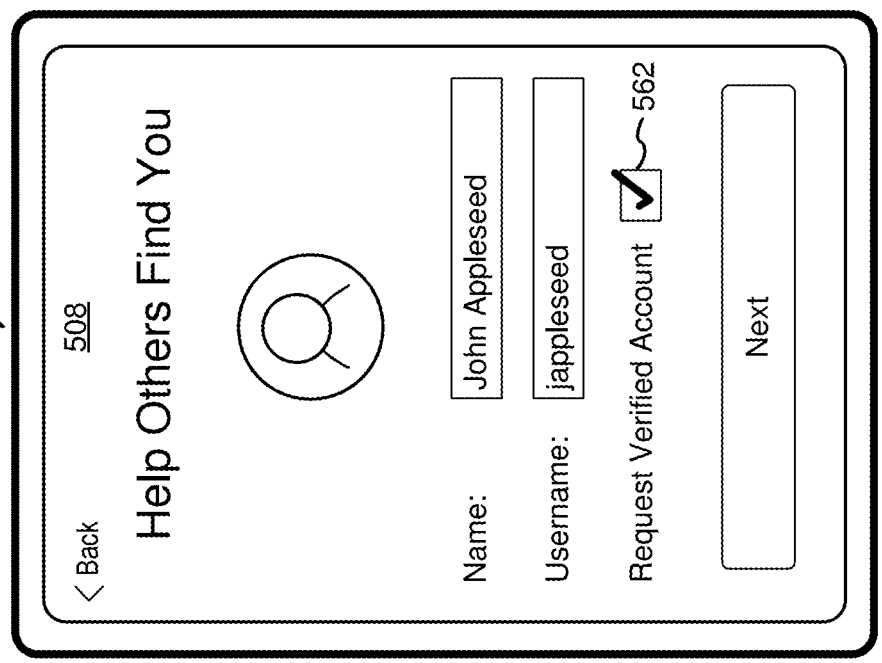
Figure 5T:
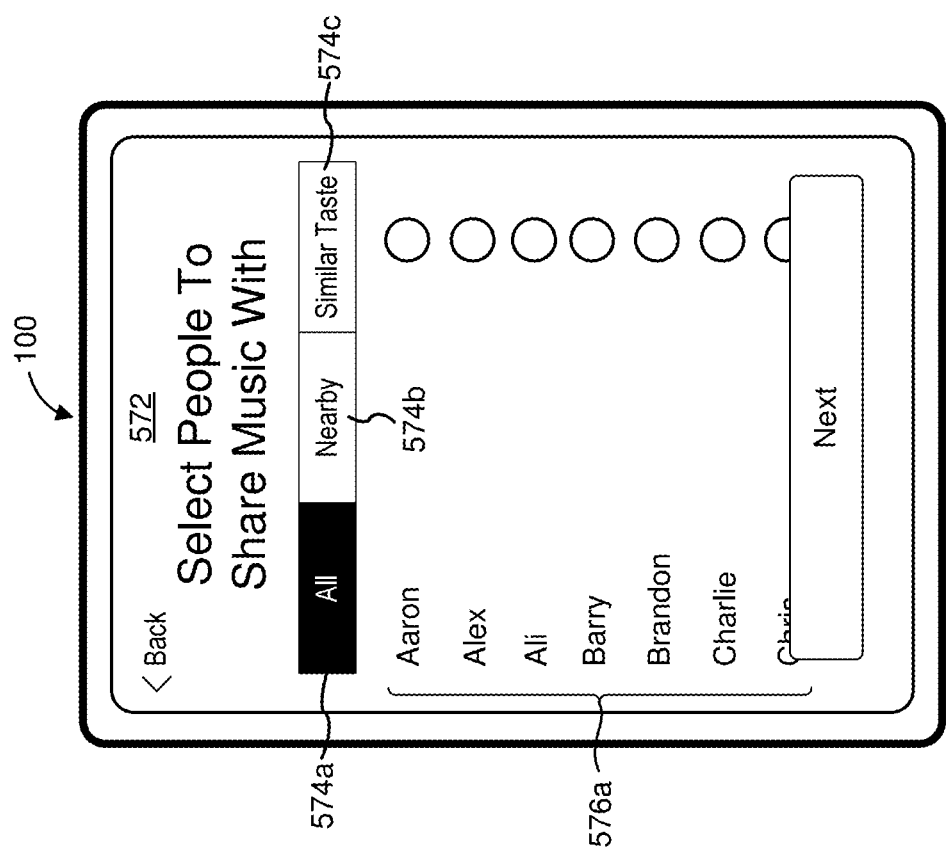
Figure 5S:
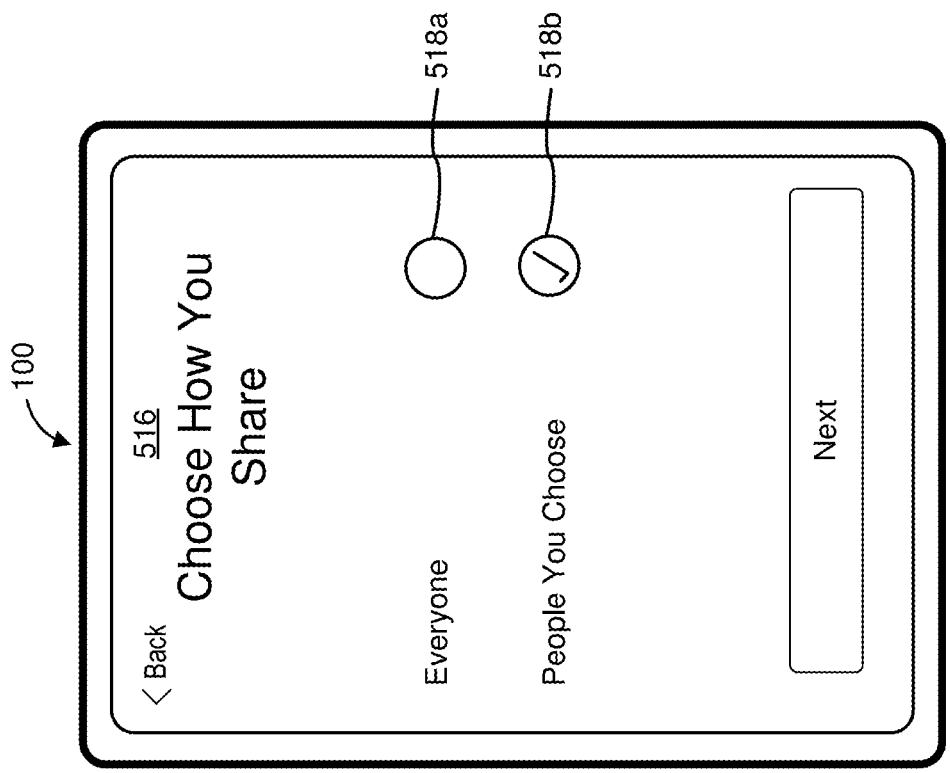
Figure 5V:
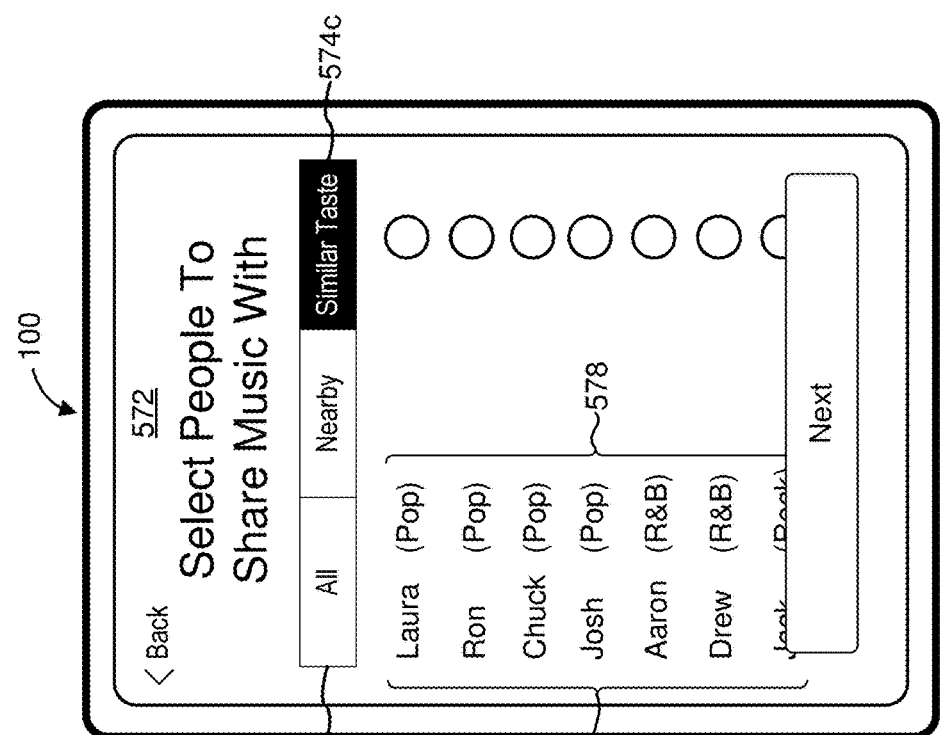
Figure 6D:
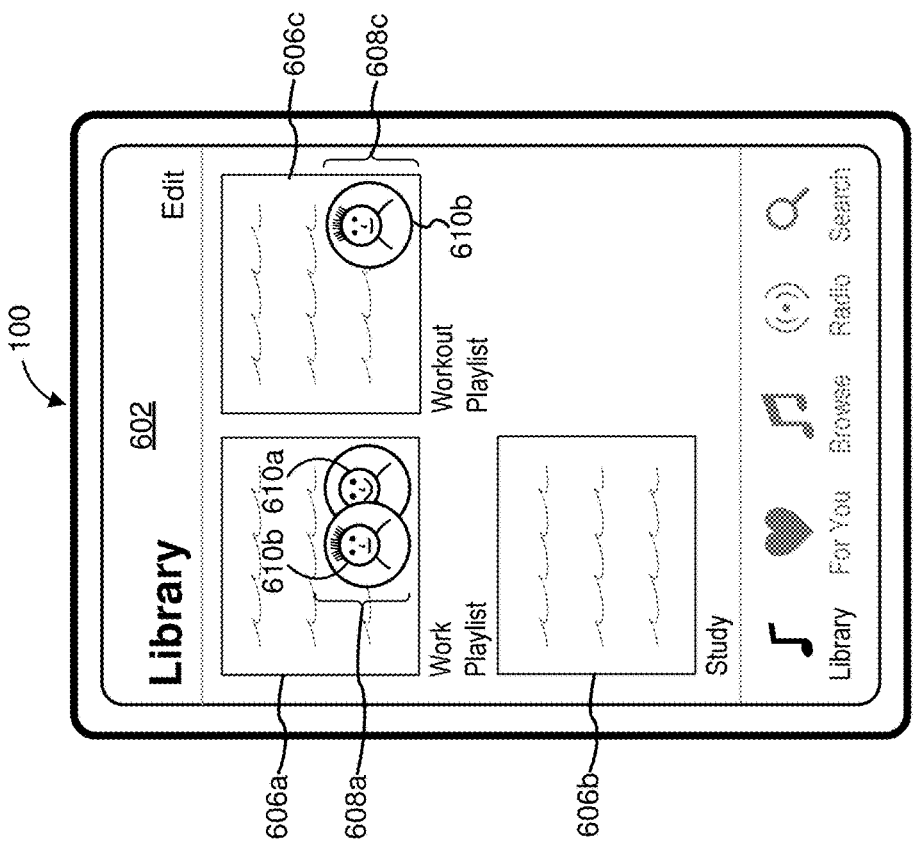
FIGS. 6A-6N illustrate example user interfaces for indicating engagement of other users in accordance with some embodiments.

FIGS. 5A-5V illustrate example user interfaces for sharing music with other users in accordance with some embodiments. The user interfaces in these figures are used to illustrate the processes described below, including the processes in FIGS. 9A-9F. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5F illustrate examples of an enrollment user interface that provides the user with an option to enroll in music sharing, and selectively mark playlists as public or private. In some embodiments, playlists that are marked as public are accessible to other users that have a predetermined relationship with the user of the device 100. In some embodiments, the playlists that are marked as public are presented as music recommendations to the other users. In some embodiments, playlists that are marked as private are not accessible to the other users that have the predetermined relationship with the user of the device 100. In some embodiments, the playlists that are marked as private are not presented as music recommendations to the other users. In some embodiments, the predetermined relationship refers to the user of the device 100 being connected to the other users via a music recommendation engine. In some embodiments, the predetermined relationship refers to the other users having corresponding contact entries in an address book of the user of the device 100.

FIG. 5A illustrates a setup screen 502 that provides the user with an option to enroll for music sharing. In the example of FIG. 5A, the setup screen 502 includes affordances 504a and 504b. The affordance 504a, when activated, triggers enrollment in music sharing. The affordance 504b, when activated, does not trigger enrollment in music sharing. In the example of FIG. 5A, the device 100 receives a user input 506 at a location corresponding to the affordance 504a. The user input 506 corresponds to a request to enroll in music sharing.

FIG. 5B illustrates a profile creation screen 508 that allows the user to create a profile for the user. In some embodiments, the device 100 presents the profile creation screen 508 in response to receiving a request to enroll in music sharing. For example, in some embodiments, the device 100 presents the profile creation screen 508 in response to receiving the user input 506 shown in FIG. 5A. The profile creation screen 508 includes various data fields 510 that allow the user to enter information about the user. In some examples, the data fields 510 allow the user to provide a name of the user, a username for the user, a password, music preferences, or the like.

FIG. 5C illustrates a sharing options screen 516 that provides the user with an option to share music with everyone, or with specific people whom the user chooses. In the example of FIG. 5C, the sharing options screen 516 includes affordances 518a and 518b. The affordance 518a, when activated, allows the user to share music with everyone. In some embodiments, everyone refers to all people that have corresponding contact entries in an address book of the user and that have enrolled for music sharing. In some embodiments, everyone refers to all people who have enrolled for music sharing (e.g., even people who do not have corresponding contact entries in the address book of the user). The affordance 518b, when activated, allows the user to share music with specific people that the user chooses. In the example of FIG. 5C, the affordance 518a is activated. As such, the user has chosen to share music with everyone. In some embodiments, the device 100 presents the sharing options screen 516 after presenting the profile creation screen 508 shown in FIG. 5B. In some embodiments, the user can select one of the affordances 518a and 518b, but not both of the affordances 518a and 518b.

FIG. 5D illustrates a playlist sharing screen 524 that provides the user with an option to change privacy settings for playlists of the user. In the example of FIG. 5D, the playlist sharing screen 524 includes representations 524a, 524b and 524c of playlists ("playlist representations 524a, 524b and 524c", hereinafter for the sake of brevity) of the user. As illustrated in FIG. 5D, the playlist representations 524a, 524b and 524c are associated with respective privacy affordances 526a, 526b and 526c. The privacy affordances 526a, 526b and 526c indicate corresponding privacy settings for the playlists. In the example of FIG. 5D, the privacy affordances 526a, 526b and 526c include toggle switches with two mutually exclusive positions: an ON position corresponding to a public setting in which the playlist is being shared with other users, and an OFF position corresponding to a private setting in which the playlist is not being shared with other users. In the example of FIG. 5D, the privacy affordances 526a, 526b and 526c are set to the OFF position. As such, in the example of FIG. 5D, the playlists 'Date Nite', 'Work' and 'Gym' are private, and are not being shared with other users.

FIGS. 5E-5F illustrate a sequence in which the device 100 receives a user input 528 to change the privacy setting for a playlist of the user. In the example of FIG. 5E, the device 100 receives the user input 528 (e.g., a tap input) at a location corresponding to the privacy affordance 526b that indicates a privacy setting for the 'Work' playlist. In FIG. 5E, the privacy affordance 526b is in the OFF position indicating that the 'Work' playlist is private and not being shared with other users. The user input 528 corresponds to a request to switch the privacy affordance 526b from the OFF position to the ON position. In other words, the user input 528 corresponds to a request to change the privacy setting for the 'Work' playlist from private to public. Put another way, the user input 528 corresponds to a request to share the 'Work' playlist with other users. Displaying the privacy affordances 526a, 526b and 526c allows the user to selectively mark playlists as private or public thereby providing an intuitive and user-friendly experience for sharing music with other users. Displaying the privacy affordances enhances the operability of the device and makes the user-device interface more efficient (e.g., by reducing the need for a sequence of user inputs corresponding to a request to explicitly share the playlists with various users) which, additionally, reduces power usage and improves battery life of the device by enabling the user to use the device more quickly and efficiently.

As illustrated in FIG. 5F, in response to receiving the user input 528 shown in FIG. 5E, the device 100 switches the privacy affordance 526b from the OFF position to the ON position. The ON position of the privacy affordance 526b indicates that the 'Work' playlist is public. Since the user has marked the 'Work' playlist as public, the 'Work' playlist is being shared with other users that have a predetermined relationship with the user of the device 100. For example, the 'Work' playlist is presented as a music recommendation to other users that are connected, via a music recommendation engine and/or a social network, to the user of the device 100. The OFF position of the privacy affordances 526a and 526c indicates that the playlists 'Date Nite' and 'Gym' are private. Since the playlists 'Date Nite' and 'Gym' are private, the playlists 'Date Nite' and 'Gym' are not shared with other users that have the predetermined relationship with the user of the device 100. For example, the playlists 'Date Nite' and 'Gym' are not presented as music recommendations to other users that are connected, via a music recommendation engine and/or a social network, to the user of the device 100. The playlist sharing screen 524 provides the user with an option to make some playlists public while keeping other playlists private.

FIGS. 5G-5H illustrate a sequence in which the device 100 receives a user input 530 to change the privacy setting for all playlists of the user. In the example of FIGS. 5G-5H, the playlist sharing screen 524 includes a playlists representation 524d that represents various playlists of the user (e.g., all playlists of the user, for example, playlists 'Date Nite', 'Work' and 'Gym'). The playlist sharing screen 524 includes a privacy affordance 526d that is associated with the playlists representation 524d. The privacy affordance 526d allows the user to control the privacy setting for all the playlists. In the example of FIG. 5G, the device 100 receives a user input 530 that corresponds to a request to change the privacy setting of all the playlists from private to public. As illustrated in FIG. 5H, in response to receiving the user input 530, the device 100 changes the privacy setting of all the playlists from public to private. In the example of FIG. 5H, the privacy affordances 526a, 526b, 526c and 526d are in the ON position indicating that all the playlists are being shared with other users that have the predetermined relationship with the user of the device 100. Displaying the privacy affordance 526d allows the user to control the privacy setting for multiple playlists (e.g., all the playlists) by providing a single user input thereby improving the efficiency of the device and providing a better user experience. Controlling the privacy setting for multiple playlists (e.g., all the playlists) with a single user input enhances the operability of the device and makes the user-device interface more efficient (e.g., by reducing the need for a sequence of user inputs corresponding to controlling respective privacy settings for the playlists) which, additionally, reduces power usage and improves battery life of the device by enabling the user to use the device more quickly and efficiently.

FIGS. 5I-5J illustrate a sequence in which the device 100 provides the user an option to establish a predetermined relationship with other users. In the example of FIGS. 5I-5J, the device 100 displays a follow screen 534 that includes representations 536a, 536b and 536c of other users and respective follow affordances 538a, 538b and 538c to follow the other users. In some embodiments, the user can access music that is shared by another user by following the other user. In some examples, the user receives music recommendations that include music (e.g., playlists, individual music items) that the other user has shared. In the example of FIG. 5I, the device 100 receives a user input 540 selecting the follow affordance 538a. The user input 540 corresponds to a request to follow the user represented by the representation 536a (e.g., the user input 540 corresponds to a request to follow 'Kelly'). As illustrated in FIG. 5J, in response to receiving the user input 540, the device 100 triggers establishment of a follow relationship between the user and 'Kelly'. The device 100 displays a following badge 542a to indicate that the user is following 'Kelly'. Presenting the follow screen 534 and displaying the follow affordances 538a, 538b and 538c allows the user to receive music recommendations that include music shared by other users thereby reducing the need for a sequence of user inputs corresponding to manually requesting music of other users. Presenting the follow screen with follow affordances for other users enhances the operability of the device and makes the user-device interface more efficient (e.g., by reducing the need for a sequence of user inputs corresponding to requesting music from various other users) which, additionally, reduces power usage and improves battery life of the device by enabling the user to use the device more quickly and efficiently.

Referring to FIG. 5K, the device 100 receives a user input 544 at a location corresponding with the affordance 504b. The user input 544 corresponds to a request to not enroll in music sharing. In response to receiving the user input 544, the device 100 forgoes presentation of the profile creation screen 508 shown in FIG. 5B. FIG. 5L illustrates a notification 546 that reminds the user to enroll for music sharing. In the example of FIG. 5L, the notification 546 includes a banner that is displayed towards the top of the touch-sensitive display. In some embodiments, activating the notification 546 triggers the presentment of the profile creation screen 508 shown in FIG. 5B. More generally, in some embodiments, in response to receiving a user input activating the notification 546, the device 100 initiates a process to enroll the user in music sharing. Presenting the notification 546 reminds the user to enroll in music sharing thereby providing the user with an option to enroll in music sharing even if the user initially decided not to enroll in music sharing. Reminding the user to enroll for music sharing enhances the operability of the device and makes the user-device interface more efficient (e.g., by reducing the need for a sequence of user inputs corresponding to a request to enroll for music sharing) which, additionally, reduces power usage and improves battery life of the device by enabling the user to use the device more quickly and efficiently.

Referring to FIG. 5M, in some embodiments, the profile creation screen 508 provides the user with an option to create a private profile. Creating a private profile allows the user to restrict access to shared music of the user. In the example of FIG. 5M, the profile creation screen 508 includes a private profile affordance 548. As illustrated in FIG. 5M, the private profile affordance 548 includes a toggle switch with two mutually exclusive positions: an ON position that corresponds to a request to create a private profile, and an OFF position that corresponds to a request to create a public profile. In the example of FIG. 5M, the private profile affordance 548 is in the ON position indicating that the user has chosen to create a private profile. Providing the option to create a private profile allows the user to restrict access to shared music of the user.

FIG. 5N illustrates a device 100a that is associated with a second user (e.g., a user different from the user that opted to create a private profile in FIG. 5M). The device 100a displays a user profile 550 for a first user (e.g., the user that opted to create a private profile in FIG. 5M). The user profile 550 includes a private profile indication 552 (e.g., a lock badge). The private profile indication 552 indicates that the user profile 550 is private. In some examples, the user profile 550 obscures at least a portion of the music shared by the first user. In the example of FIG. 5N, the user profile 550 includes a follow request affordance 554 that allows the second user to submit a request to follow the first user. Obscuring the music shared by the first user allows the first user to restrict access to the shared music by requiring other users to submit a follow request thereby providing the first user with more privacy.

Referring to FIG. 5O, in some embodiments, the device 100 associated with a first user displays a follow request notification 556 indicating that a second user has submitted a follow request. In some embodiments, the follow request notification 556 indicates that the second user has requested access to music shared by the first user. In some embodiments, the device 100 displays the follow request notification 556 in response to the second user submitting a follow request (e.g., in response to the second user selecting the follow request affordance 554 shown in FIG. 5N). The device 100 receives a user input 558 selecting the follow request notification 556. In some embodiments, the user input 558 corresponds to a request to expand the follow request notification 556. Displaying the follow request notification 556 provides the user an option to view follow requests from other users. Displaying the follow request notification 556 enhances the operability of the device and makes the user-device interface more efficient (e.g., by reducing the need for a sequence of user inputs corresponding to a request view follow requests from other users) which, additionally, reduces power usage and improves battery life of the device by enabling the user to use the device more quickly and efficiently.

Referring to FIG. 5P, in response to receiving the user input 558 shown in FIG. 5O, the device 100 displays an expanded version 560 of the follow request notification 556. The expanded version 560 provides the user with options to accept the follow request, reject the follow request, and/or view a user profile of the second user. In the example of FIG. 5P, the expanded version 560 includes a reject affordance 560a for rejecting the follow request, a view profile affordance 560b for viewing a user profile of the requestor (e.g., Jessie Macintosh), and an accept affordance 560c for accepting the follow request. Displaying the expanded view 560 with options to reject/accept the follow request and view the user profile of the requestor provides more control and improved privacy to the user.

Referring to FIG. 5Q, in some embodiments, the profile creation screen 508 provides the user with an option to request for a verified account. In some embodiments, a verified account indicates that the user is a verified artist that has created music. In the example of FIG. 5Q, the profile creation screen 508 includes a verify request affordance 562. In some embodiments, the verify request affordance 562 includes a checkbox with two mutually exclusive states: a checked state indicating a request for a verified account, and an unchecked state indicating no request for the verified account. In the example of FIG. 5Q, the verify request affordance 562 is in the checked state indicating that the user has requested for a verified account. In some embodiments, requesting a verified account triggers a verification process to determine whether or not the user satisfies a verification criterion (e.g., whether or not the user is an artist).

FIG. 5R illustrates a device 100a that is associated with a second user (e.g., a user different from the user that opted to request for a verified account in FIG. 5Q). The device 100a displays a user profile 564 for the first user (e.g., the user associated with the device 100 shown in FIG. 5Q). The user profile 564 includes a verified account indication 566 (e.g., a checkmark). The verified account indication 566 indicates that the user profile 564 is verified (e.g., the user profile 564 satisfies a verification criterion, for example, the user profile 564 is for an artist). In some examples, the user profile 564 displays representations 568 of media containers (e.g., music such as music albums, podcasts, audiobooks, etc.) created by the artist. In some embodiments, the user profile 564 displays playlists 570 of the user. Providing the user with an option to request a verified account allows the user to have a distinguished user profile that indicates that the user is an artist thereby providing an improved user experience. Providing an option to request a verified account enhances the operability of the device and makes the user-device interface more efficient (e.g., by reducing the need for a sequence of user inputs corresponding to submitting a request to establish a verified account) which, additionally, reduces power usage and improves battery life of the device by enabling the user to use the device more quickly and efficiently.

Figure 5U:
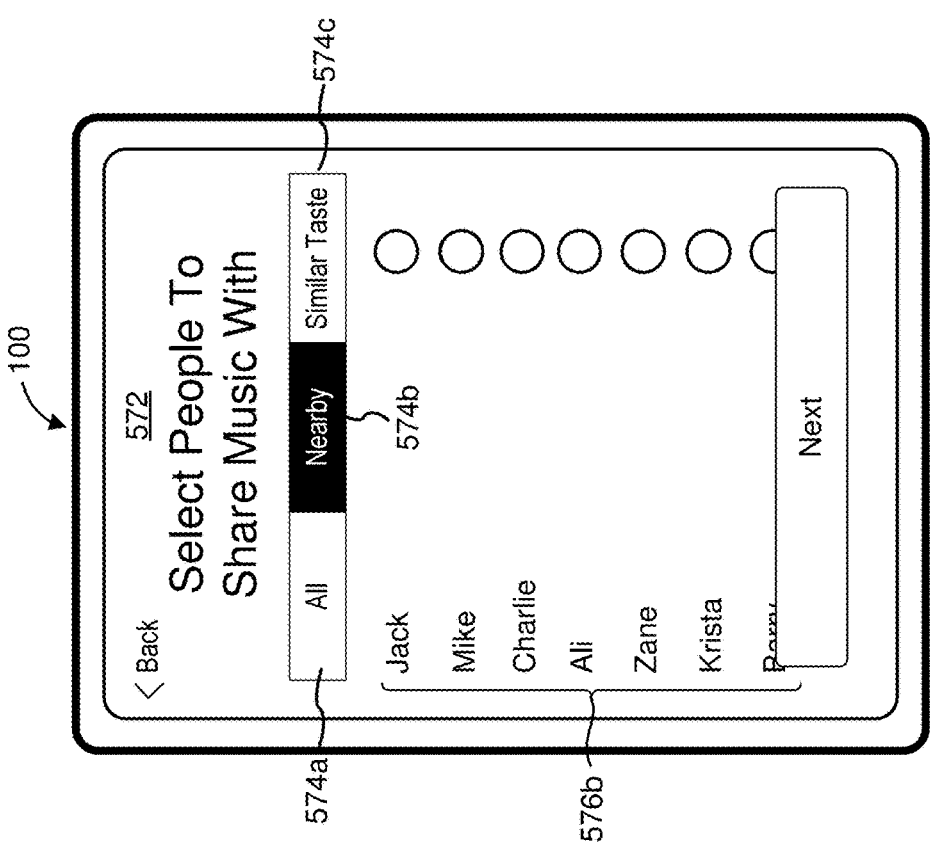

Referring to FIGS. 5S-5V, in FIG. 5S, the sharing options screen 516 indicates that the affordance 518b is activated. The affordance 518b being activated corresponds to a request to share music with specific people that the user chooses (e.g., instead of sharing music with everyone). In response to the affordance 518b being activated, in some embodiments, the device 100 displays a people screen 572 shown in FIG. 5T. The people screen 572 includes affordances 574a, 574b and 574c that, when activated, display corresponding categories of people (e.g., all people, nearby people, or people with similar taste). In the example of FIG. 5T, the affordance 574a is activated. As such, in FIG. 5T, the device 100 displays representations 576a of all people that have corresponding contact entries in an address book of the user. The representations 576a are selectable. As such, the user can select which people the user wants to share music with. In FIG. 5U, the affordance 574b is activated. As such, in FIG. 5U, the device 100 displays representations 576b of contacts that are nearby (e.g., within a threshold distance of the device 100, for example, in the same city or country).

The representations 576b represent a subset of the representations 576a shown in FIG. 5T. In FIG. 5V, the affordance 574c is activated. As such, in FIG. 5V, the device 100 displays representations 576c of contacts that have similar music taste 578 (e.g., contacts that listen to music that is within a degree of similarity to music that the user listens). The representations 576c represent a subset of the representations 576a shown in FIG. 5T. Displaying the representations 576a, 576b and/or 576c provides the user with an option to select the people with whom the user wants to share music with thereby providing the user with more control over music sharing and improving the user experience. Indicating the similar music taste 578 enhances the operability of the device and makes the user-device interface more efficient (e.g., by reducing the need for a sequence of user inputs corresponding to a request to view user profiles of other users in order to discern their music taste 578) which, additionally, reduces power usage and improves battery life of the device by enabling the user to use the device more quickly and efficiently.

FIGS. 6A-6N illustrate examples of a media browsing user interface in accordance with some embodiments. The media browsing user interface in these figures are used to illustrate the processes described below, including the processes in FIGS. 10A-10E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 6A illustrates an example media browsing user interface 602. The media browsing user interface 602 allows the user to browse through various media containers. In some embodiments, a media container refers to a playlist that includes a sequence of media items, an album that includes a collection of media items, and/or an individual media item. In some embodiments, a media item refers to a music item such as a song. In the example of FIG. 6A, the media browsing user interface 602 displays categories of media containers (e.g., downloaded music, playlists, albums, and songs). The device 100 receives a user input 604 at a location corresponding to the playlists. The user input 604 corresponds to a request to display a view of the media browsing user interface 602 that includes the playlists of the user.

FIG. 6B illustrates a view of the media browsing user interface 602 that includes representations for various playlists of the user. In the example of FIG. 6B, the media browsing user interface 602 includes a work playlist representation 606a that represents a 'Work Playlist', a study playlist representation 606b that represents a 'Study Playlist', and a workout playlist representation 606c that represents a 'Workout Playlist'. In some embodiments, other users that have a predetermined relationship with the user have access to the playlists of the user. For example, other users that are connected to the user via a music recommendation engine have access to the playlists of the user. In some embodiments, other users that are following the user via the music recommendation engine have access to the playlists of the user. As such, in some embodiments, the other users engage with the playlists of the user. For example, the other users listen to the playlists of the user.

In some embodiments, the media browsing user interface 602 displays an engagement marker for the representation of a playlist in response to the playlist satisfying engagement criteria. In some embodiments, the engagement criteria of a playlist include a requirement that at least one of the other users with which the user has the predetermined relationship is engaging with the playlist. In some embodiments, engaging with the playlist refers to listening to the playlist, downloading the playlist, sharing the playlist with another user, indicating a preference for the playlist (e.g., liking/loving the playlist), and/or adding the playlist to a media library. In the example of FIG. 6B, the device 100 displays an engagement marker 608a for the work playlist representation 606a. The engagement marker 608a for the work playlist representation 606a indicates that another user with which the user of the device 100 has the predetermined relationship is engaging with the 'Work Playlist' (e.g., the other user is listening to the 'Work Playlist'). In some embodiments, the engagement marker includes a badge that represents the other user that is engaging with the playlist. For example, the badge includes a profile picture of the other user that is engaging with the playlist. As illustrated in FIG. 6B, the engagement marker 608a includes a first badge 610a representing a first other user that is engaging with the work playlist. The engagement marker for a representation of a media container provides an intuitive and user-friendly experience to obtain information regarding engagement of other users with the media container. Displaying engagement markers for media containers enhances the operability of the device and makes the user-device interface more efficient (e.g., by reducing the need for a sequence of user inputs corresponding to a request to display representations of other users that are engaging with the media container) which, additionally, reduces power usage and improves battery life of the device by enabling the user to use the device more quickly and efficiently.

Figure 6C:
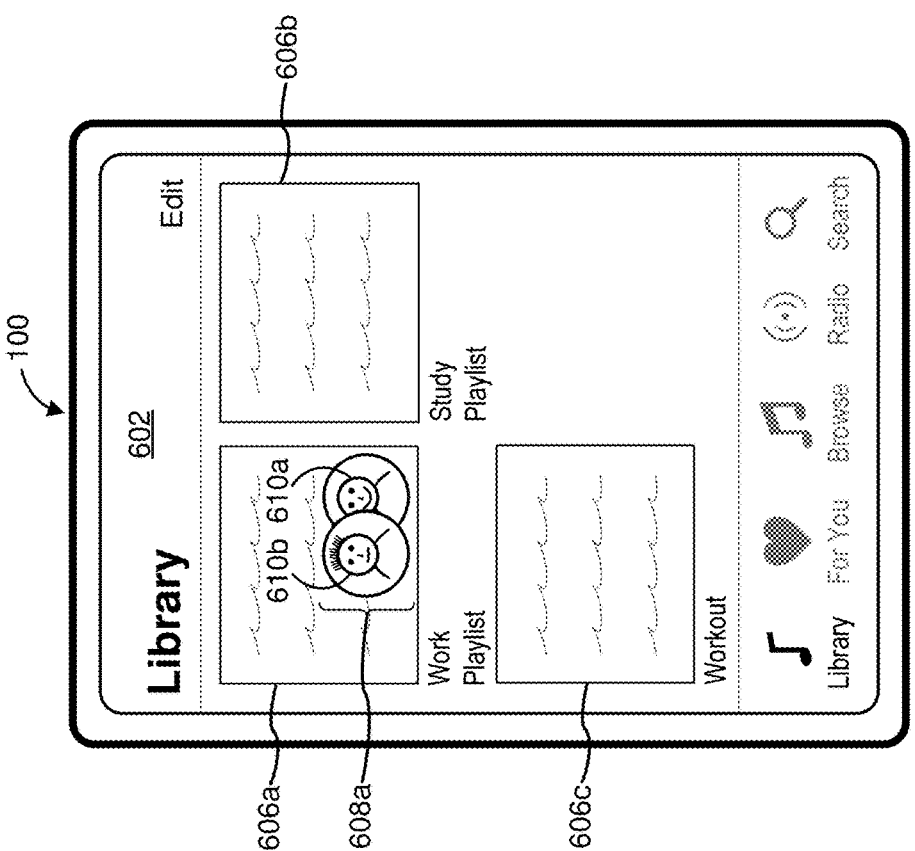

FIG. 6C illustrates that, in some embodiments, the engagement marker for the representation of a media container changes as the engagement with the media container changes. For example, if a number of users engaging with the media container increases from one user to two users, then the engagement marker includes badges representing both the users. In the example of FIG. 6C, the engagement marker 608a for the work playlist representation 606a includes the first badge 610a representing the first other user and a second badge 610b representing a second other user that is engaging with the 'Work Playlist'. Increasing the number of badges included in the engagement marker provides the user an intuitive and user-friendly way to obtain information regarding the number of users that are engaging with the media container. Including badges for different users in the engagement marker for a media container enhances the operability of the device and makes the user-device interface more efficient (e.g., by reducing the need for a sequence of user inputs corresponding to a request to display representations of other users that are engaging with the media container) which, additionally, reduces power usage and improves battery life of the device by enabling the user to use the device more quickly and efficiently.

FIG. 6D illustrates that, in some embodiments, the device 100 arranges (e.g., orders) the representations of the media containers based on respective engagement levels associated with the media containers. For example, in some embodiments, the device 100 arranges the representations of the media containers based on respective numbers of other users that are engaging with the media containers (e.g., based on respective numbers of badges). In the example of FIG. 6D, the 'Workout Playlist' representation 606c includes an engagement marker 608c. The engagement marker 608c indicates that another user with which the user of the device 100 has the predetermined relationship is engaging with the 'Workout Playlist'. The engagement marker 608c includes the second badge 610b representing the second other user. In the example of FIG. 6D, the second other user is engaging with the 'Work Playlist' and the 'Workout Playlist'. The ordering of the playlist representations 606a, 606b and 606c is different in FIGS. 6C and 6D. In the examples of FIGS. 6C-6D, the playlist representations 606a, 606b and 606c are ordered based on the number of users that are engaging with the playlists. Ordering the representations of media containers based on their respective engagement levels indicates which media containers are being engaged with the most, thereby providing a better user experience. Ordering the representations of media containers based on their respective engagement levels enhances the operability of the device and makes the user-device interface more efficient (e.g., by reducing the need for a user input that corresponds to scrolling through the representations in order to find media containers with highest/lowest engagement levels) which, additionally, reduces power usage and improves battery life of the device by enabling the user to use the device more quickly and efficiently.

Figure 6F:
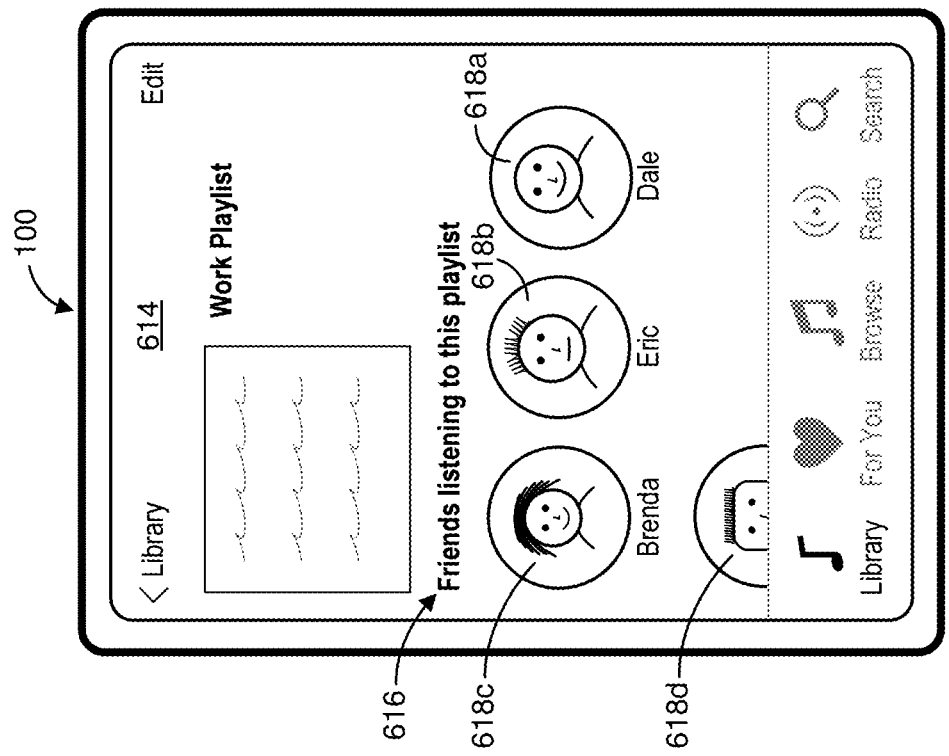
Figure 6E:
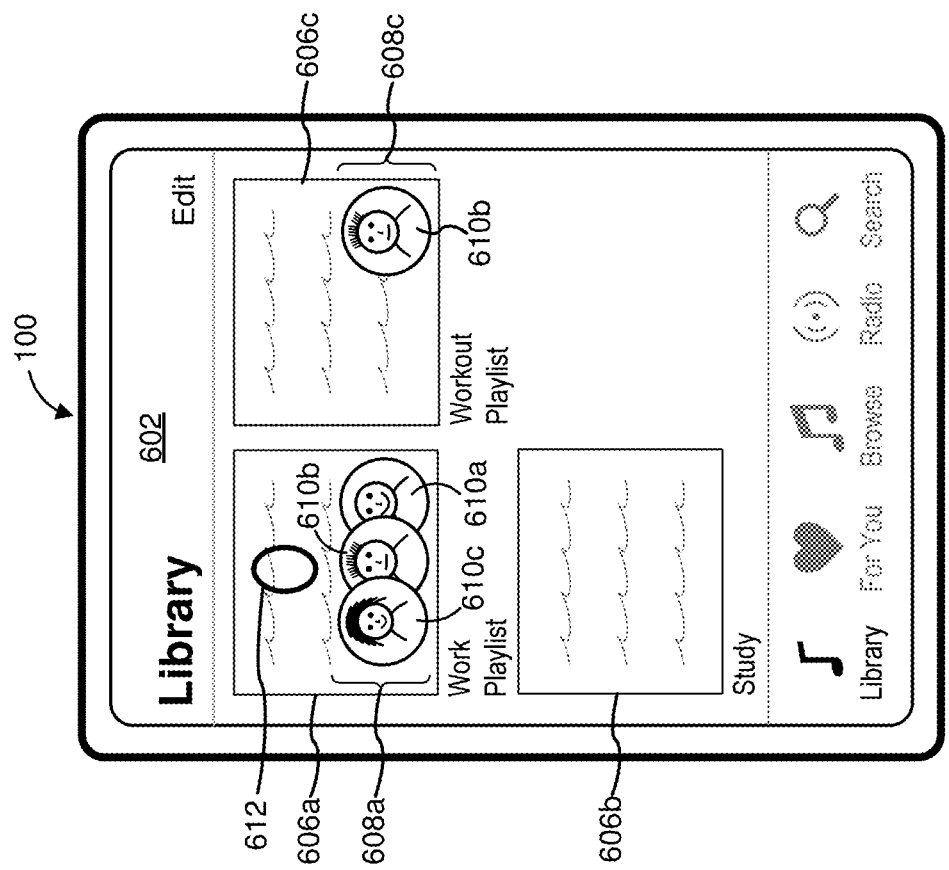

In the example of FIG. 6E, the engagement marker 608a for the 'Work Playlist' representation 606a includes a third badge 610c that represents a third other user that is engaging with the 'Work Playlist'. In FIG. 6E, the device 100 receives a user input 612 selecting the work playlist representation 606a. In some embodiments, the user input 612 corresponds to a request to display information regarding the 'Work Playlist'. In the example of FIG. 6E, the device 100 receives the user input 612 at a location that corresponds to the work playlist representation 612. Referring to FIG. 6F, in response to receiving the user input 612, the device 100 displays a playlist screen 614 that includes information regarding the 'Work Playlist'. The playlist screen 614 includes engagement information 616 for the 'Work Playlist'. The engagement information 616 indicates which other users that are in the predetermined relationship with the user of the device 100 are engaging with the 'Work Playlist'. In the example of FIG. 6F, the engagement information 616 includes enlarged badges 618a, 618b, 618c and 618d that represent the other users that are engaging with the 'Work Playlist'. Some of the enlarged badges displayed within the engagement information 616 are enlarged versions of badges that are displayed on the playlist representation. For example, the enlarged badges 618a, 618b and 618c are enlarged versions of the badges 610a, 610b and 610c, respectively, which are displayed on the work playlist representation 606a. Displaying the enlarged badges 618a, 618b, 618c and 618d provides the user an intuitive and user-friendly way to know which of the other users are engaging with the 'Work Playlist'. Displaying the engagement information 616 for a media container enhances the operability of the device and makes the user-device interface more efficient (e.g., by reducing the need for a sequence of user inputs corresponding to a request to display a list of other users that are engaging with the media container) which, additionally, reduces power usage and improves battery life of the device by enabling the user to use the device more quickly and efficiently.

In the example of FIG. 6F, the device 100 displays four enlarged badges (e.g., enlarged badges 618a, 618b, 618c and 618d) within the engagement information 616 of the 'Work Playlist'. As such, in the example of FIG. 6F, four other users are engaging with the 'Work Playlist'. However, in FIG. 6E, the device 100 only displays three badges (e.g., badges 610a, 610b and 610c). In some embodiments, the device 100 limits the number of badges that are displayed as part of an engagement marker. In the example of FIG. 6E, the device 100 limited the number of badges to three. In some examples, the device 100 displays badges representing other users that are engaging the most with the media container. For example, in FIG. 6E, the device 100 displays badges 610a, 610b and 610c representing Dale, Eric and Brenda, respectively, because Dale, Eric and Brenda are engaging with the work playlist more than other users. Limiting the number of badges avoids cluttering the media browsing user interface 602 thereby provides a user-friendly experience.

Figure 6H:
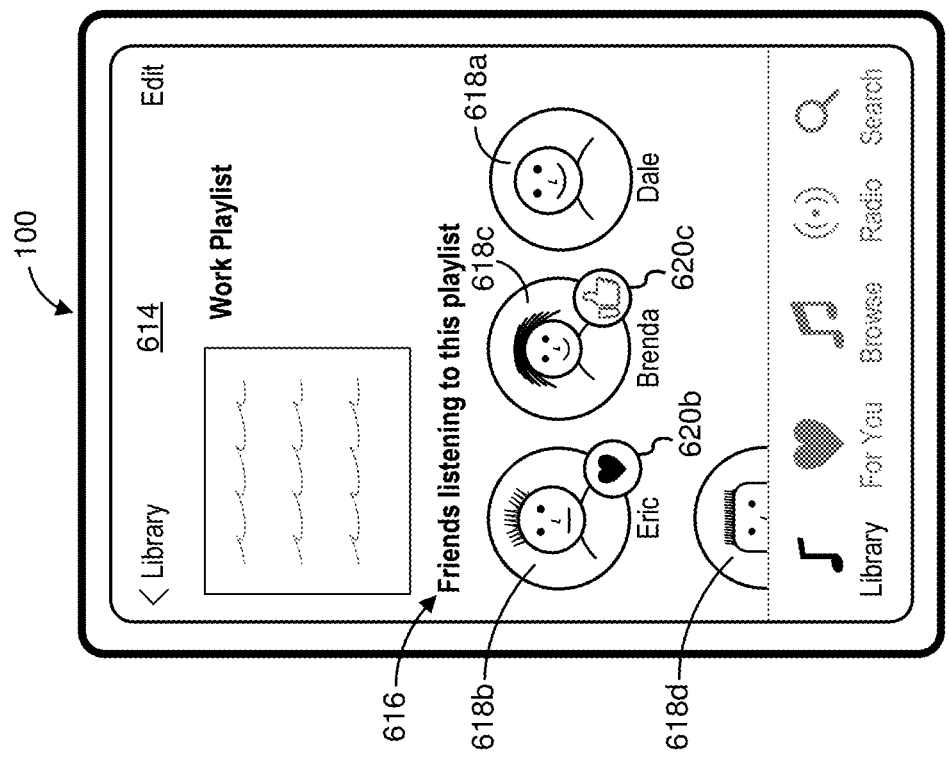
Figure 6G:
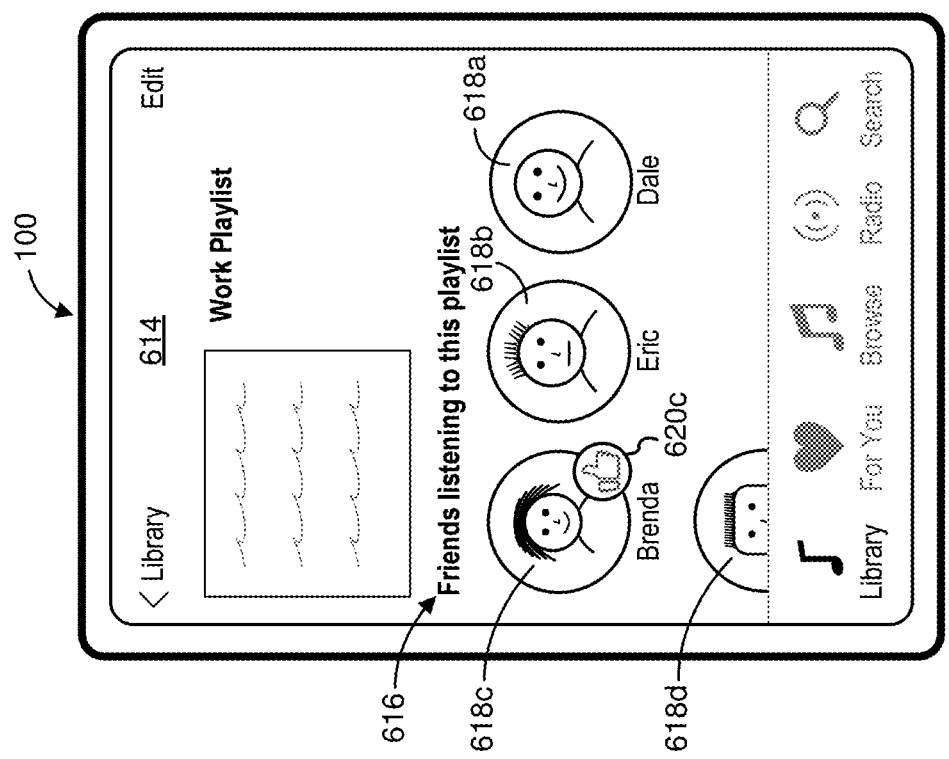

FIGS. 6G-6H illustrate examples of engagement type indicators. As described herein, in some embodiments, one of the other users engages with a media container by indicating a preference for the media container. In some examples, the other user engages with the media container by indicating that the other user likes the media container. In some examples, the other user engages with the media container by indicating that the other user loves the media container. More generally, in various embodiments, the other user indicates a preference for a container by assigning a preference score to the media container. In some embodiments, a first preference score corresponds to the other user liking the media container, and a second preference score corresponds to the other user loving the media container. In the example of FIG. 6G, the device 100 displays an engagement type indicator 620c in association with the enlarged badge 618c representing 'Brenda'. For example, the engagement type indicator 620c is at least partially overlaid onto the enlarged badge 618c representing 'Brenda'. The engagement type indicator 620c includes a 'thumbs-up' symbol to indicate that 'Brenda' likes the 'Work Playlist'. In some embodiments, the 'thumbs-up' symbol indicates that 'Brenda' has assigned a first preference score to the work playlist. Displaying the engagement type indicator provides the user an intuitive and user-friendly way to obtain information regarding the type of engagement associated with a media container. Providing information regarding the type of engagement by displaying the engagement type indicator enhances the operability of the device and makes the user-device interface more efficient (e.g., by reducing the need for a sequence of user inputs corresponding to a request to view the type of engagement) which, additionally, reduces power usage and improves battery life of the device by enabling the user to use the device more quickly and efficiently.

As described herein, in various embodiments, the engagement information for a media container (e.g., the engagement information 616 for the 'Work Playlist') includes representations of other users that are engaging with the media container (e.g., the engagement information 616 includes the enlarged badges 618a . . . 618d). In some embodiments, the representations of the other users are arranged (e.g., ordered) based on respective types of engagements associated with the other users. In the example of FIG. 6H, the device 100 displays an engagement type indicator 620b in association with the enlarged badge 618b representing 'Eric'. The engagement type indicator 620b includes a 'heart' symbol to indicate that 'Eric' loves the 'Work Playlist'. In some embodiments, the 'heart' symbol indicates that 'Eric' has assigned a second preference score to the 'Work Playlist'. In some embodiments, the second preference score that 'Eric' assigned to the 'Work Playlist' is higher than the first preference score that 'Brenda' assigned to the 'Work Playlist'. In some embodiments, the device 100 orders the representations of the users based on the respective preference scores assigned to the media container by the users. As such, in the example of FIG. 6H, the device 100 orders the enlarged badges such that the enlarged badge 618b representing 'Eric' appears before the enlarged badge 618c representing 'Brenda'. Ordering the representations of the other users (e.g., the badges representing the other users, for example, the enlarged badges 618a . . . 618d) based on the respective types of engagements (e.g., the engagement type indicators 620b and 620c) provides the user an intuitive and user-friendly way to obtain information regarding the types of engagement associated with the media container (e.g., the work playlist). Ordering the representations of the other users based on the respective types of engagement enhances the operability of the device and makes the user-device interface more efficient (e.g., by reducing the need for a user input that corresponds to scrolling through the representations in order to view representations of users that are associated with a particular type of engagement) which, additionally, reduces power usage and improves battery life of the device by enabling the user to use the device more quickly and efficiently.

Figure 6I:
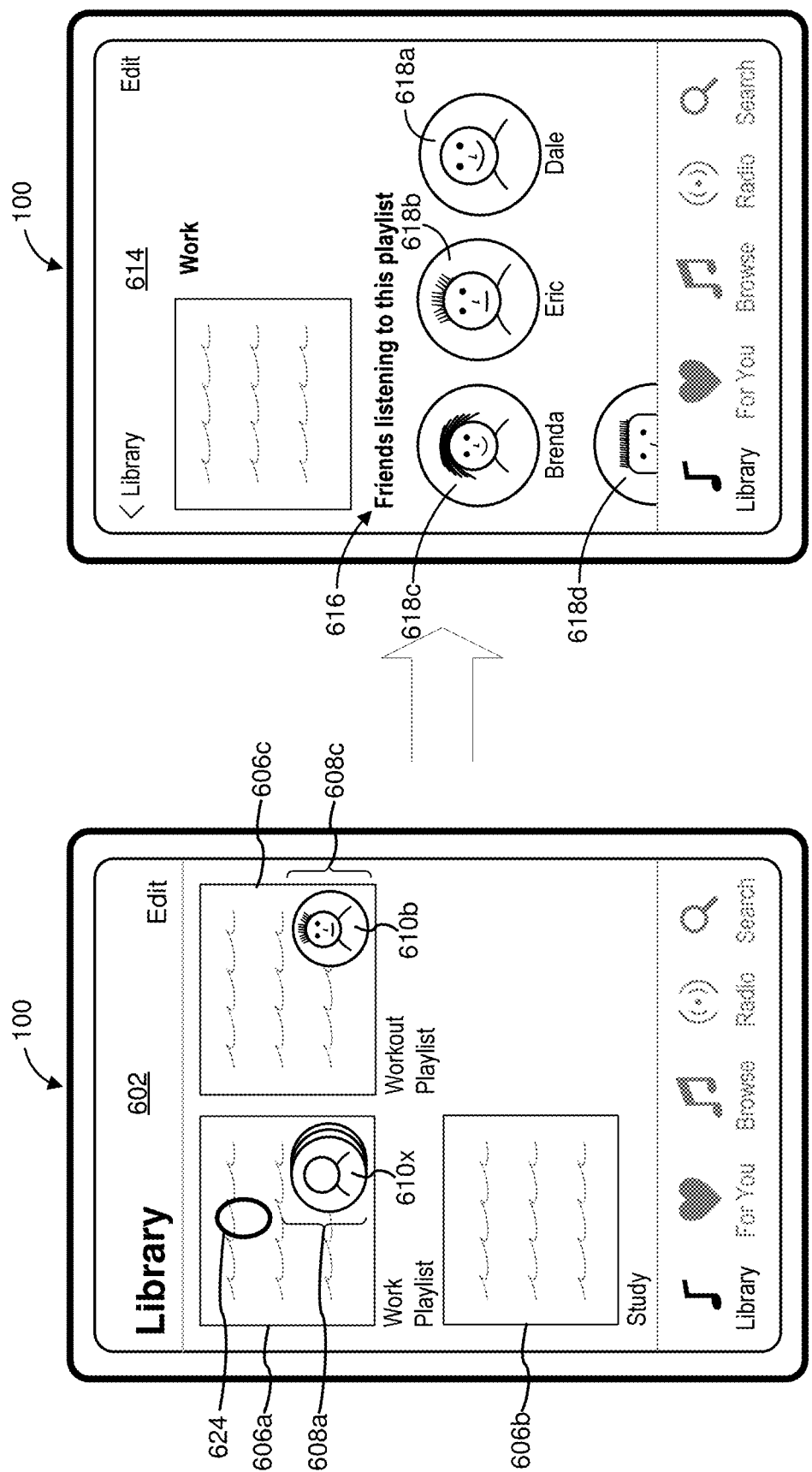

In the example of FIG. 6I, the engagement marker 608a for the work playlist representation 606a includes a generic badge 610x that represents a group of other users that are engaging with the 'Work Playlist' (e.g., instead of displaying the badge 610a (shown in FIG. 6B) representing an individual user that is engaging with the 'Work Playlist'). In some embodiments, the device 100 displays the generic badge 610x when the number of users engaging with the media container is greater than a threshold number (e.g., 3, 5, 10, etc.). The device 100 receives a user input 624 selecting the work playlist representation 606a. In response to receiving the user input 624, the device 100 displays the playlist screen 614 that includes information regarding the 'Work Playlist'. As illustrated in FIG. 6I, there are four other users engaging with the 'Work Playlist'. Displaying the generic badge 610x (e.g., instead of displaying four badges representing the four users engaging with the 'Work Playlist') provides a legible indication that numerous users are engaging with the work playlist.

Figure 6K:
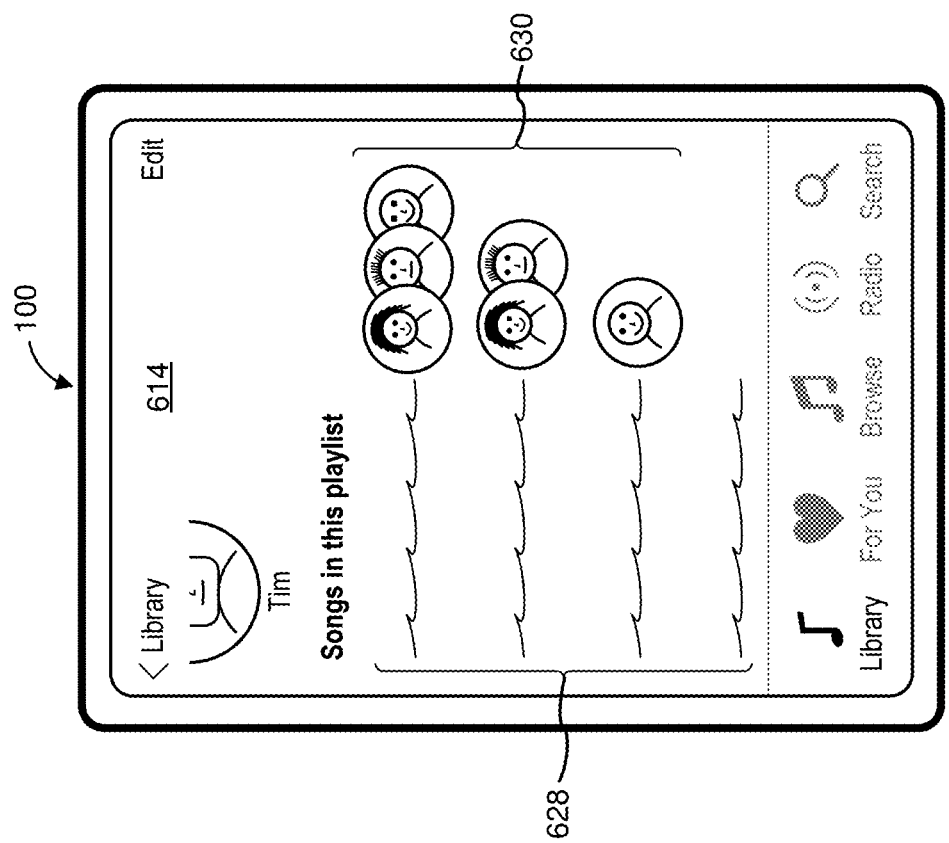
Figure 6J:
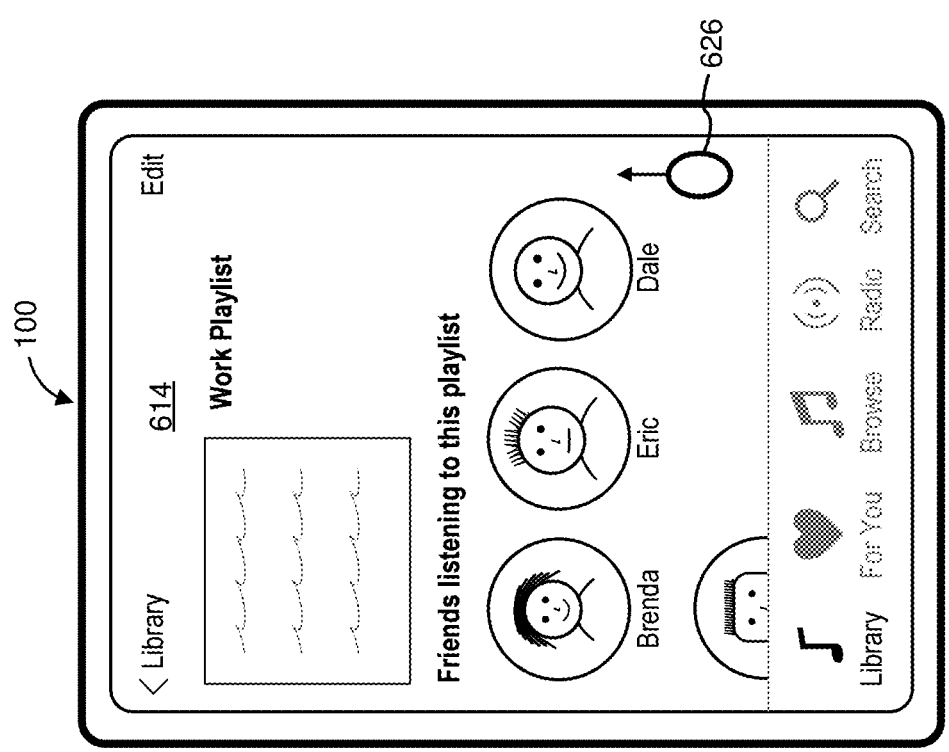

Referring to FIG. 6J, the device 100 receives a user input 626 that corresponds to a request to view more information regarding the work playlist. In some embodiments, the user input 626 includes a swipe-up gesture (e.g., the device 100 detects movement of a contact on the touch-sensitive display in an upward direction). As illustrated in FIG. 6K, in response to receiving the user input 626, the device 100 displays representation 628 of media items ("media item representations 628", hereinafter for the sake of brevity). In the example of FIG. 6K, the media items include songs and the media item representations 628 include representations of the songs. In some embodiments, the device 100 displays engagement markers 630 for at least some of the media item representations 628. The engagement markers 630 indicate the engagement of other users with corresponding media items. In some embodiments, the device 100 arranges (e.g., orders) the media item representations 628 based on respective engagement levels associated with the corresponding media items. For example, the media item representations 628 for media items with which more users are engaging are displayed above media item representations 628 for media items with which fewer or no users are engaging. Displaying the engagement markers for the media item representations 628 provides the user with an intuitive and user-friendly interface to obtain information regarding engagement of other users with individual media items in the media container. Displaying engagement markers for the media items enhances the operability of the device and makes the user-device interface more efficient (e.g., by reducing the need for a sequence of user inputs corresponding to a request to display representations of other users that are engaging with a particular media item) which, additionally, reduces power usage and improves battery life of the device by enabling the user to use the device more quickly and efficiently.

Figure 6L:
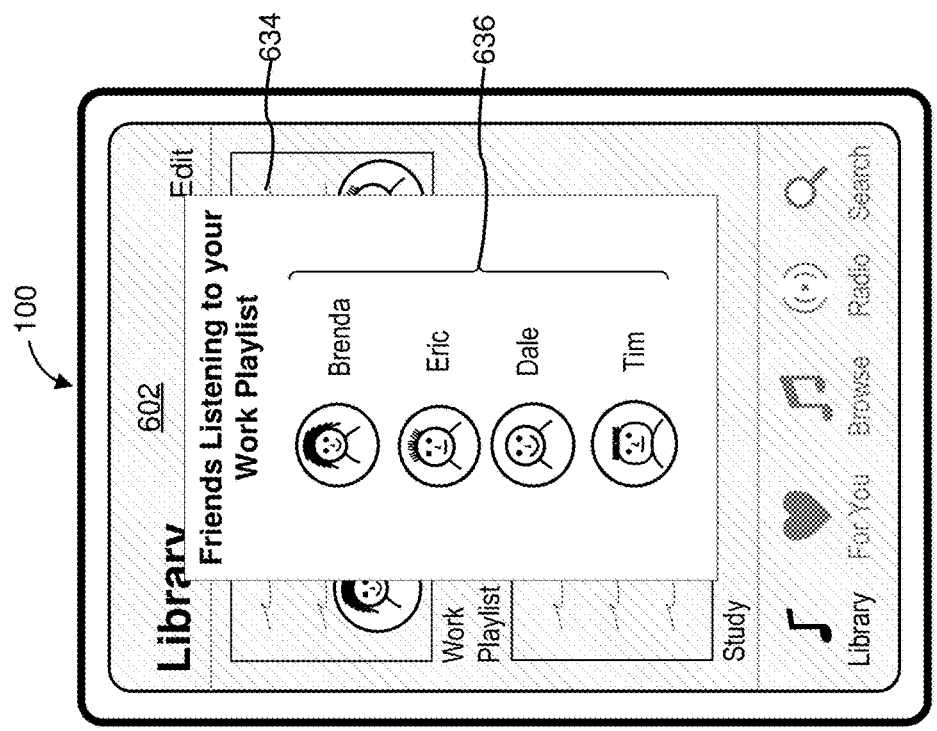
Figure 6L:
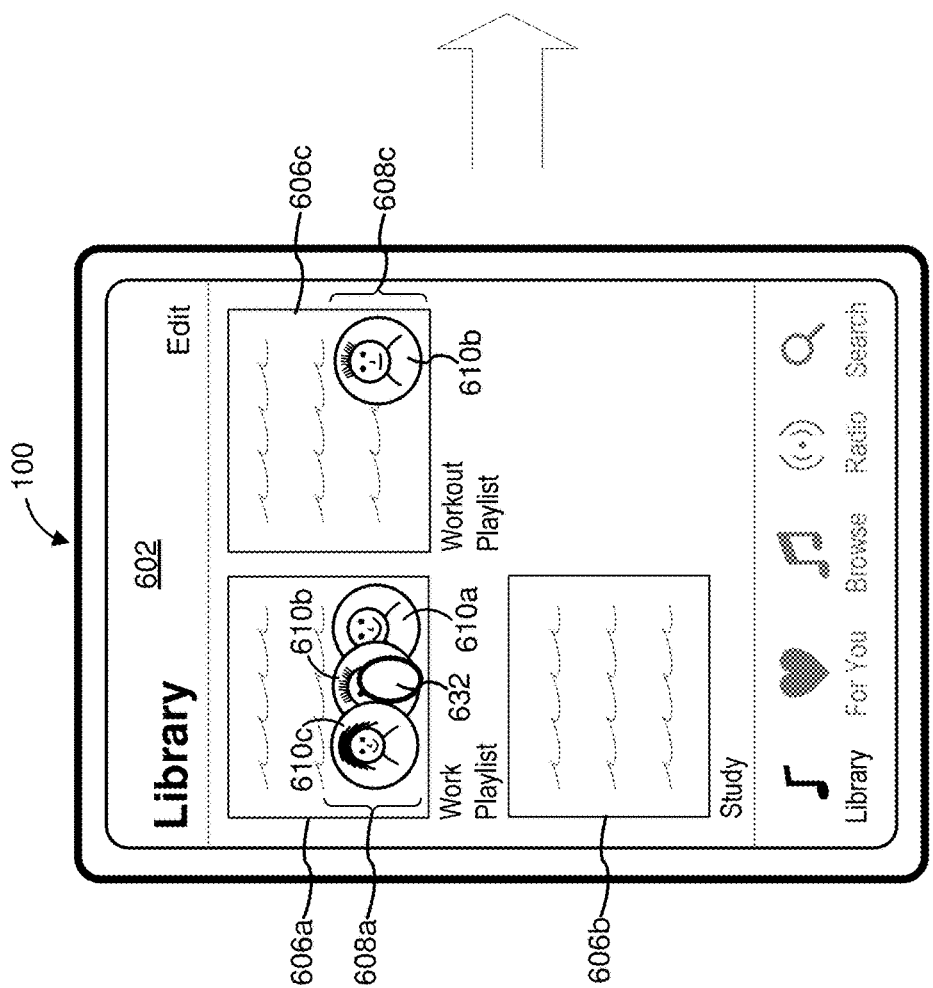
Figure 6N:
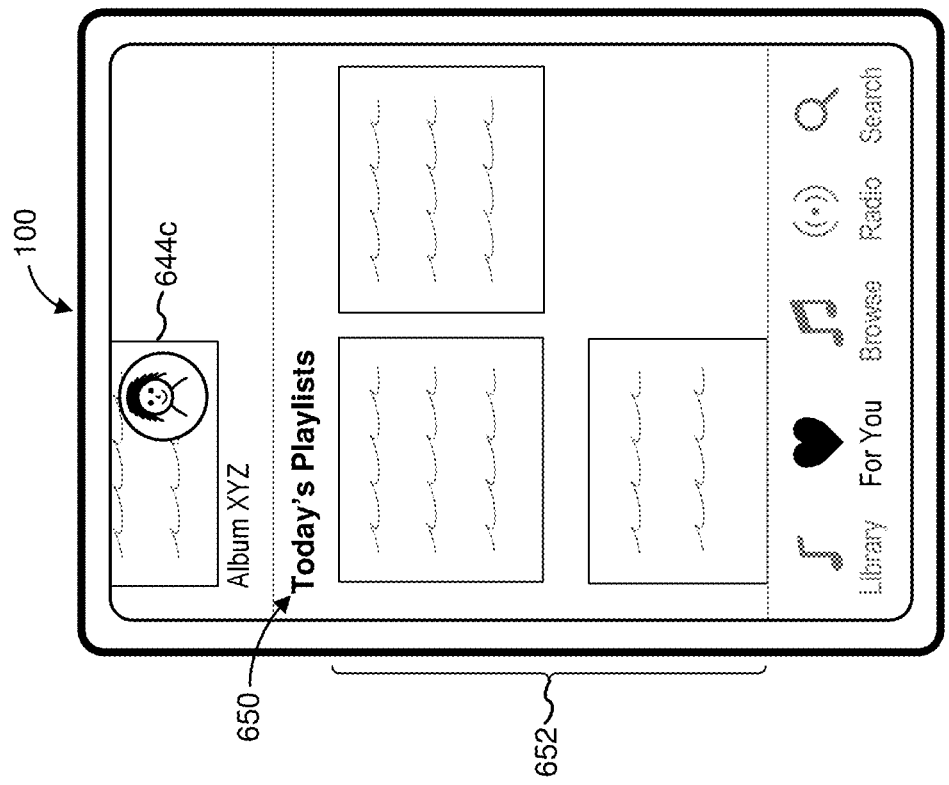

In the example of FIG. 6L, the device 100 receives a user input 632 at a location corresponding to the engagement marker 608a for the work playlist representation 606a. For example, in some embodiments, the device 100 receives the user input 632 at a location corresponding to one or more of the badges 610a, 610b and 610c included in the engagement marker 608a. As described herein, in some embodiments, the number of badges in the engagement marker is limited to a threshold number (e.g., three). As such, in some embodiments, the user input 632 corresponds to a request to view a list of users that are engaging with the work playlist. In response to receiving the user input 632, the device 100 displays an overlay 634 that includes a list 636 of users that are engaging with the 'Work Playlist'. Displaying the list 636 provides the user with engagement information 616 of other users with the 'Work Playlist'.

Figure 6M:
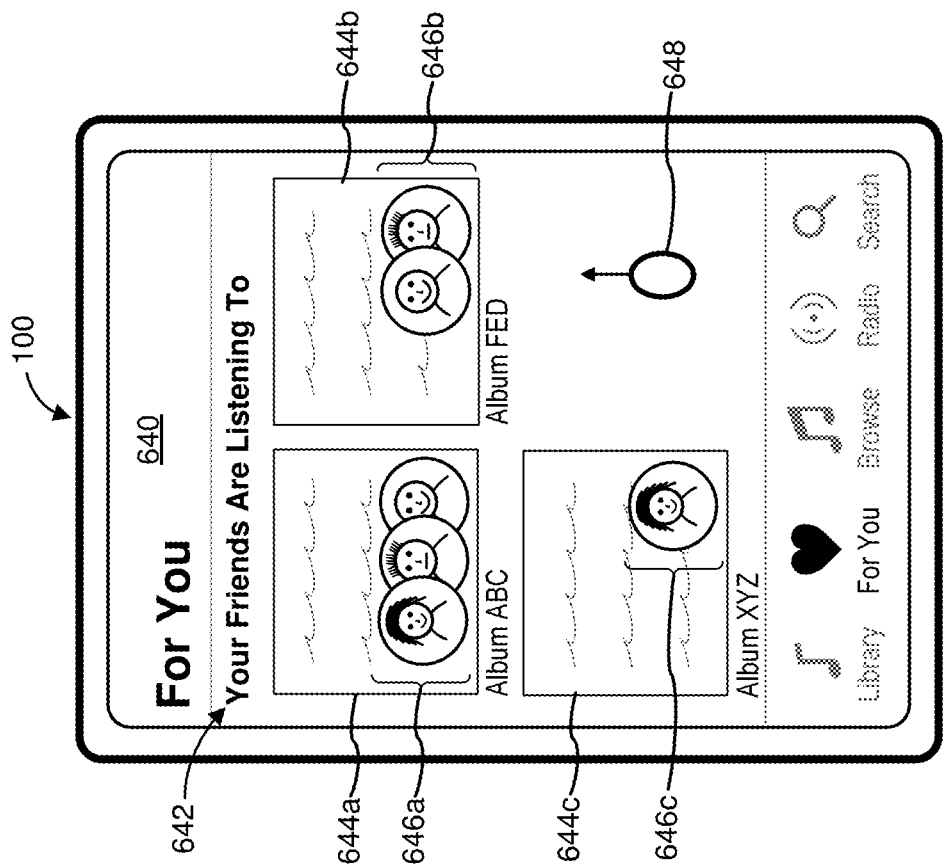

FIG. 6M illustrates an example media recommendation screen 640 that provides media recommendations to the user. In the example of FIG. 6M, the media recommendation screen 640 includes a social recommendation section 642 that recommends media containers that satisfy engagement criteria for the user of the device 100. In some embodiments, a media container satisfies the engagement criteria if other users with whom the user of the device 100 has a predetermined relationship have engaged with the media container. In the example of FIG. 6M, the social recommendation section 642 includes representations 644a, 644b and 644c for albums ("album representations 644a, 644b and 644c", hereinafter for the sake of brevity) that satisfy the engagement criteria. The album representations 644a, 644b and 644c include engagement markers 646a, 646b and 646c indicating that other users are engaging with the albums. As illustrated in FIG. 6M, in some embodiments, the social recommendation section 642 only recommends a media container if other users with which the user of the device 100 has the predetermined relationship are engaging with the media container. Displaying the social recommendation section 642 provides the user with an intuitive and user-friendly interface to view recommended media containers that other users, with which the user of the device 100 has the predetermined relationship, are engaging with. Displaying the social recommendation section 642 enhances the operability of the device and makes the user-device interface more efficient (e.g., by reducing the need for a sequence of user inputs corresponding to transmitting requests to other users for music that the other users are listening to) which, additionally, reduces power usage and improves battery life of the device by enabling the user to use the device more quickly and efficiently.

In the example of FIG. 6M, the device 100 receives a user input 648 that corresponds to a request to view additional media recommendations. In some embodiments, the user input 648 includes a swipe-up gesture. As illustrated in FIG. 6N, in response to receiving the user input 648, the device 100 displays a curated recommendation section 650 that includes representations 652 for various media containers (e.g., playlists). In some embodiments, the curated recommended section 650 is updated periodically (e.g., daily). As such, in some embodiments, the representations 652 change periodically (e.g., daily). The representations 652 do not include engagement markers, for example, because the corresponding media containers are not selected based on the engagement of other user with the media containers. Displaying the curated recommendation section 650 allows the user to view media recommendations that are not based on the engagement of other users thereby allowing the user to explore different music and providing an enriched user experience.

FIGS. 7A-7T illustrate example user interfaces that display representations of media containers that are marked as having been recently played by a user. The user interfaces in these figures are used to illustrate the processes described below, including the processes in FIGS. 11A-11D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 7B:
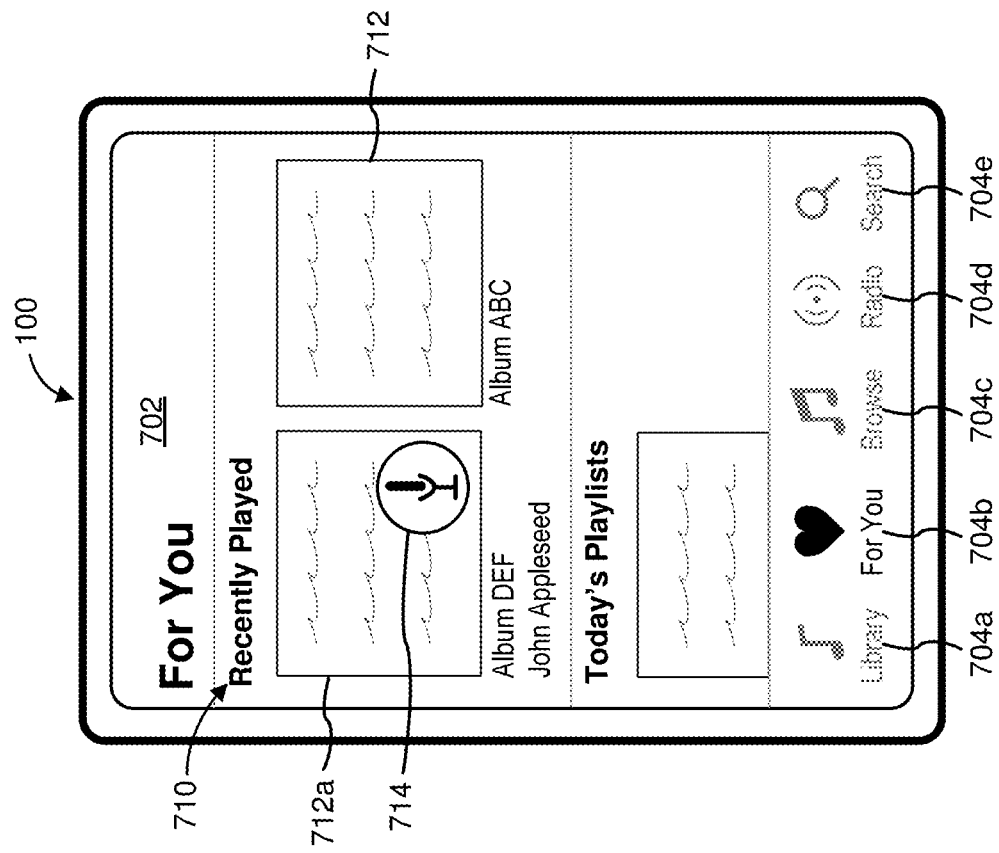
FIGS. 7A-7T illustrate example user interfaces that display representations of media containers that are marked as having been recently played by a user in accordance with some embodiments.
Figure 7A:
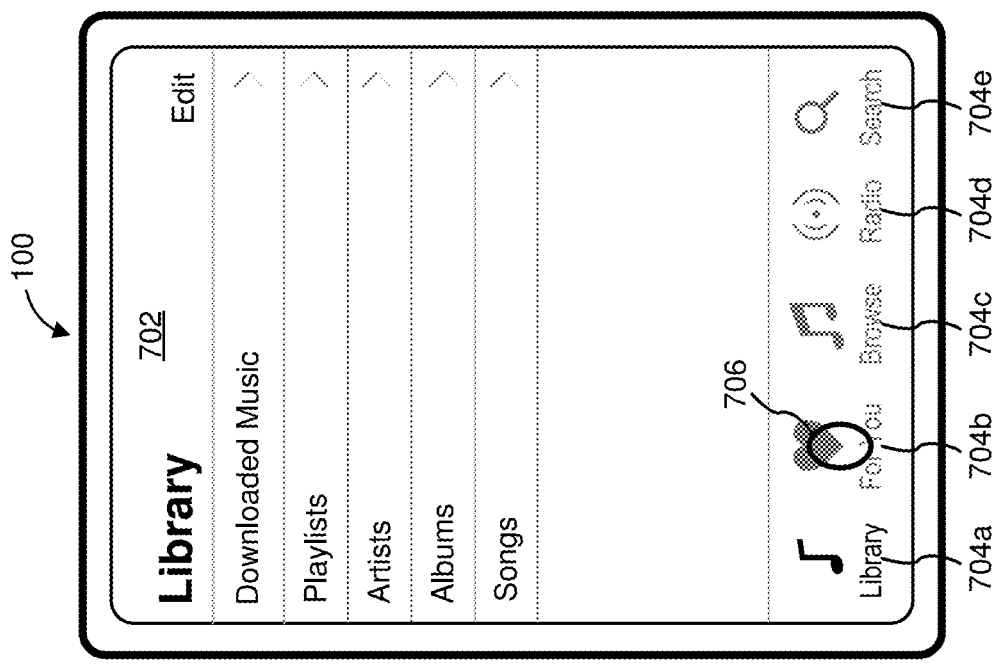

FIGS. 7A-7B illustrate a sequence in which the device 100 receives a request to display recently played media containers, and the device 100 displays representations for the recently played media containers. FIG. 7A illustrates an example media browsing user interface 702 generated by a music application (e.g., the video & music player module 152 shown in FIG. 3). The media browsing user interface 702 allows the user to browse through various media containers. In some embodiments, a media container refers to a playlist that includes a sequence of media items, an album that includes a collection of media items, and/or an individual media item. In some embodiments, a media item refers to a music item such as a song. In the example of FIG. 7A, the media browsing user interface 702 displays categories of media containers (e.g., downloaded music, playlists, albums, and songs). The media browsing user interface 702 includes affordances 704a, 704b . . . 704e that, when activated, display different views of the media browsing user interface 702. The device 100 receives a user input 706 at a location corresponding to the affordance 704b. In some embodiments, the user input 706 corresponds to a request to display recently played media containers.

FIG. 7B illustrates a view of the media browsing user interface 702 that includes a recently played section 710. The recently played section 710 displays representations for media containers that have recently been played by the user of the device 100. In some embodiments, the representations include respective icons. In some embodiments, the representations include respective selectable affordances. In other words, the recently played section 710 displays representations of media containers that were played recently by a user account associated with the device (e.g., media containers played at the device or at another device associated with the user account such as a stand-alone speaker or a computer or tablet). In the example of FIG. 7B, the recently played section 710 includes representations 712 and 712a for two media containers that have been recently played by the user account associated with the device 100. In some embodiments, the device 100 plays a media container in response to receiving a verbal instruction from the user of the device 100. In some embodiments, the device 100 displays a verbal indicator 714 to indicate that a media container was played in response to receiving a verbal instruction. In some embodiments, the verbal indicator 714 includes a symbol indicative of a verbal input (e.g., an image of a microphone). In the example of FIG. 7B, the verbal indicator 714 is overlaid on the representation 712a for 'Album DEF' indicating that 'Album DEF' was played in response to receiving a verbal instruction. Displaying the verbal indicator 714 in association with a representation of a media container in the recently played section 710 provide an intuitive and user-friendly way to indicate that the media container was played in response to a verbal instruction. Displaying a representation of a media container that was played in response to a verbal instruction enhances the operability of the device and makes the user-device interface more efficient (e.g., by reducing the need for a subsequent verbal instruction that is identical to the previous verbal instruction) which, additionally, reduces power usage and improves battery life of the device by enabling the user to use the device more quickly and efficiently.

Figure 7D:
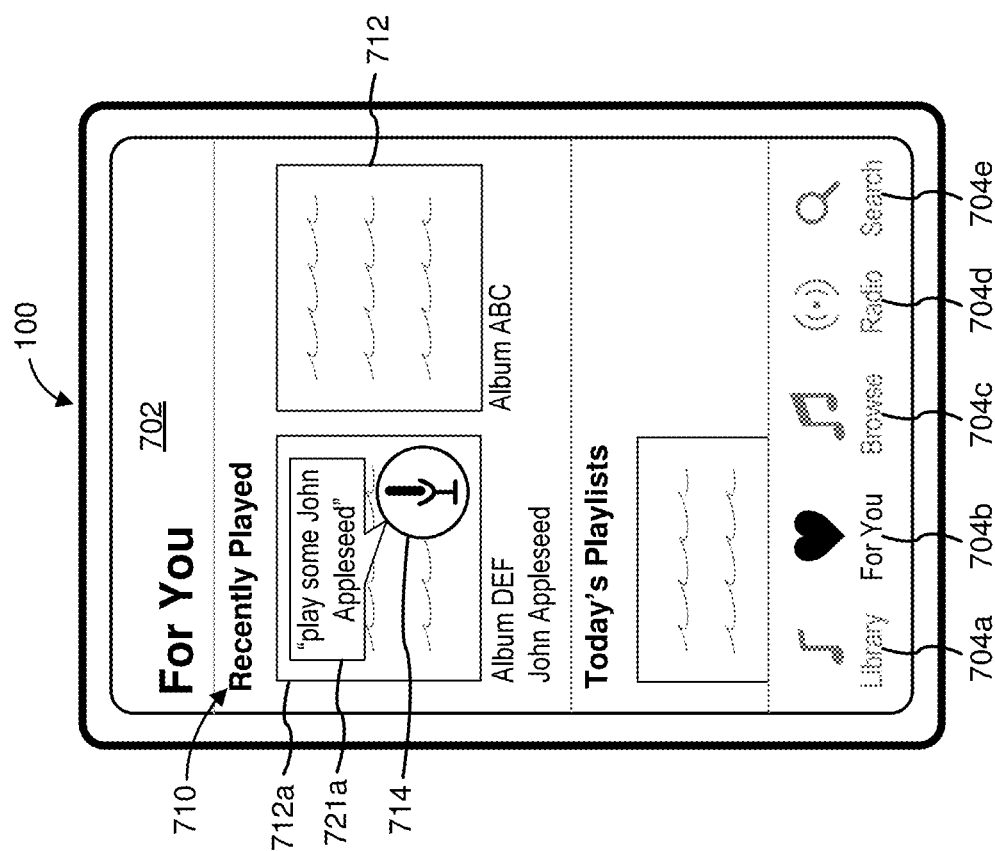
Figure 7C:
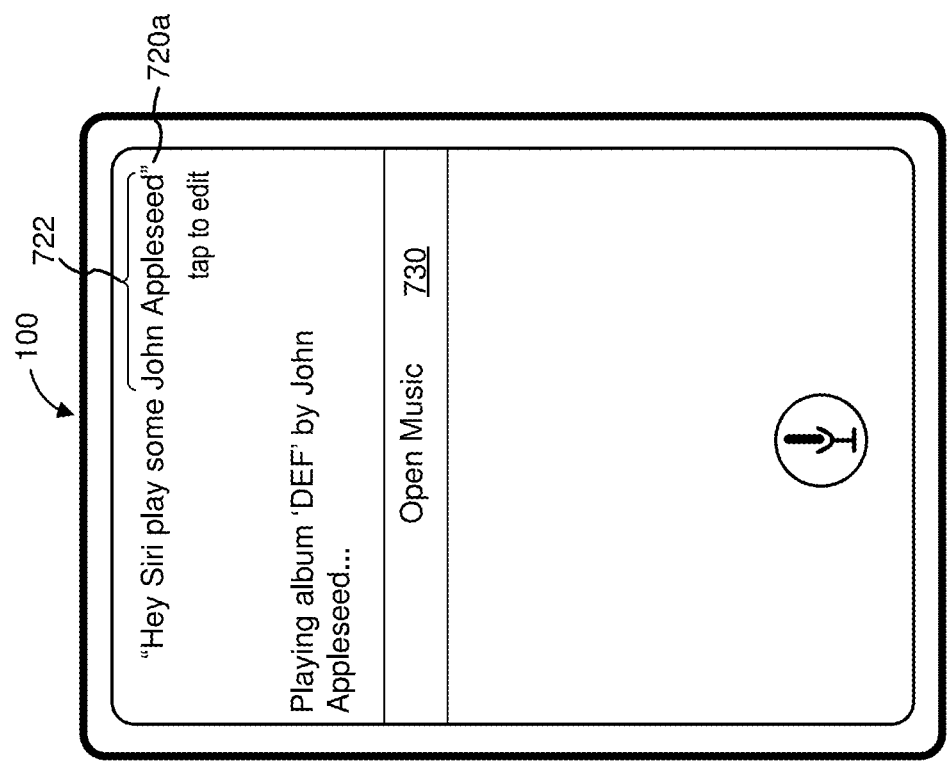

In the example of FIG. 7C, the device 100 receives a verbal instruction 720a. In response to receiving the verbal instruction 720a, the device 100 plays music requested by the verbal instruction 720a. In the example of FIG. 7C, the verbal instruction 720a includes an artist name 722 that refers to an artist (e.g., 'John Appleseed'). As such, in response to receiving the verbal instruction 720a, the device 100 plays a media container created by the artist (e.g., the device 100 plays an album created by the artist or an individual song created by the artist). In the example of FIG. 7C, the device 100 plays an album created by 'John Appleseed' (e.g., the media container associated with the representation 712a shown in FIGS. 7B and 7D). The device 100 provides the user an option to launch the music application. For example, the device 100 displays a music application affordance 730 that, when activated, presents a user interface generated by the music application. In some embodiments, the device 100 receives the verbal instruction 720a while the device 100 is displaying a home screen (e.g., while displaying the user interface 400 shown in FIG. 4A). In some embodiments, the device 100 receives the verbal instruction 720a while the device 100 is displaying a user interface generated by an application other than the music application. In some embodiments, the device 100 receives the verbal instruction 720a while the device 100 is displaying a user interface generated by the music application (e.g., while displaying the media browsing user interface 702).

In the example of FIG. 7D, the device 100 displays the representation 712a for 'Album DEF' after playing 'Album DEF'. As described herein, the representation 712a includes the verbal indicator 714 to indicate that the device 100 played 'Album DEF' in response to a verbal instruction (e.g., the verbal instruction 720a shown in FIG. 7C). In the example of FIG. 7D, the representation 712a includes at least a portion 721a of the verbal instruction 720a. More generally, in some embodiments, a representation of a media container that was played recently includes at least a portion of a verbal instruction that triggered the device 100 to play the media container. Including at least a portion of the verbal instruction in the representation of a media container provides an intuitive and user-friendly way to indicate the verbal instruction that caused the device 100 to play the media container. Indicating the verbal instruction enhances the operability of the device and makes the user-device interface more efficient (e.g., by reducing the need for a subsequent verbal instruction that is identical to the previous verbal instruction) which, additionally, reduces power usage and improves battery life of the device by enabling the user to use the device more quickly and efficiently.

Figure 7F:
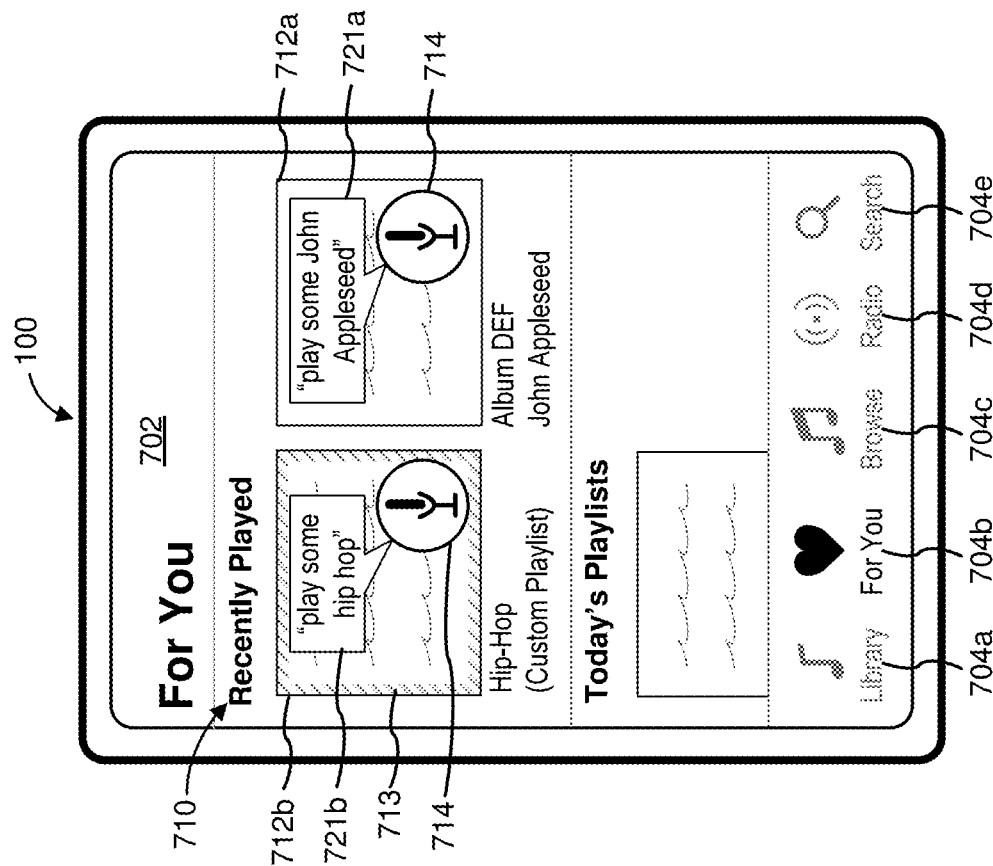
Figure 7E:
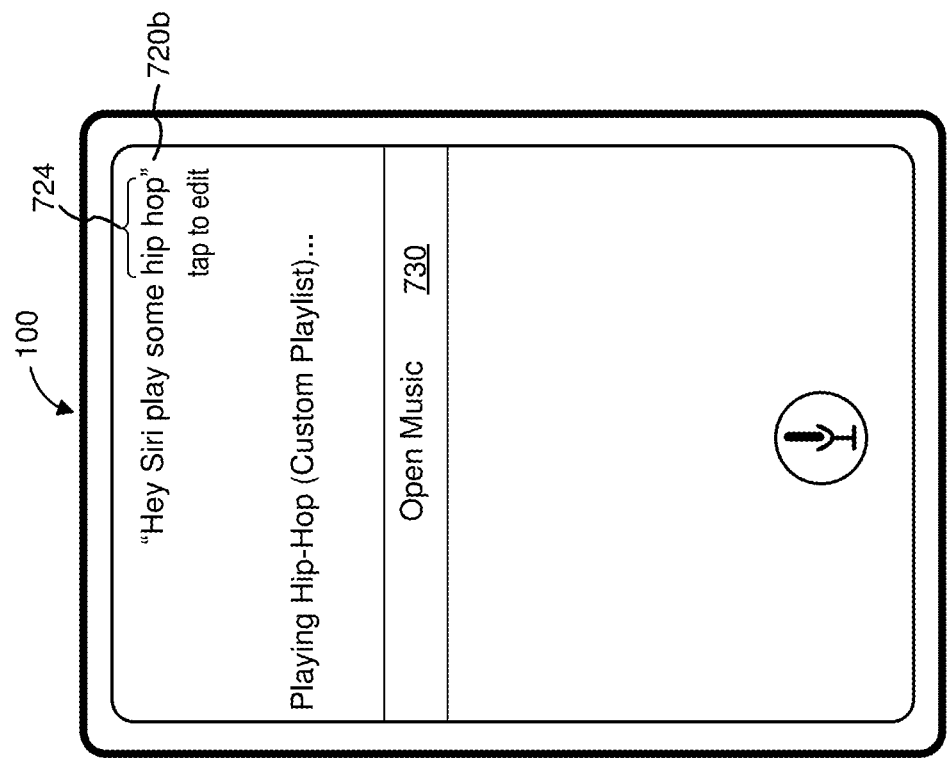

Referring to FIG. 7E, the device 100 receives a verbal instruction 720b to play music that corresponds to a music genre 724 (e.g., a predefined category of music). In response to receiving the verbal instruction 720b, the device 100 plays music that corresponds to the music genre 724 specified in the verbal instruction 720b. In the example of FIG. 7E, the device 100 plays a custom media container (e.g., a custom playlist) that includes media items that corresponds to the music genre 724. In some embodiments, a custom media container refers to a media container that is generated in response to a request to play music that does not correspond to preexisting media containers. In the example of FIG. 7E, the device 100 generates (e.g., synthesizes) a 'Hip-Hop' playlist in response to receiving the verbal instruction 720b. The 'Hip-Hop' playlist is a custom playlist that did not exist prior to the verbal instruction 720b. In various embodiments, generating (e.g., synthesizing) custom media containers (e.g., custom playlists, for example, the 'Hip-Hop' playlist shown in the example of FIGS. 7E-7F) in response to a request to play music (e.g., a verbal instruction, for example, the verbal instruction 720b) enables the device to present music even when the request does not correspond to a preexisting media container thereby improving the operability of the device and providing a better user experience. Generating a custom media container enhances the operability of the device and makes the user-device interface more efficient (e.g., by reducing the need for a sequence of user inputs corresponding to manually creating the media container or repeated requests with different wording when a particular wording of a request fails to produce a media container with media matching the user's verbal instructions) which, additionally, reduces power usage and improves battery life of the device by enabling the user to use the device more quickly and efficiently.

Referring to FIG. 7F, the device 100 displays a representation 712b for the 'Hip-Hop' playlist after playing the Hip-Hop playlist. As illustrated in FIG. 7F, the representation 712b includes the verbal indicator 714 to indicate that the device 100 recently played the 'Hip-Hop' playlist in response to a verbal instruction (e.g., the verbal instruction 720b shown in FIG. 7E). In the example of FIG. 7F, the representation 712b includes at least a portion 721b of the verbal instruction 720b. The representation 712b includes a custom container indication 713 to indicate that the Hip-Hop playlist is a custom playlist (e.g., instead of a preexisting playlist). In the example of FIG. 7F, the custom container indication 713 includes a shaded border. In various embodiments, the custom container indication 713 distinguishes a representation for a custom media container (e.g., an icon for the custom media container) from a representation for a preexisting media container (e.g., an icon for the preexisting media container). For example, the custom container indication 713 changes an appearance of the representation for the custom media container, so that the appearance of the representation for the custom media container is different from an appearance of a representation for a preexisting media container. In other words, in various embodiments, icons for custom media containers have a different appearance from icons for preexisting media containers. In the example of FIG. 7F, the representations 712a and 712b appear different due to the custom container indication 713. Different appearances for representations of custom media containers and preexisting media containers serves as an intuitive and user-friendly technique to distinguish the representations of the custom media containers from the representations of the preexisting media containers. Providing different appearances for representations of custom media containers and representations of preexisting media containers enhances the operability of the device and makes the user-device interface more efficient (e.g., by reducing the need for a subsequent user input on one of the representation in order to discover whether the corresponding media container is a custom media container or a preexisting media container) which, additionally, reduces power usage and improves battery life of the device by enabling the user to use the device more quickly and efficiently.

Figures 7G, 7H:
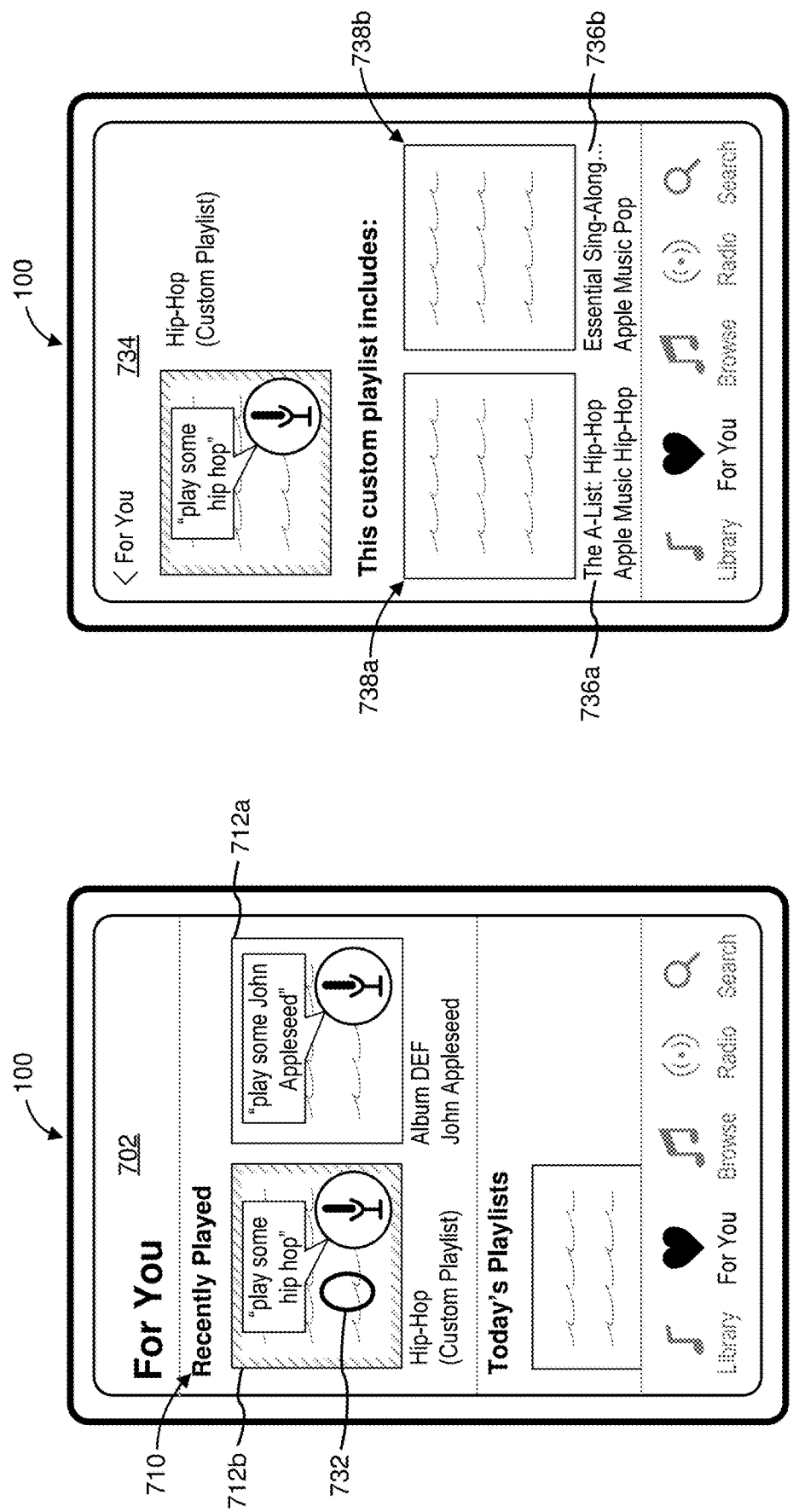

FIGS. 7G-7H illustrate that, in some embodiments, a custom media container is a concatenation of two or more editorially-curated media containers. In some embodiments, the editorially-curated media containers are created by a music service provider (e.g., by a provider of a subscription-based music service). As such, in some embodiments, the editorially-curated media containers are a particular type of preexisting media containers, for example, since the editorially-curated media containers were curated prior to receiving a request to synthesize the custom media container. In the example of FIG. 7G, the device 100 receives a user input 732 at a location that corresponds to the representation 712*b* for the 'Hip-Hop' playlist. In some embodiments, the user request 732 corresponds to a request to display information regarding the 'Hip-Hop' playlist. As illustrated in FIG. 7H, in response to receiving the user input 732, the device 100 displays a playlist screen 734 that includes information regarding the 'Hip-Hop' playlist. In the example of FIG. 7H, the 'Hip-Hop' playlist is a concatenation of two editorially-curated playlists 736*a* and 736*b* (e.g., 'The A-List Hip-Hop' playlist and 'Essential Sing-Along . . . ' playlist). The editorially-curated playlists 736*a* and 736*b* are associated with representations 738*a* and 738*b*, respectively. When the device 100 receives a user input selecting one of the representations 738*a* and 738*b*, the playlist screen 734 displays information regarding the corresponding editorially-curated playlist. Synthesizing the 'Hip-Hop' playlist by concatenating the editorially-curated playlists 736*a* and 736*b* enables the device 100 to present the 'Hip-Hop' playlist in response to receiving the verbal instruction 720*b* shown in FIG. 7E thereby improving the functionality of the device 100 and providing a better user experience. More generally, in various embodiments, synthesizing a custom media container by concatenating two or more editorially-curated media containers enables the device 100 to present the custom media container in response to receiving a verbal instruction to play music that corresponds to the custom media container. Synthesizing a custom media container enhances the operability of the device and makes the user-device interface more efficient (e.g., by reducing the need for a sequence of user inputs corresponding to manually creating the custom media container) which, additionally, reduces power usage and improves battery life of the device by enabling the user to use the device more quickly and efficiently.

Figure 7J:
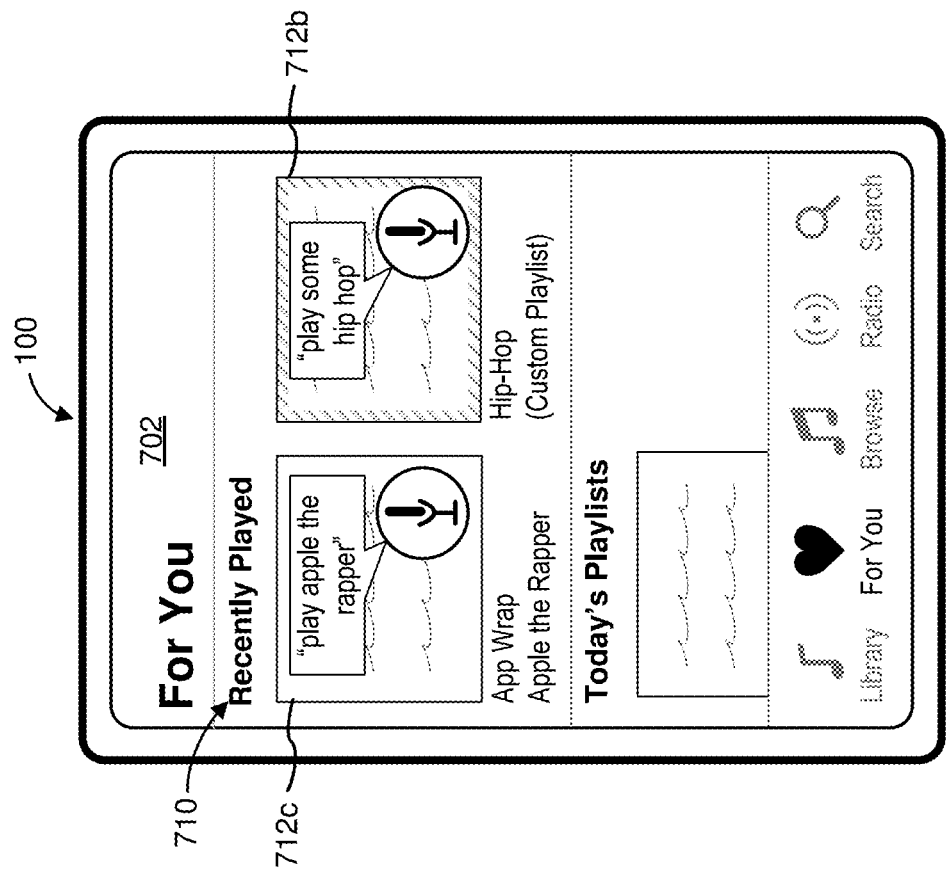
Figure 7I:
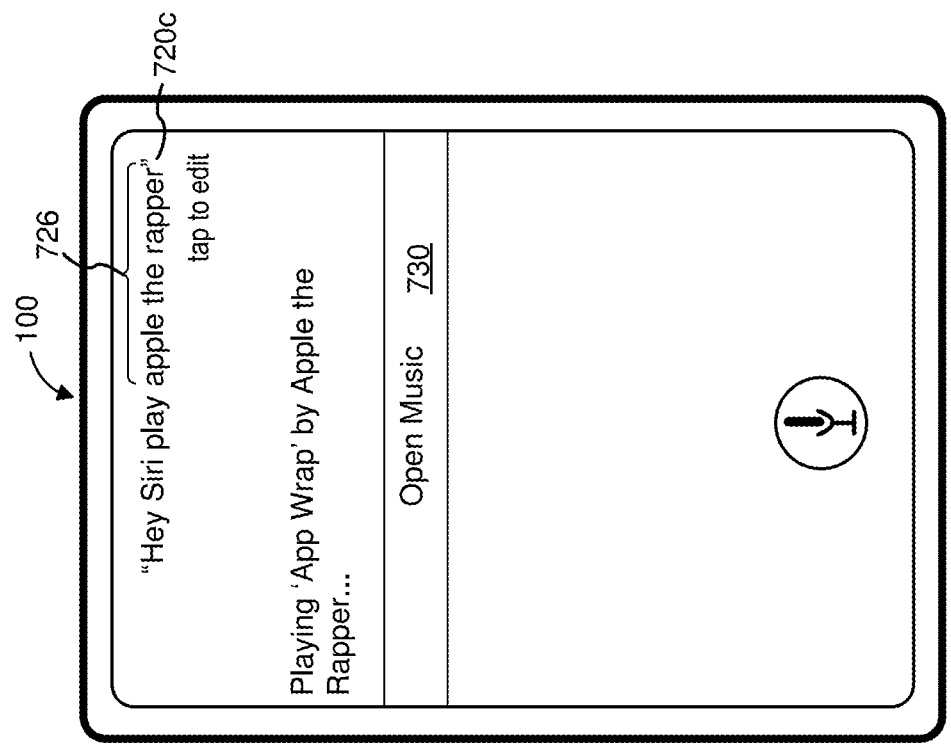

FIGS. 7I-7J illustrate a sequence in which the device 100 presents a preexisting media container that only includes media items created by a particular artist in response to a verbal instruction referring to that particular artist. In the example of FIG. 7I, the device 100 receives a verbal instruction 720*c* that includes a reference 726 to an artist (e.g., 'apple the rapper'). In some embodiments, the reference 726 to the artist is a stage name of the artist. In response to receiving the verbal instruction 720*c*, the device 100 plays a media container (e.g., an album or a playlist) that includes media items created by the artist. In some embodiments, the media container only includes media items that were created by the artist. In the example of FIGS. 7I-7J, the device 100 plays an album (e.g., 'App Wrap' album) created by the artist associated with the reference 726 to the artist. Referring to FIG. 7J, the recently played section 710 includes a representation 712*c* for the media container (e.g., the 'App Wrap' album) that the device 100 recently played in response to receiving the verbal instruction 720*c*. By playing a media container that only includes media items that were created by a particular artist referenced in the verbal instruction, the device provides the user an option to play media items that were created by that particular artist.

Figure 7L:
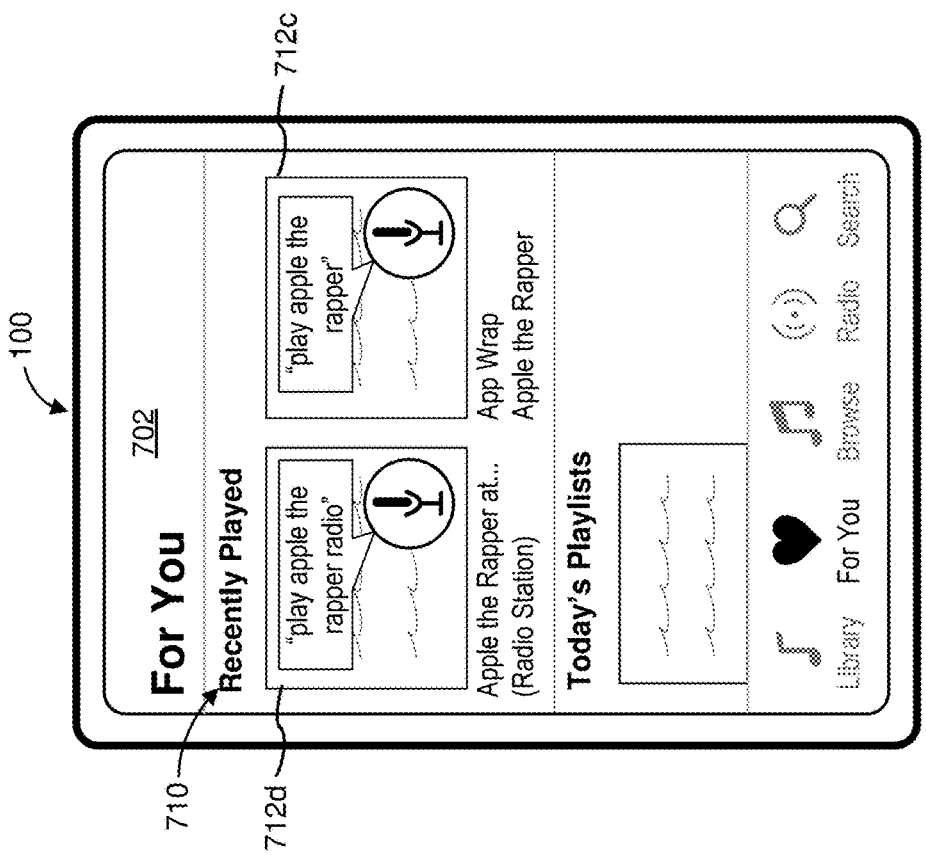
Figure 7K:
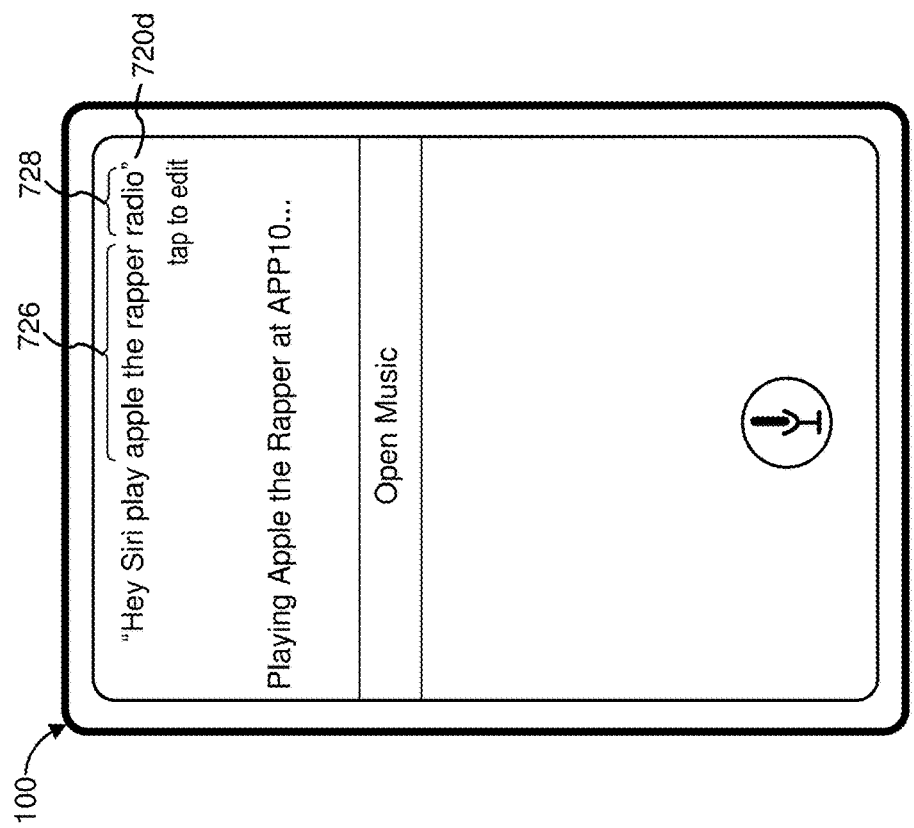

FIGS. 7K-7L illustrate a sequence in which the device 100 presents a custom media container, which includes media items created by a particular artist and related media items created by other artists, in response to a verbal instruction that includes a predefined keyword in addition to referring to that that particular artist. In the example of FIG. 7K, the device 100 receives a verbal instruction 720*d* that includes a predefined keyword 728 (e.g., "radio") and the reference 726 to the artist (e.g., 'apple the rapper'). In some embodiments, the predefined keyword 728 includes a word or a phrase such as "radio". In response to receiving the verbal instruction 720*d*, the device 100 plays a media container (e.g., a radio station or a playlist) that includes related media items that are related to the designated artist but that were created by other artists and, optionally, media items created by the artist. In some embodiments, the related media items are from the same music genre as the media items created by the artist indicated by the reference 726 to the artist. In the example of FIGS. 7K-7L, the device 100 plays a radio station (e.g., 'Apple the Rapper at APP10 . . . ') that includes songs that were created by 'Apple the Rapper' and related songs created by other artists (e.g., rap songs created by other rappers from the same era as 'Apple the Rapper'). Referring to FIG. 7L, the recently played section 710 includes a representation 712*d* for the media container (e.g., the 'Apple the Rapper at APP10 . . . ' radio station) that the device 100 recently played in response to receiving the verbal instruction 720*d*. By playing a media container that includes media items created by a particular artist and related media items created by other artists, the device provides the user an option to explore media items created by other artists thereby enhancing the user experience. Playing related media items in addition to the media items created by the particular artist enhances the operability of the device and makes the user-device interface more efficient (e.g., by reducing the need for a sequence of user inputs corresponding to effectuating the playback of the related media items) which, additionally, reduces power usage and improves battery life of the device by enabling the user to use the device more quickly and efficiently.

Figure 7N:
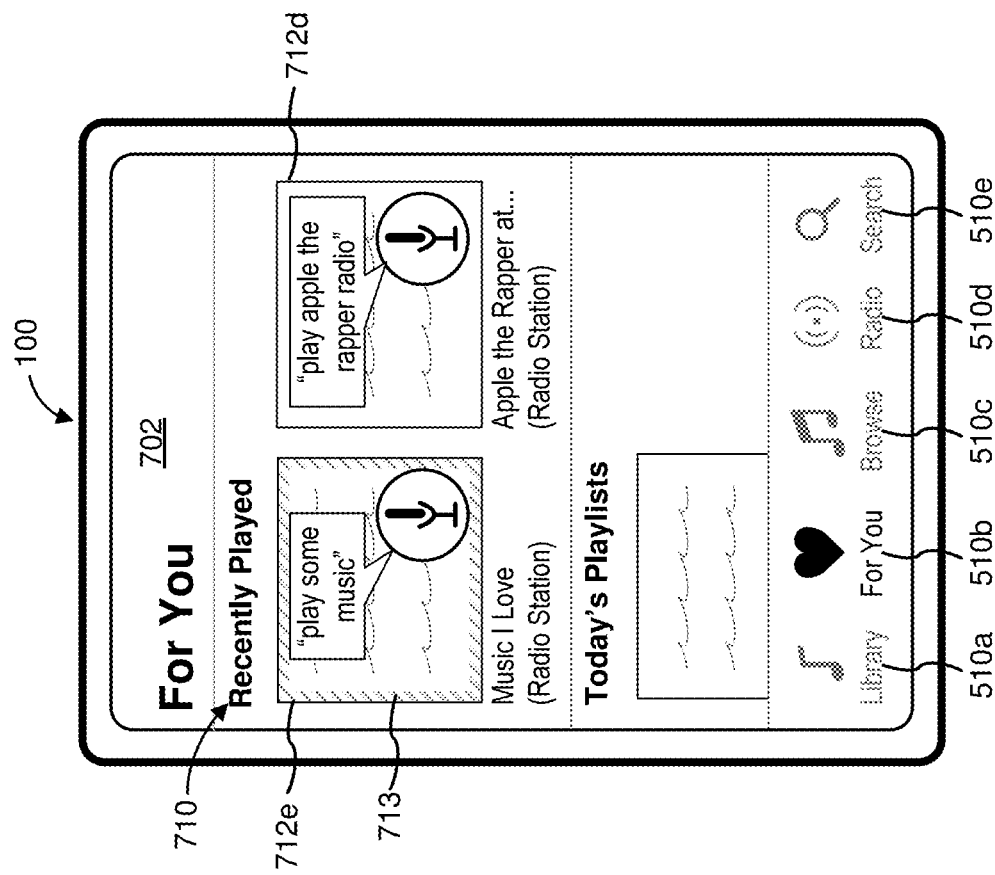
Figure 7M:
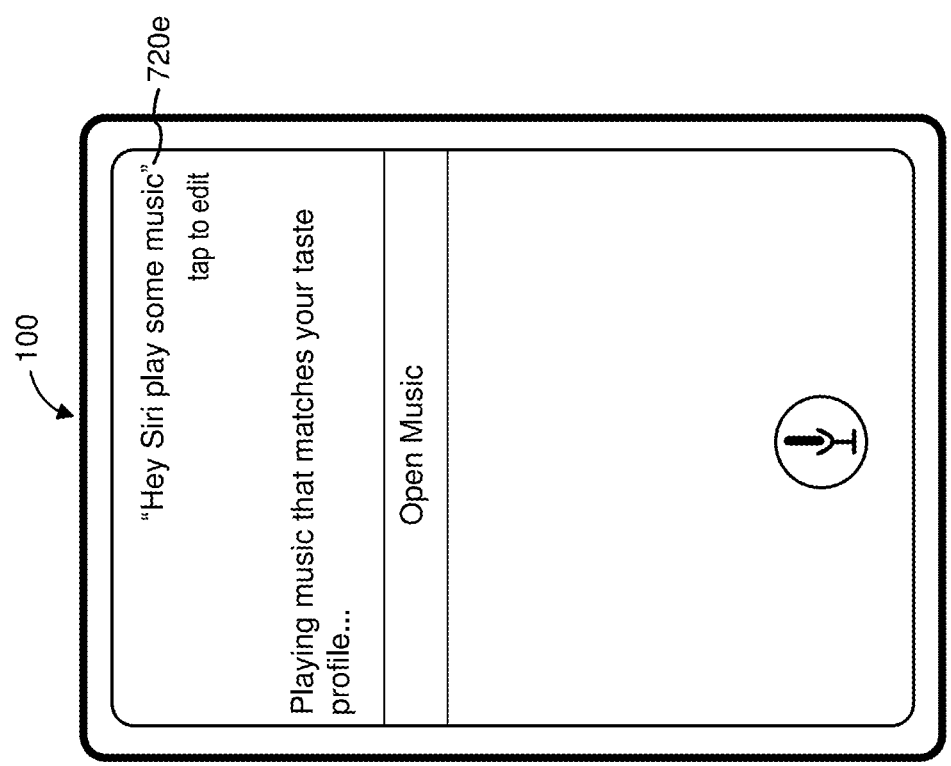

FIGS. 7M-7N illustrate a sequence in which the device 100 presents a media container in accordance with a media taste profile of the user. In some embodiments, the media taste profile indicates music genres that the user prefers. In such embodiments, the device 100 presents a media container that includes media items that are in the music genres that the user prefers. In some embodiments, the media taste profile indicates artists that the user likes. In such embodiments, the device 100 presents a media container that includes media items that were created by the artists that the user likes. In the example of FIG. 7M, the device 100 receives a verbal instruction 720*e* that corresponds to a request to play music without specifying which music to play (e.g., without referring to an artist and/or a music genre). In response to receiving the verbal instruction 720*e*, the device 100 plays a media container that includes media items that satisfy the media taste profile of the user. In the example of FIGS. 7M-7N, the device 100 plays a custom radio station. In some embodiments, the custom radio station refers to a radio station that the device 100 synthesizes in response to receiving the verbal instruction 720*e*. In other words, the custom radio station did not exist prior to receiving the verbal instruction 720*e*. The custom radio station includes media items that satisfy the taste profile of the user. For example, if the media taste profile of the user indicates that the user likes rap music, then the custom radio station includes rap songs. Referring to FIG. 7N, the recently played section 710 includes a representation 712e for the media container (e.g., custom radio station) that the device 100 recently played in response to receiving the verbal instruction 720e. Since the custom radio station did not exist prior to receiving the verbal instruction 720e, the representation 712e includes the custom container indication 713 to indicate that the representation 712e is for a custom radio station. By playing a media container in accordance with a media taste profile of the user, the device provides the user an option to listen to media items that the user prefers without explicitly specifying an artist and/or a music genre thereby improving the efficiency of the device 100 and providing a better user experience. Playing a media container in accordance with a media taste profile of the user enhances the operability of the device and makes the user-device interface more efficient (e.g., by reducing the need for a sequence of user inputs corresponding to manually selecting media items that satisfy a taste of the user) which, additionally, reduces power usage and improves battery life of the device by enabling the user to use the device more quickly and efficiently.

Figure 7P:
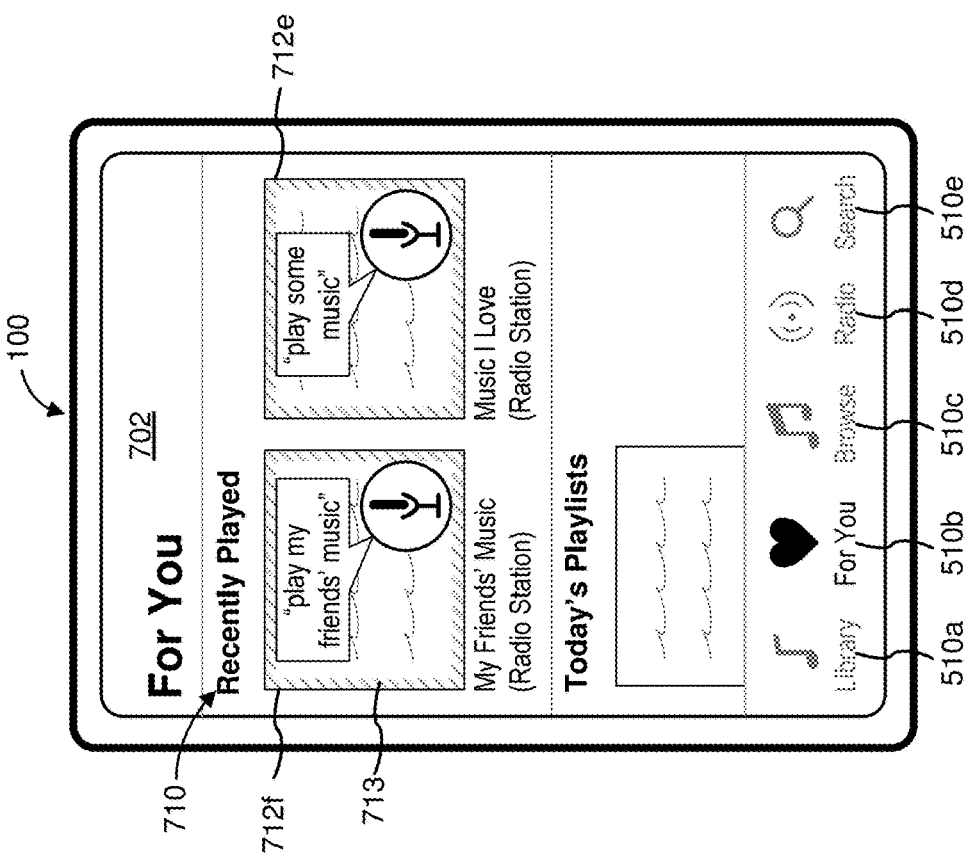
Figure 7O:
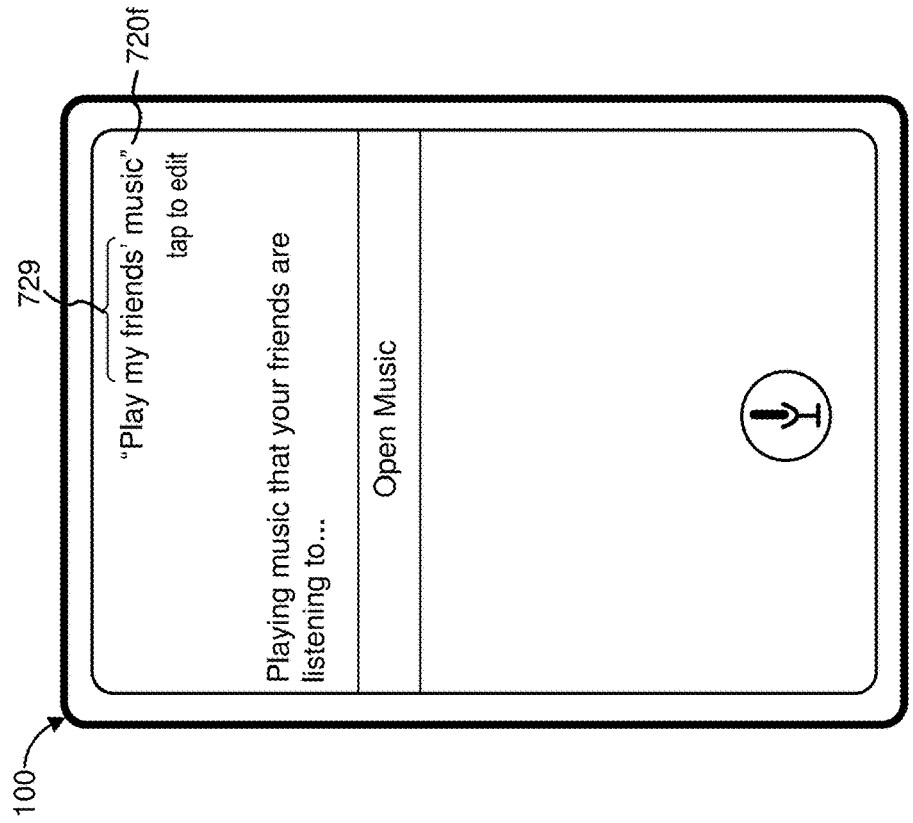

FIGS. 7O-7P illustrate a sequence in which the device 100 presents a media container including media items that other users, which have a predetermined relationship with the user of the device 100, are engaging with. As described herein, in some embodiments, the predetermined relationship refers to the user of the device 100 being connected to the other users via a music recommendation network and/or a social network. In some embodiments, the device 100 presents the media items that the other users are engaging with in response to receiving a verbal instruction 720f that includes a reference 729 to the other users (e.g., a predefined word/phrase that refers to the other users, for example, "my friends", "my contacts", "my connections", "my followers", etc.). In the example of FIG. 7O, the reference 729 to the other users includes the phrase "my friends". In response to detecting the reference 729 to the other users, the device 100 plays a media container that includes media items that the other users are engaging with. In the example of FIGS. 7O-7P, the device 100 plays a custom radio station that includes songs that the user's friends are engaging with (e.g., listening to, downloading, liking, loving, explicitly sharing, etc.). Referring to FIG. 7P, the recently played section 710 includes a representation 712f for the media container (e.g., custom radio station) that the device 100 recently played in response to receiving the verbal instruction 720f. Since the custom radio station did not exist prior to receiving the verbal instruction 720f, the representation 712f includes the custom container indication 713 to indicate that the representation 712f is for a custom radio station. By playing media items that other users are engaging with, the device 100 enables the user to listen to music that is likely popular thereby providing a better user experience. Playing media items that other users are engaging with enhances the operability of the device and makes the user-device interface more efficient (e.g., by reducing the need for a sequence of user inputs corresponding to requesting, from other users, media items that the other users are engaging with) which, additionally, reduces power usage and improves battery life of the device by enabling the user to use the device more quickly and efficiently.

Figure 7R:
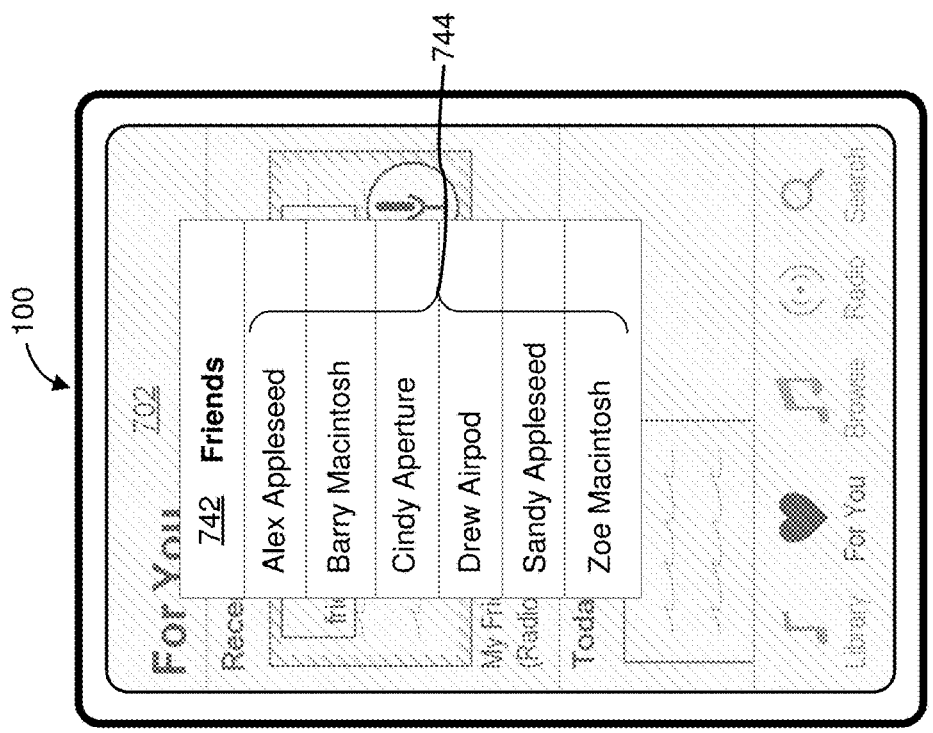
Figure 7Q:
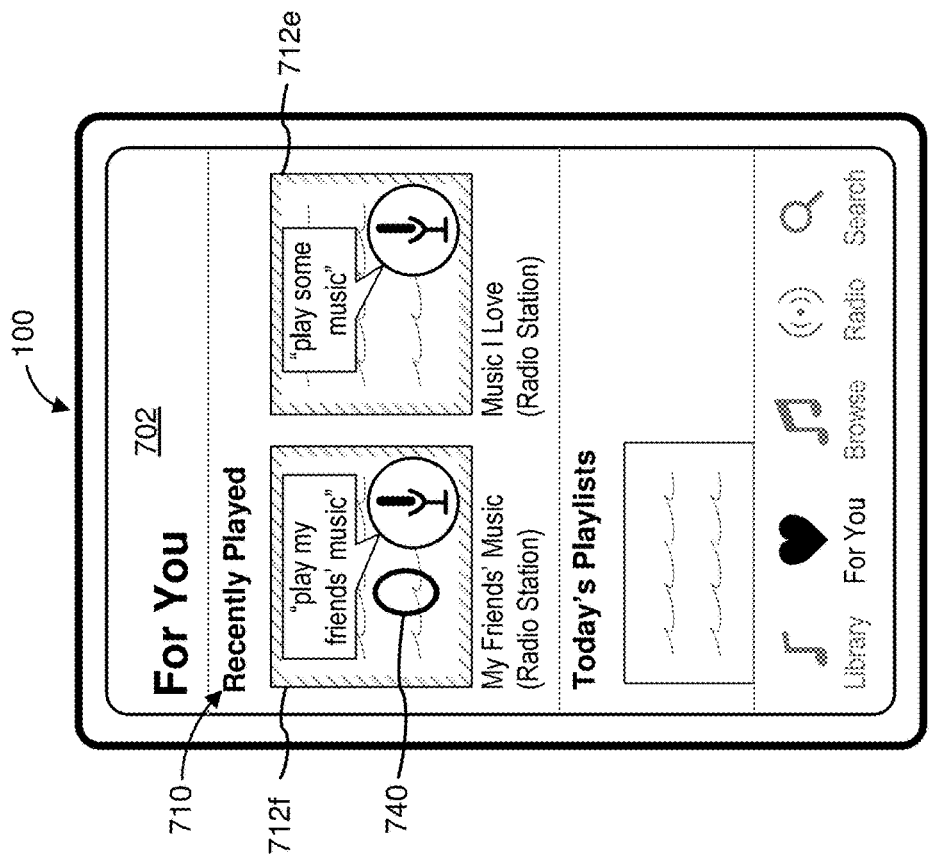
Figure 7T:
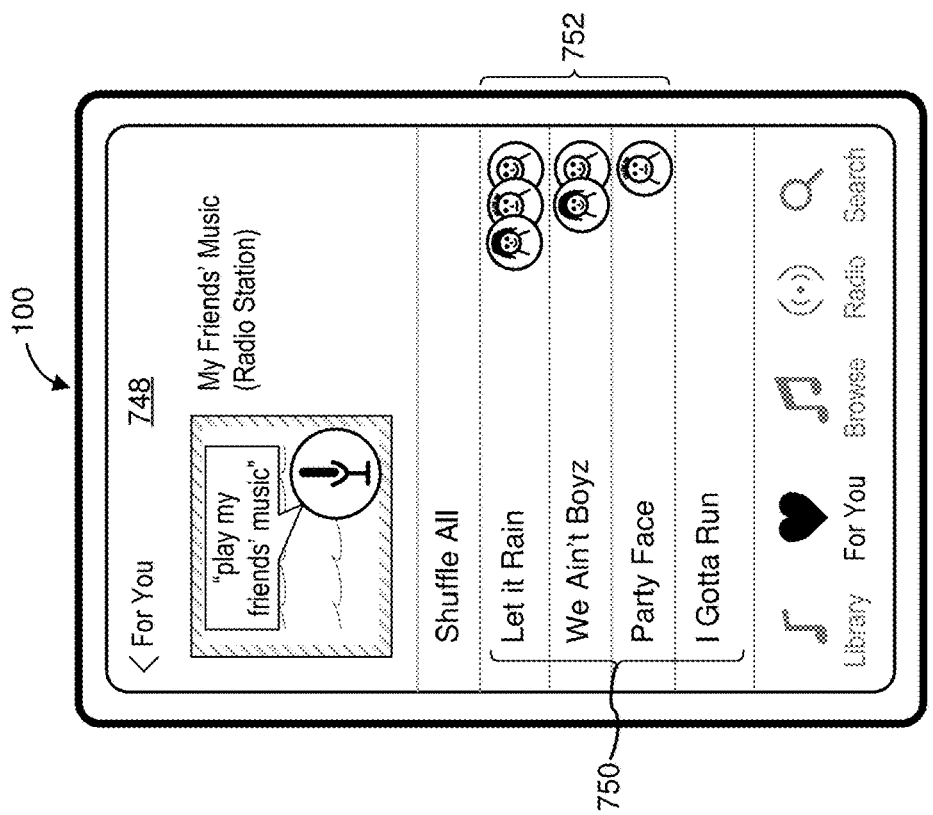

Referring to FIG. 7Q, the device 100 receives a user input 740 at a location corresponding with the representation 712f for the custom radio station that includes music that other users are engaging with. In the example of FIG. 7Q, user input 740 corresponds to a request to view a list of the other users that are associated with the custom radio station. In other words, in some embodiments, the user input 740 corresponds to a request to view a list of the other users that affect the content of the custom radio station by engaging with media items. In some embodiments, the user input 740 is associated with a characteristic intensity that is greater than an intensity threshold (e.g., the user input 740 is a deep press or a hard press). As illustrated in FIG. 7R, in response to receiving the user input 740, the device 100 displays an overlay 742 that includes representations 744 corresponding to the other users whose engagement with media items affects the media items in the custom radio station. As such, the device 100 allows the user to see which of the other users' music is included in the 'My Friends' Music' custom radio station. The device 100 provides the user with an option to remove a particular user from the list of users that affect the contents of the custom radio station. In some examples, the device 100 removes a particular user from the list in response to receiving a user input (e.g., a swipe-left gesture) at a location that corresponds to the respective representation 744 for that particular user. After a particular user is removed from the list, music that the particular user listens to is not included in the 'My Friend's Music' custom radio station. As such, the device 100 allows the user to select which of the other users' music is included in the 'My Friends' Music' custom radio station.

Figure 7S:
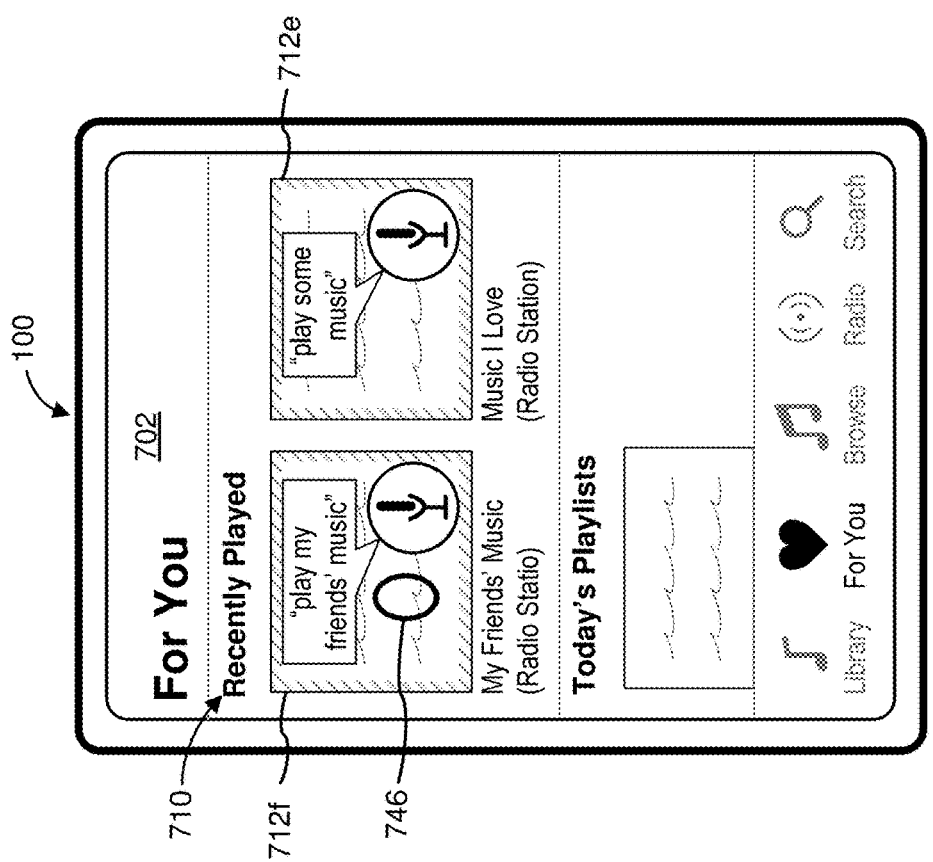

In the example of FIG. 7S, the device 100 receives a user input 746 at a location corresponding to the representation 712f for the custom radio station that includes music that satisfies an engagement criterion (e.g., music that other users with which the user of the device 100 has the predetermined relationship are engaging with). In some embodiments, the user input 746 corresponds to a request to view additional information regarding the custom radio station. For example, the user input 746 corresponds to a request to view a list of individual media items in the custom radio station. As illustrated in FIG. 7T, in response to receiving the user input 746, the device 100 displays a radio station screen 748 that includes information regarding the custom radio station. In the example of FIG. 7T, the radio station screen 748 includes representations 750 for media items (e.g., songs) that are in the custom radio station. As illustrated in FIG. 7T, some of the representations 750 include respective engagement markers 752 that indicate engagement of the other users that have the predetermined relationship with the user of the device 100. Displaying the engagement markers 752 serves as an intuitive and user-friendly way to indicate which of the other users are engaging with a particular media item in the custom radio station. Displaying engagement markers for the media items enhances the operability of the device and makes the user-device interface more efficient (e.g., by reducing the need for a sequence of user inputs corresponding to a request to display representations of other users that are engaging with a particular media item) which, additionally, reduces power usage and improves battery life of the device by enabling the user to use the device more quickly and efficiently.

FIGS. 8A-8X illustrate example user interfaces that allow a first user (e.g., the user of the device 100) to hide engagement of the first user with one or more media containers. Hiding the engagement of the first user with a media container prevents other users that are in the predetermined relationship with the first user (e.g., other users who are following or are friends with the first user) from seeing the engagement of the first user with the hidden media container thereby improving privacy for the first user. The user interfaces in these figures are used to illustrate the processes described below, including the processes in FIGS.

12A-12E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Referring to FIG. 8A, in some embodiments, the device 100 displays an example media engagement user interface 802. In the example of FIG. 8A, the media engagement user interface 802 includes a recently played section 810 that includes representations for media containers that the device 100 has recently played. The media engagement user interface 802 includes representations of media containers for which a first user (e.g., the user of the device 100) has met engagement criteria. In some embodiments, the engagement criteria for a media container includes a requirement that the first user has engaged with (e.g., listened to, downloaded, indicating a preference for, shared with other users, etc.) the media container. In the example of FIG. 8A, the media engagement user interface 802 includes representations 812a and 812b for 'Album ABC' and 'Album FED', respectively. In the example of FIG. 8A, the representations 812a and 812b are displayed in the recently played section 810. As such, 'Album ABC' and 'Album FED' meet the engagement criteria, for example, because the first user has engaged with 'Album ABC' and 'Album FED'. In some embodiments, the representations 812a and 812b are displayed in another section of the media engagement user interface 802 (e.g., a section other than the recently played section 810, for example, in a library section of the media engagement user interface 802).

Figure 8B:
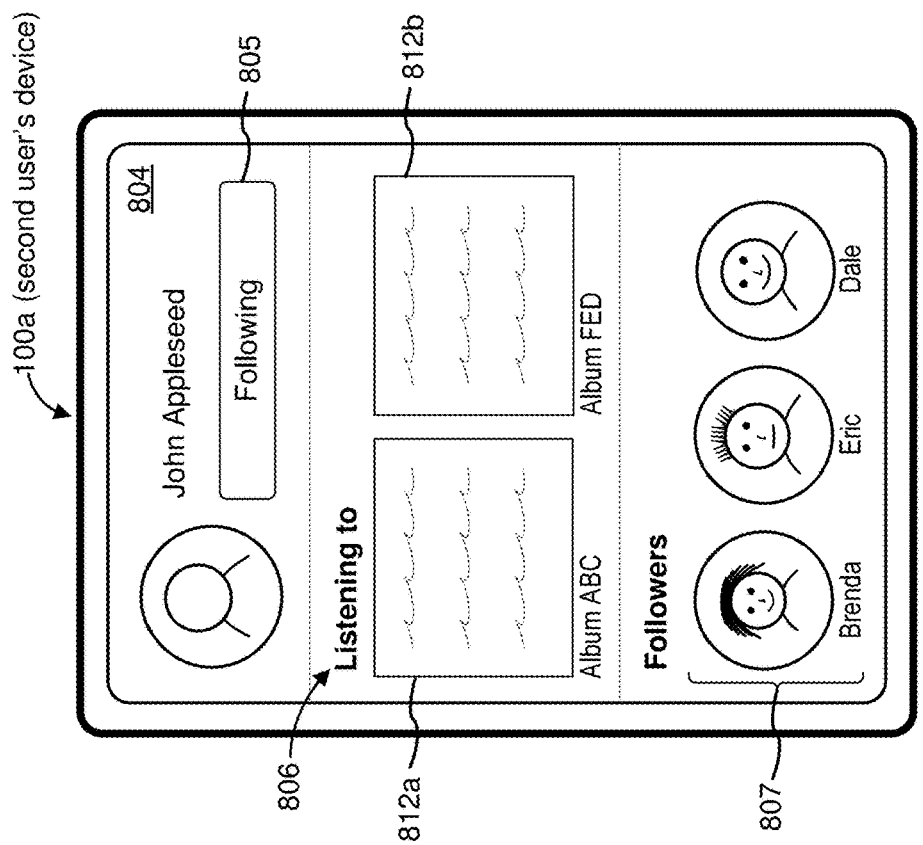
FIGS. 8A-8X illustrate example user interfaces that allows a first user to hide engagement of the first user with one or more media containers in accordance with some embodiments.
Figure 8A:
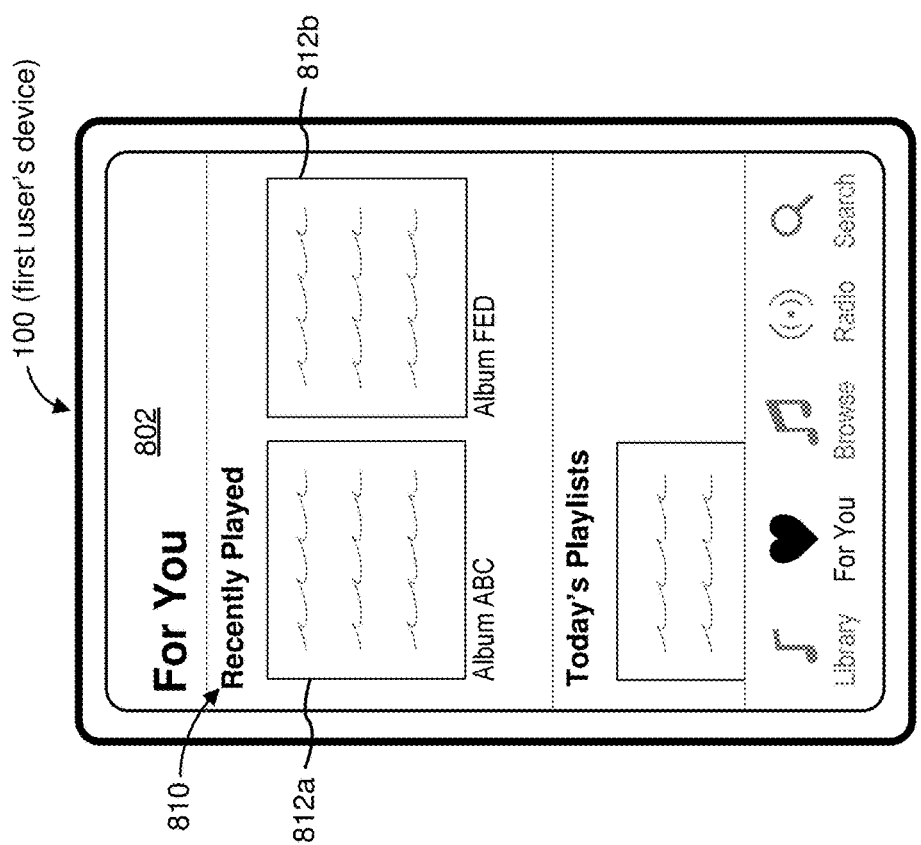

FIG. 8B illustrates a second device 100a that corresponds to a second user. The second device 100a is displaying a public version 804 of a user profile for the first user (e.g., the user of the device 100 shown in FIG. 8A). The public version 804 of the user profile for the first user includes information regarding the first user. In some embodiments, the public version 804 of the user profile for the first user includes a relationship indication 805 indicating that the second user has a predetermined relationship with the first user (e.g., the second user is connected to the first user). In the example of FIG. 8B, the relationship indication 805 indicates that the second user is following the first user. In some embodiments, following the first user allows the second user to view representations of media containers that the first user is engaging with. In other words, following the first user allows the second user to see what music the first user is listening to. In some embodiments, following the first user allows the second user to receive music recommendations (e.g., from a music recommendation engine) that include media containers that the first user is engaging with. In the example of FIG. 8B, the public version 804 of the user profile for the first user includes a listening section 806 that includes representations of media containers that the first user is engaging with. In the example of FIG. 8B, the listening section 806 includes the representations 812a and 812b for 'Album ABC' and 'Album DEF', respectively. Including the representations 812a and 812b in the listening section 806 indicates that the first user recently listened to 'Album ABC' and 'Album DEF'. In some embodiments, the public version 804 of the user profile for the first user includes badges 807 for other users with whom the first user has the predetermined relationship.

Figure 8D:
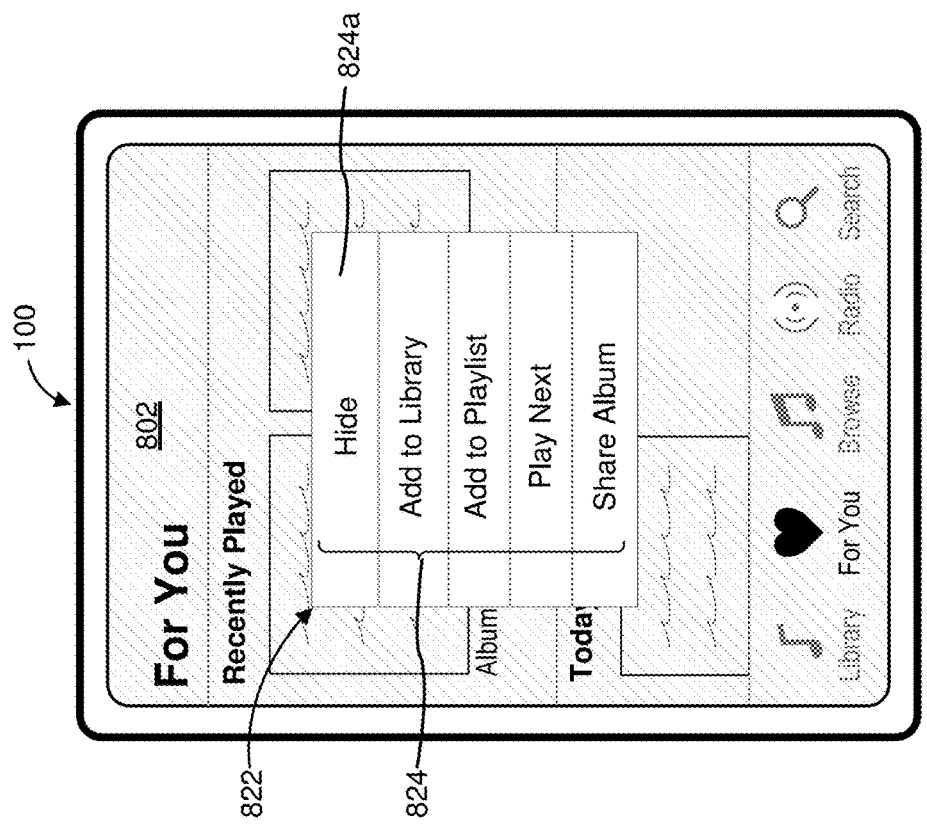
Figure 8C:
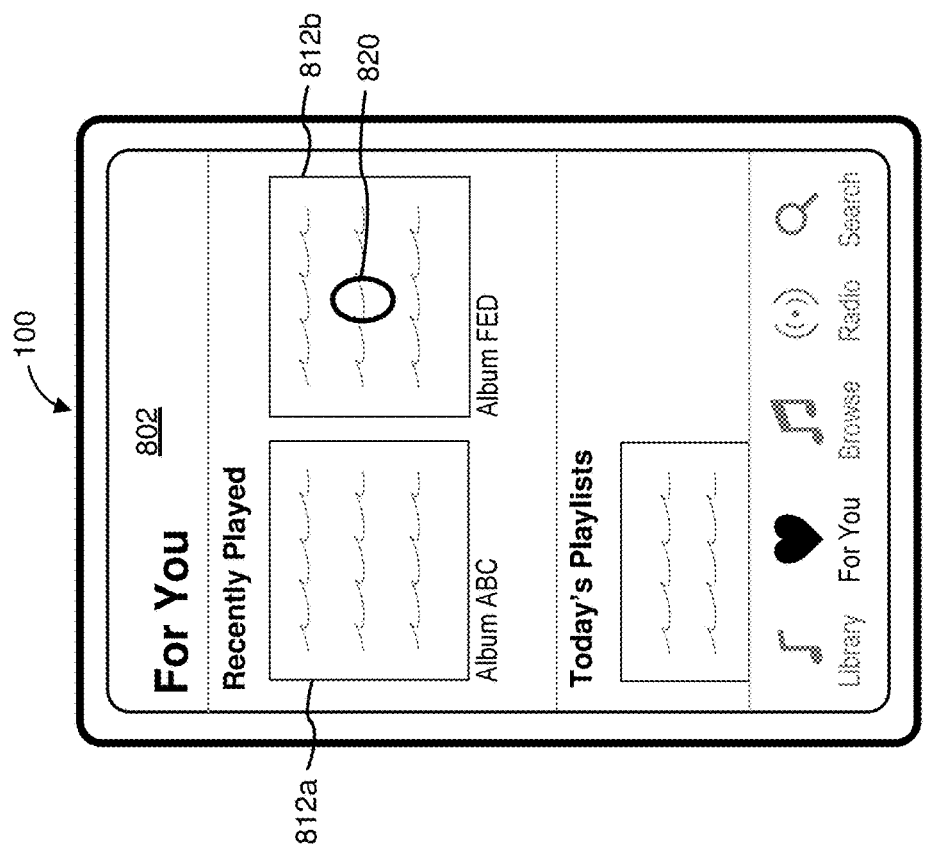
Figure 8F:
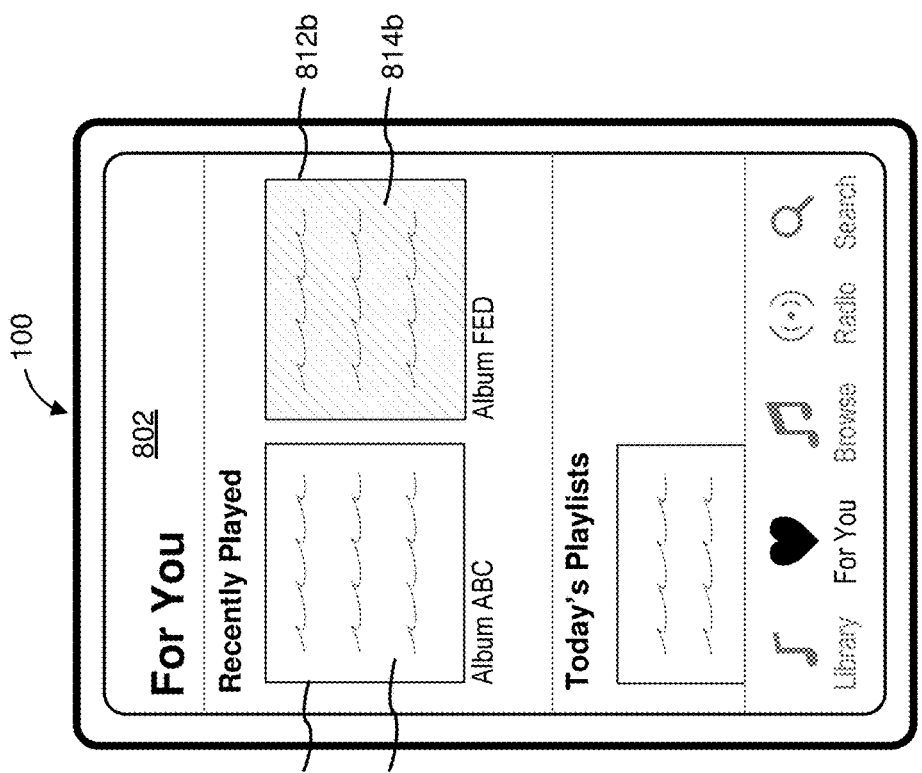

FIGS. 8C-8F illustrate a sequence in which the device 100 provides the first user an option to hide the engagement of the first user with a media container. In the example of FIG. 8C, the device 100 receives a user input 820 at a location corresponding the representation 812b for 'Album FED'. In some embodiments, the user input 820 corresponds to a request to display a menu that provides the user with options to perform various operations in association with 'Album FED'. For example, as illustrated in FIG. 8D, in response to receiving the user input 820, the device 100 displays a menu 822. The menu 822 includes various affordances 824 that, when activated, trigger an operation in association with 'Album FED'. In the example of FIG. 8D, one of the affordances 824 includes a hide affordance 824a. The hide affordance 824a provides the user with an option to hide the engagement of the first user with 'Album FED'. In FIGS. 8C-8D, in response to an activation of the hide affordance 824a, the device 100 hides the engagement of the first user with 'Album FED', so that other users with which the first user has the predetermined relationship with (e.g., the second user corresponding to the second device 100a shown in FIG. 8B) are unable to see that the first user is listening to 'Album FED'. In various embodiments, the option to hide engagement with a media container provides a higher level of privacy to the first user thereby improving the user experience.

Figure 8E:
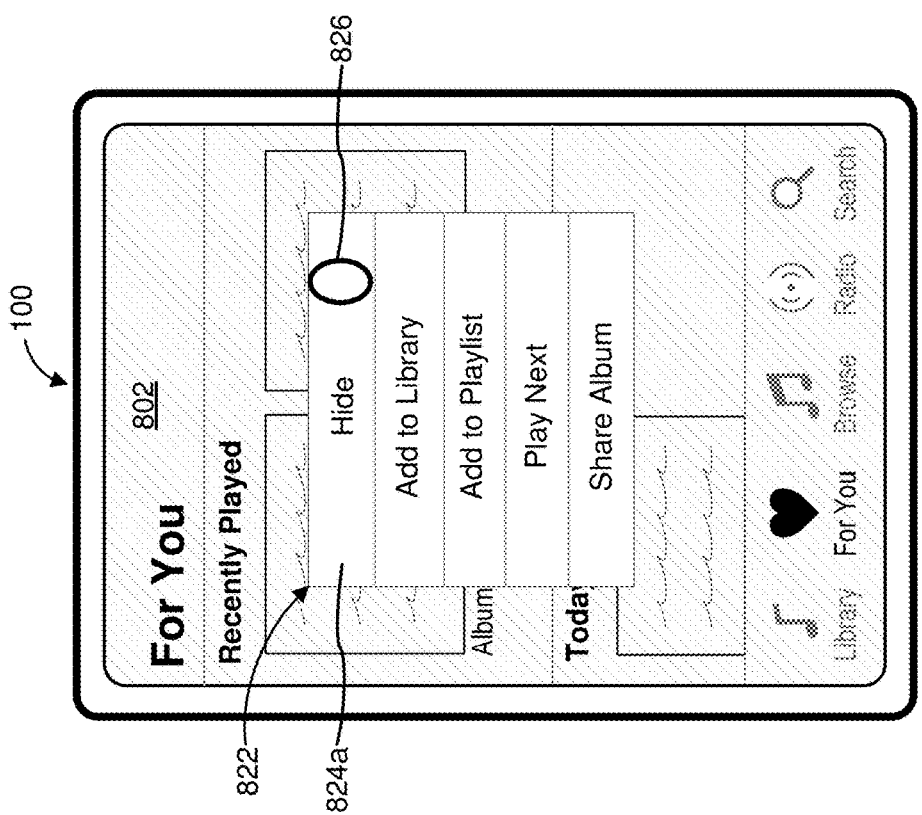
Figure 8H:
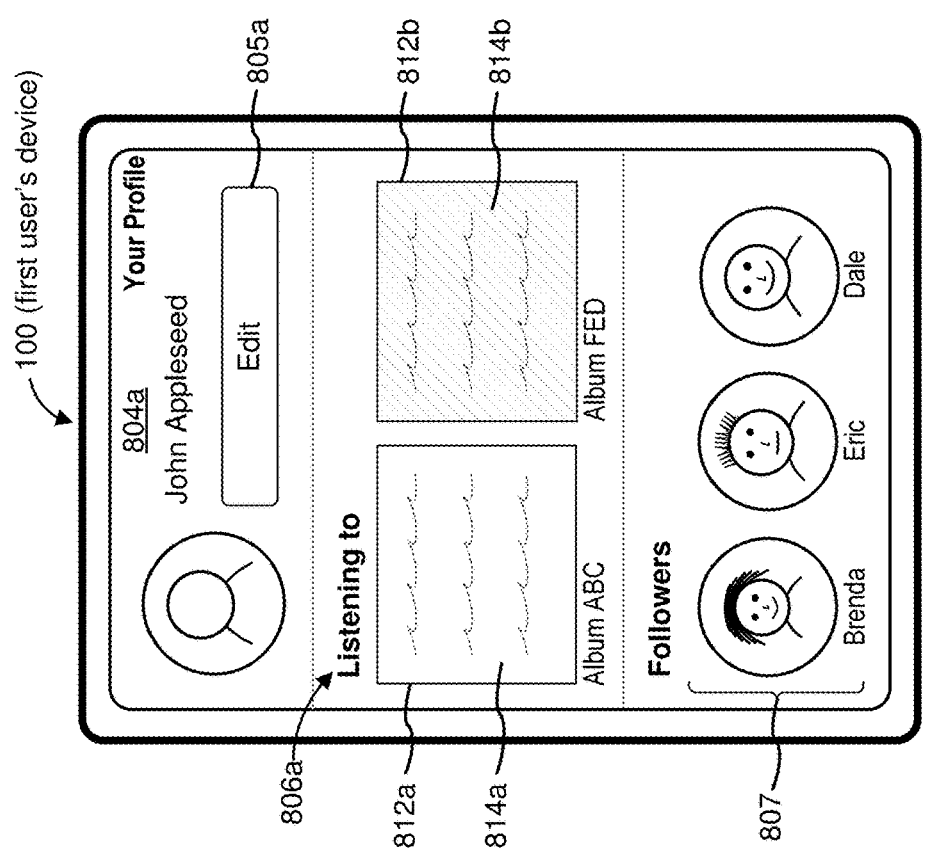

Referring to FIG. 8E, the device 100 receives a user input 826 at a location corresponding to the hide affordance 824a. The user input 826 corresponds to a request to hide the engagement of the first user with 'Album FED'. In response to receiving the user input 826, the device 100 hides the engagement of the first user with 'Album FED'. In some embodiments, hiding the engagement includes masking the engagement of the first user. In some embodiments, hiding the engagement includes forgoing transmission of data indicating the engagement of the first user. In some embodiments, hiding the engagement includes forgoing tracking of the data indicating the engagement of the first user. Hiding the engagement of the first user with 'Album FED' allows the user to keep the engagement private. In other words, hiding the engagement of the first user with 'Album FED' prevents other users from knowing that the first user is engaging with 'Album FED' thereby improving the controllability of the device 100 by providing the user an option to opt for a higher level of privacy. Hiding engagement of the first user with a media container enhances the operability of the device and makes the user-device interface more efficient (e.g., by reducing the need for a sequence of user inputs corresponding to a request to delete the media container, or to cease participation in music sharing in order to engage with the media container without advertising their engagement with the media container) which, additionally, reduces power usage and improves battery life of the device by enabling the user to use the device more quickly and efficiently.

FIG. 8F illustrates that the device 100 changes an appearance of the representation of a media container after receiving a request to hide engagement of the first user with the media container. The changed appearance of the representation of the media container indicates that the media container is hidden from public view. In other words, changing the appearance of the representation of the media container indicates that the engagement of the first user with the media container is hidden from (e.g., not visible to, or not available to) other users that are in the predetermined relationship with the first user. In the example of FIG. 8F, the device 100 changes an appearance of the representation 812b for 'Album FED' after receiving a request to hide the engagement of the first user with 'Album FED' (e.g., after receiving the user input 826 shown in FIG. 8E). For example, as illustrated in FIG. 8F, the representation 812b for 'Album FED' has a shaded background 814b, whereas the representation 812a for 'Album ABC' has a clear background 814a. More generally, in various embodiments, the device 100 changes the appearance of a representation by changing a visual characteristic of the representation. In some examples, changing the visual characteristic includes changing a border thickness (e.g., reducing the border thickness), changing a brightness level (e.g., reducing the brightness level), changing a font (e.g., making the font smaller, and/or changing a color of the font), and/or changing a color of the representation (e.g., displaying the representation in gray).

Figure 8G:
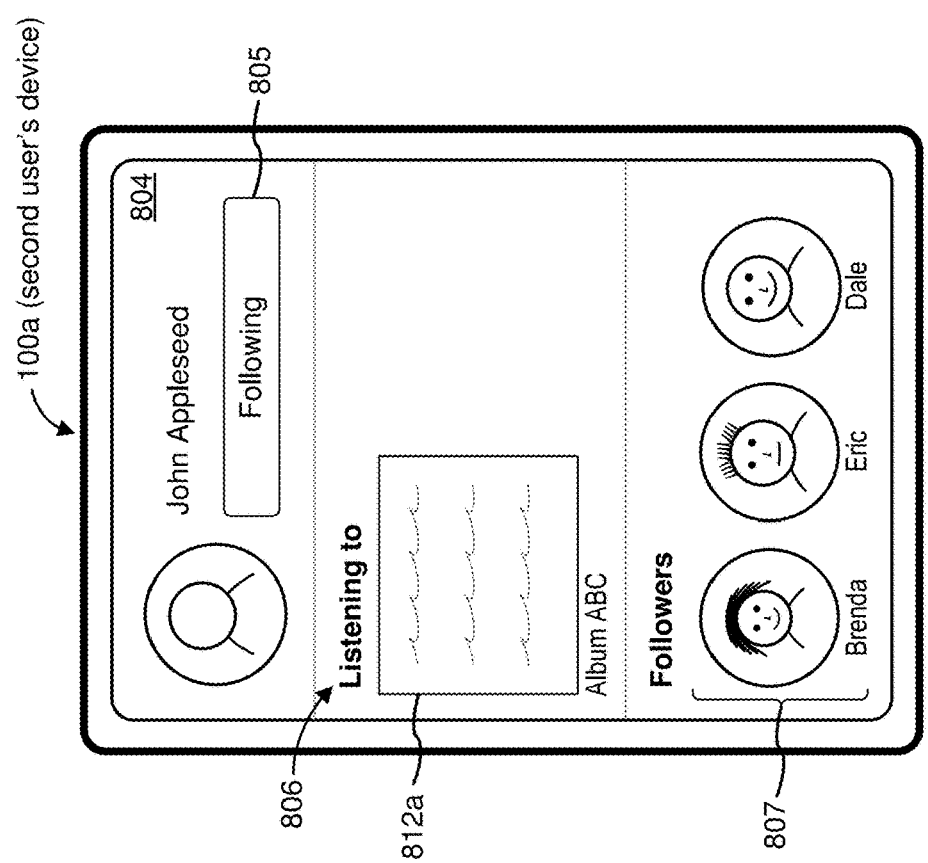

In the example of FIG. 8G, the second device 100a displays the public version 804 of the user profile for the first user. As illustrated in FIG. 8G, the second device 100a ceases to display the representation 812b for 'Album FED' after the device 100 received the user input 826 (shown in FIG. 8E) corresponding to a request to hide engagement of the first user with 'Album FED'. In other words, after the first user hides the engagement of the first user with 'Album FED', the public version 804 of the user profile for the first user ceases to display the representation 812b for 'Album FED'. As such, other users with whom the first user has the predetermined relationship (e.g., the second user corresponding to the second device 100a) cannot see that the first user is engaging with 'Album FED'. More generally, in various embodiments, after the first user requests to hide the engagement of the first user with a particular media container, the engagement of the first user with that particular media container is hidden from other users with whom the first user has the predetermined relationship (e.g., the public version 804 of the user profile for the first user ceases to display a representation for that particular media container). As such, hiding the engagement of the first user with a particular media container provides the first user with more privacy thereby enhancing the user experience.

In the example of FIG. 8H, the device 100a displays a private version 804a of the user profile for the first user. The private version 804a of the user profile for the first user includes an edit affordance 805a that, when activated, allows the first user to make changes to the user profile. The private version 804a of the user profile includes a listening section 806a that includes representations of media containers that the first user is engaging with. In the example of FIG. 8H, the listening section 806a includes the representations 812a and 812b for 'Album ABC' and 'Album DEF', respectively. As illustrated in FIG. 8H, the device 100 changes an appearance of the representation 812b after the device 100 received the user input 826 (shown in FIG. 8E) corresponding to a request to hide engagement of the first user with 'Album FED'. In the example of FIG. 8H, the representation 812b for 'Album FED' has a shaded background 814b, whereas the representation 812a for 'Album ABC' has a clear background 814a. The changed appearance (e.g., the shaded background 814b) of the representation 812b indicates that the engagement of the first user with 'Album FED' is hidden. In other words, the changed appearance of the representation 812b indicates that other users cannot see that the first user is engaging with 'Album FED'. More generally, in various embodiments, changing the appearance of a media container representation being displayed on the private version 804a of the user profile for the first user provides a clear indication that engagement with the corresponding media container is hidden from other users. Indicating that engagement with a media container is hidden from other users enhances the operability of the device and makes the user-device interface more efficient (e.g., by reducing the need for a sequence of user inputs corresponding to a request to display whether engagement with the media container is hidden or not) which, additionally, reduces power usage and improves battery life of the device by enabling the user to use the device more quickly and efficiently.

Figure 8J:
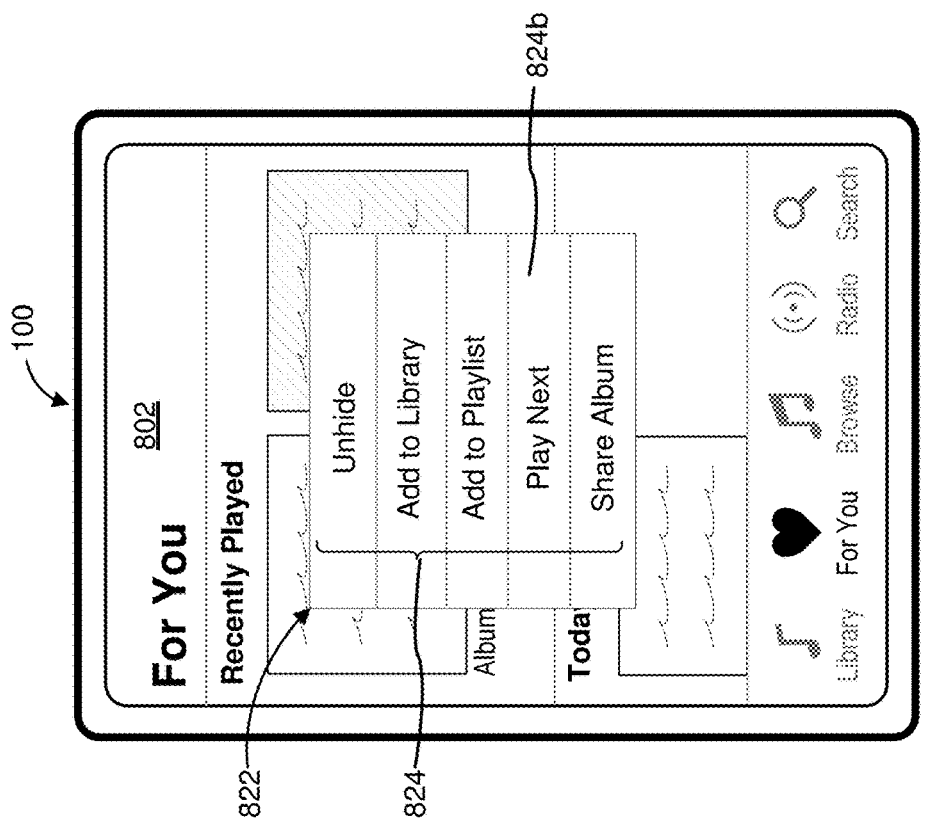
Figure 8I:
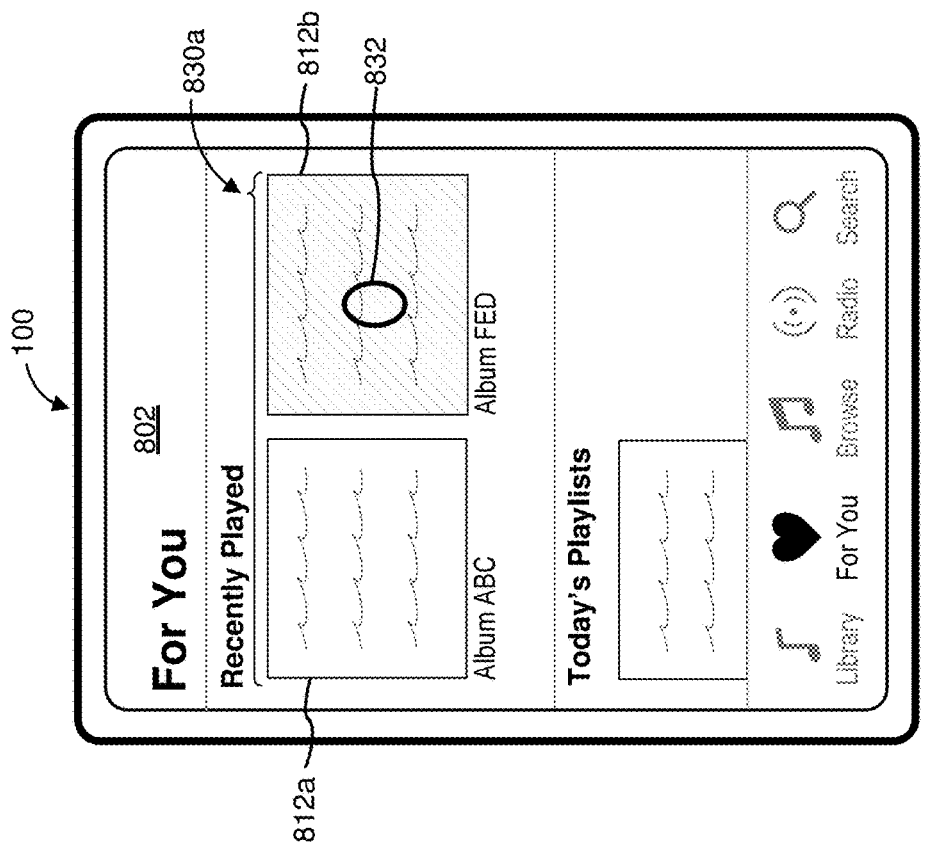

FIGS. 8I-8L illustrate a sequence in which the device 100 orders representations of media containers based on the engagement of the first user with the media containers (e.g., based on frequency and/or recency of engagement). FIG. 8I illustrates a first display order 830a for the representations 812a and 812b. In the example of FIG. 8I, the device 100 displays the representation 812a towards the left edge of the touch-sensitive surface, and the device 100 displays the representation 812b towards the right edge of the touch-sensitive surface, for example, because the device 100 played 'Album ABC' more recently than 'Album FED'. The device 100 receives a user input 832 that corresponds to a request to display the menu 822. As illustrated in FIG. 8J, the device 100 displays the menu 822 in response to receiving the user input 832. The menu 822 includes a play affordance 824b that, when activated, causes the device 100 to play 'Album FED' next. Referring to FIG. 8K, the device 100 receives the user input 834 that corresponds to a request to play 'Album FED' next. The device 100 plays 'Album FED' in response to receiving the user input 834. As illustrated in FIG. 8L, the device 100 reorders the representations 812a and 812b in accordance with a second display order 830b. According to the second display order 830b, the representation 812b is displayed towards the left of the touch-sensitive surface and the representation 812a is displayed towards the right of the touch-sensitive surface. The second display order 830a indicates that the device 100 played 'Album FED' more recently than 'Album ABC'. As illustrated in the example of FIGS. 8I-8L, the first user can engage with a media container even after the first user has requested that the engagement of the first user with the media container be hidden from other users. For example, the first user can listen to 'Album FED' even after the engagement of the first user with 'Album FED' is hidden from other users. As illustrated in the example of FIGS. 8I-8L, the device 100 determines a display order for a representation of a media container based on the engagement of the first user with the media container even if the engagement of the first user with the media container is hidden from other users. Determining the display order for representations of hidden media containers allows the device 100 to position the representations so that the representations are more accessible to the user. Determining the display order for representations of hidden media containers enhances the operability of the device and makes the user-device interface more efficient (e.g., by reducing the need for a user input that corresponds to scrolling through the representations in order to view representations of hidden media containers) which, additionally, reduces power usage and improves battery life of the device by enabling the user to use the device more quickly and efficiently.

Figure 8N:
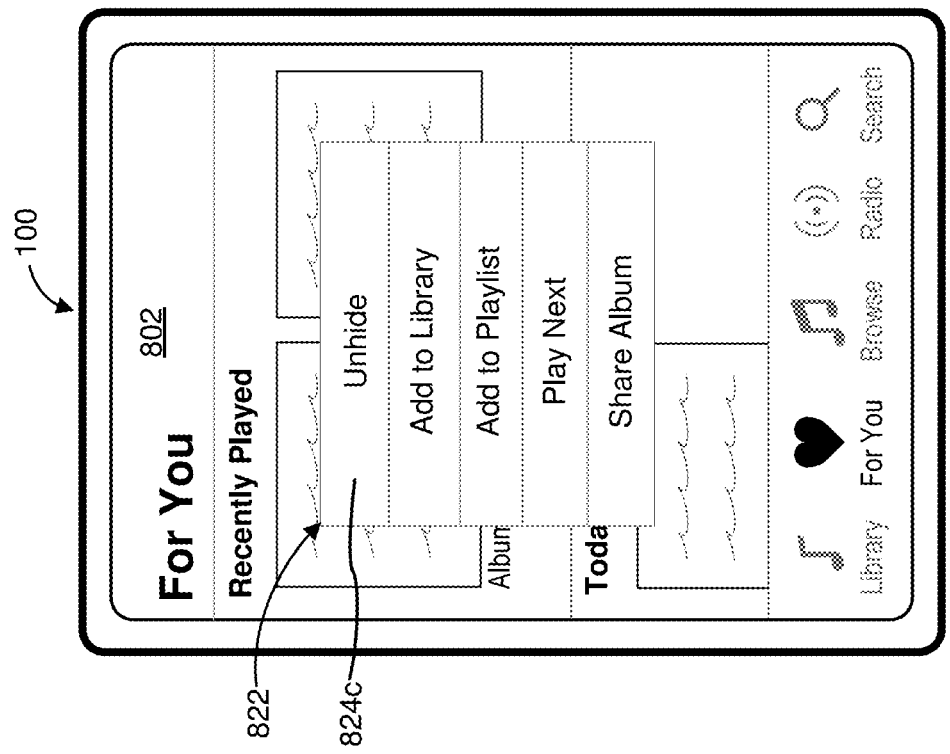
Figure 8M:
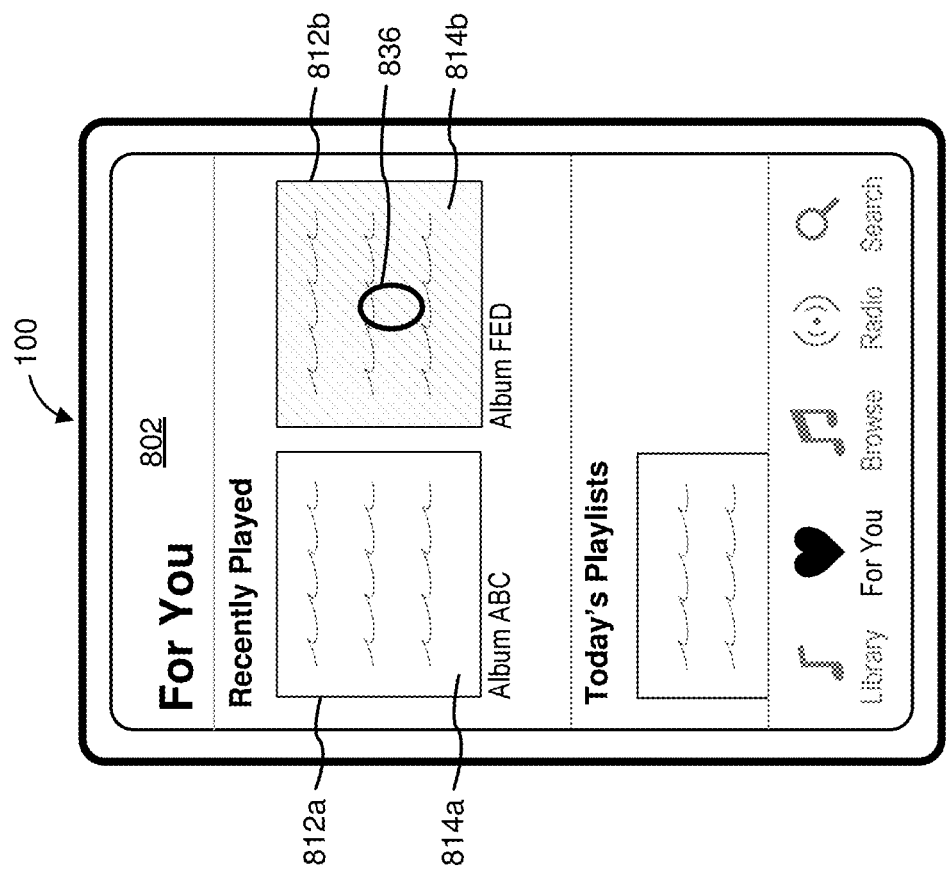
Figure 8P:
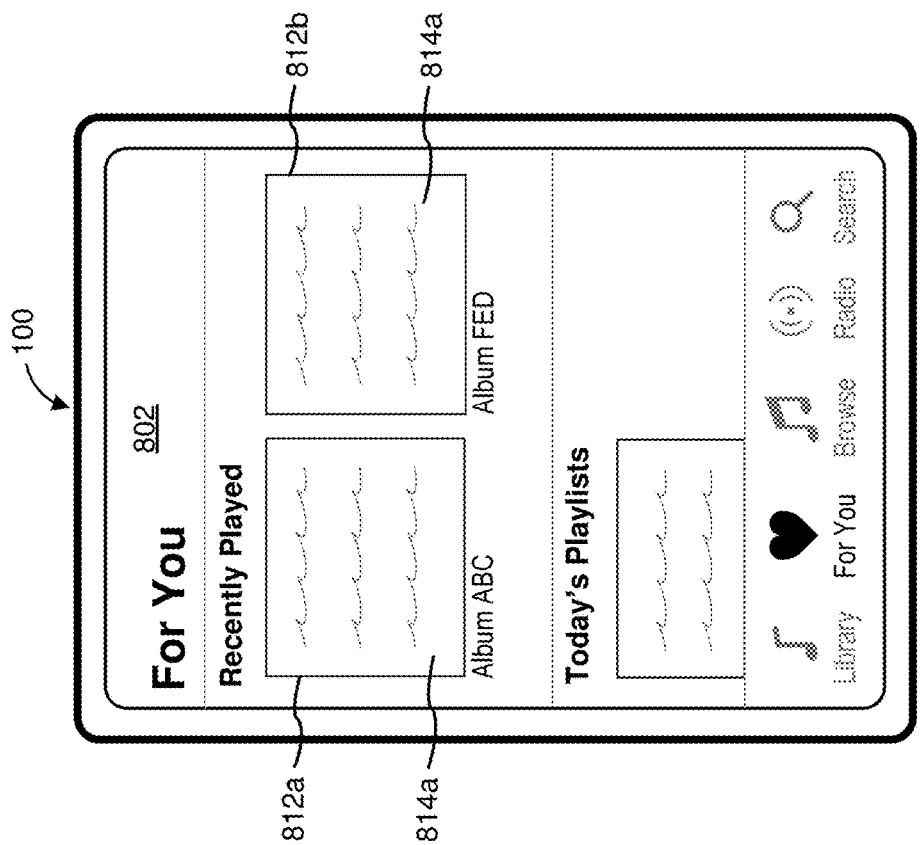
Figure 8O:
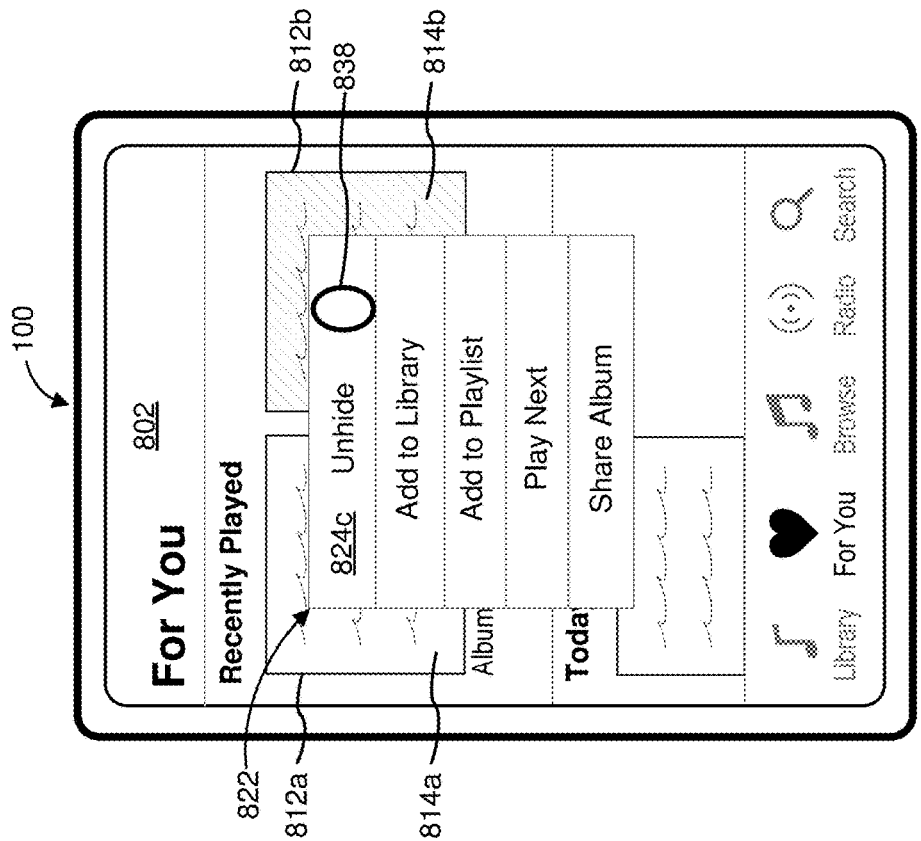

FIGS. 8M-8P illustrate a sequence in which the device 100 unhides the engagement of the first user with a media container in response to receiving a request to unhide the engagement. In the example of FIG. 8M, the device 100 receives a user input 836 at a location corresponding to the representation 812b for 'Album FED'. The user input 836 corresponds to a request to display the menu 822. As illustrated in FIG. 8N, in response to receiving the user input 836, the device 100 displays the menu 822. In the example of FIG. 8N, the menu 822 includes an unhide affordance 824c that, when activated, unhides engagement of the first user with a media container (e.g., 'Album FED'). Referring to FIG. 8O, the device 100 receives a user input 838 at a location corresponding to the unhide affordance 824c. The user input 838 corresponds to a request to unhide engagement of the first user with 'Album FED'. As such, in response to receiving the user input 838, the device 100 unhides the engagement of the first user with 'Album FED'. In some embodiments, unhiding the engagement includes unmasking data indicative of the engagement of the first user with 'Album FED'. In some embodiments, unhiding the engagement includes resuming transmissions of data indicative of the engagement of the first user with 'Album FED'. As illustrated in FIG. 8P, after unhiding the engagement of the first user with 'Album FED', the device 100 changes the appearance of the representation 812b to indicate that engagement with 'Album FED' is no longer hidden. In the example of FIG. 8P, the device 100 switches a background of the representation 812b from the shaded background 814b to the clear background 814a. Providing the user with an option to hide and unhide the engagement of the user with a particular media container provides the user more control over the user's privacy thereby improving the operability of the device 100. Providing an option to hide the engagement of the first user with a media container enhances the operability of the device and makes the user-device interface more efficient (e.g., by reducing the need for a sequence of user inputs corresponding to a request to delete the media container, or to cease participation in music sharing in order to engage with the media container without advertising their engagement with the media container) which, additionally, reduces power usage and improves battery life of the device by enabling the user to use the device more quickly and efficiently.

FIGS. 8Q-8T illustrate that other users cannot see the engagement of the first user with a media container after the first user hides the engagement of the first user with the media container. In the example of FIG. 8Q, the second device 100a is displaying a recommendation module 850 that includes music recommendations for the second user. In some embodiments, the recommendation module 850 includes representations for media containers that other users, which are in a predetermined relationship with the second user, are listening to. In the example of FIG. 8Q, the recommendation module 850 includes representations 812b, 812d and 812e for 'Album FED', 'Album GHI' and 'Album KLM', respectively. In the example of FIG. 8Q, the recommendation module 850 includes the representation 812b for 'Album FED' because the first user corresponding to the device 100 is listening to 'Album FED' and the engagement of the first user with 'Album FED' is not hidden. As illustrated in FIG. 8R, when the first user hides the engagement of the first user with 'Album FED', the recommendation module 850 ceases to display the representation 812b for 'Album FED'. As such, when the first user hides engagement of the first user with a particular media container, then that particular media container is not recommended to other users based on the engagement of the first user with that particular media container. Hiding engagement with a media container allows the first user to listen to the media container without letting other users know that the first user is listening to the media container thereby providing the first user with a higher level of privacy. Hiding engagement of the first user with a media container enhances the operability of the device and makes the user-device interface more efficient (e.g., by reducing the need for a sequence of user inputs corresponding to a request to delete the media container, or to cease participation in music sharing in order to engage with the media container without advertising their engagement with the media container) which, additionally, reduces power usage and improves battery life of the device by enabling the user to use the device more quickly and efficiently.

Figure 8T:
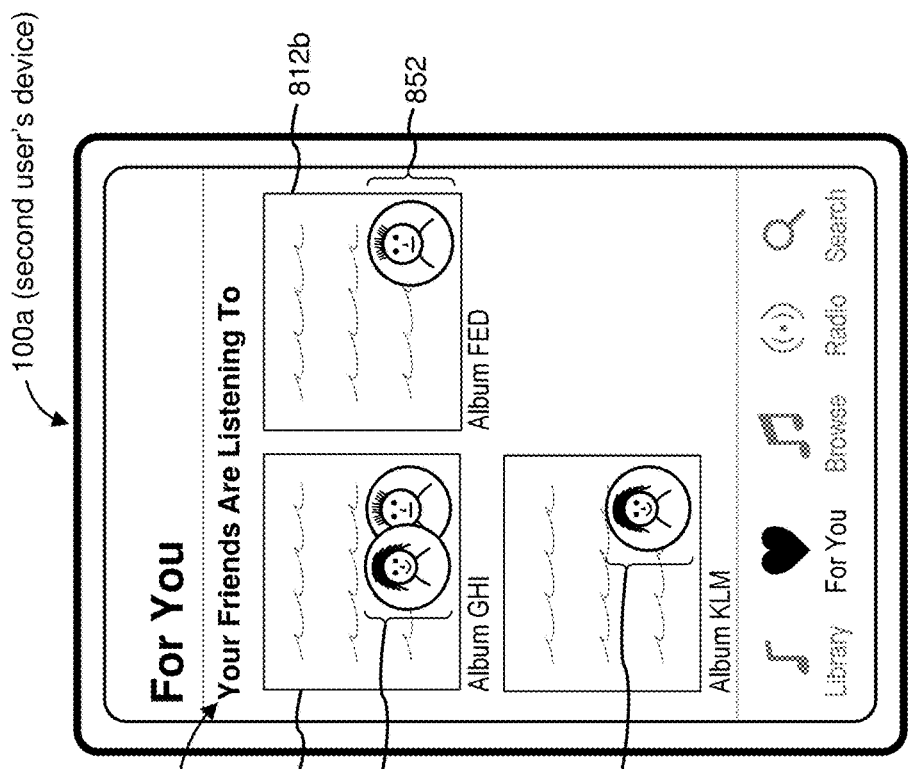
Figure 8S:
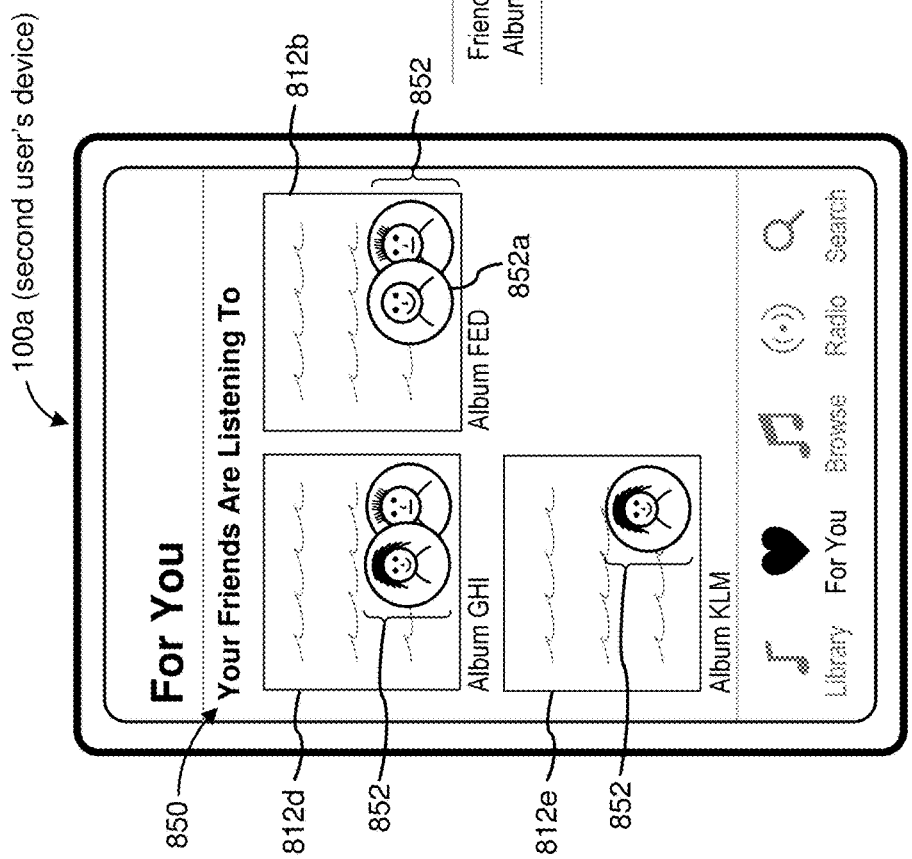

Referring to FIG. 8S, in some embodiments, the recommendation module 850 includes badges 852 that correspond with respective other users. The recommendation module 850 displays the badges 852 in association with the representations 812b, 812d and 812e. The badges 852 indicate the engagement of the respective other users. In the example of FIG. 8S, the badge 852a represents the first user (e.g., the user corresponding to the device 100 shown in FIGS. 8E-8F). Since the badge 852a is overlaid onto the representation 812b for 'Album FED', the badge 852a indicates that the first user is listening to 'Album FED'. In the example of FIG. 8S, the badge 852a is visible because the engagement of the first user with 'Album FED' is not hidden. As illustrated in FIG. 8T, when the first user chooses to hide the engagement of the first user with 'Album FED', then the badge 852a representing the first user is not displayed on the representation 812b for 'Album FED'. As shown in FIG. 8T, the recommendation module 850 ceases display of the badge 852a in response to the first user hiding the engagement of the first user with 'Album FED'. The recommendation module 850 maintains display of the representation 812b because another user is engaging with 'Album FED'. Hiding engagement with a media container allows the first user to listen to the media container without letting other users know that the first user is listening to the media container thereby providing the first user with a higher level of privacy.

Figure 8V:
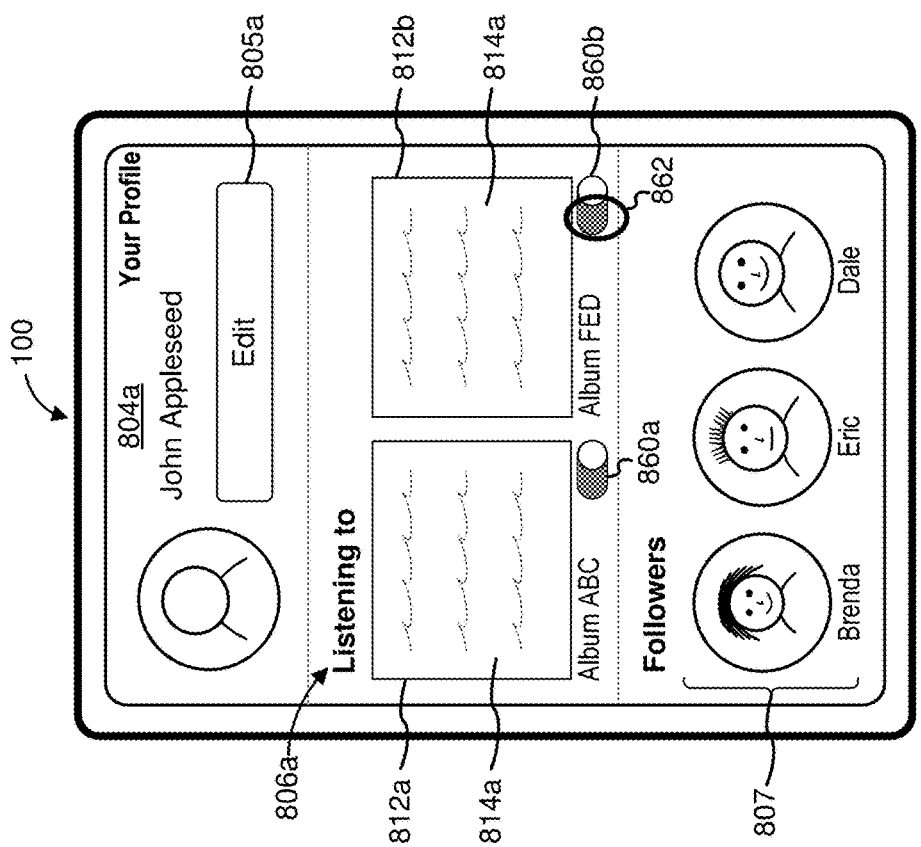
Figure 8U:
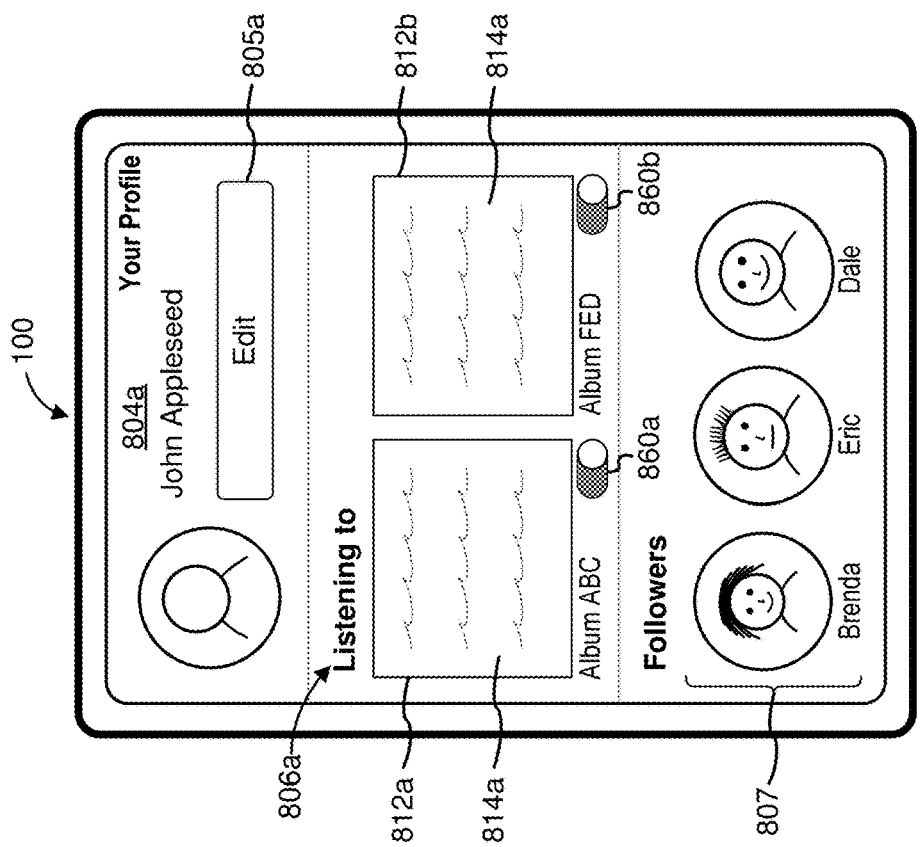
Figure 8X:
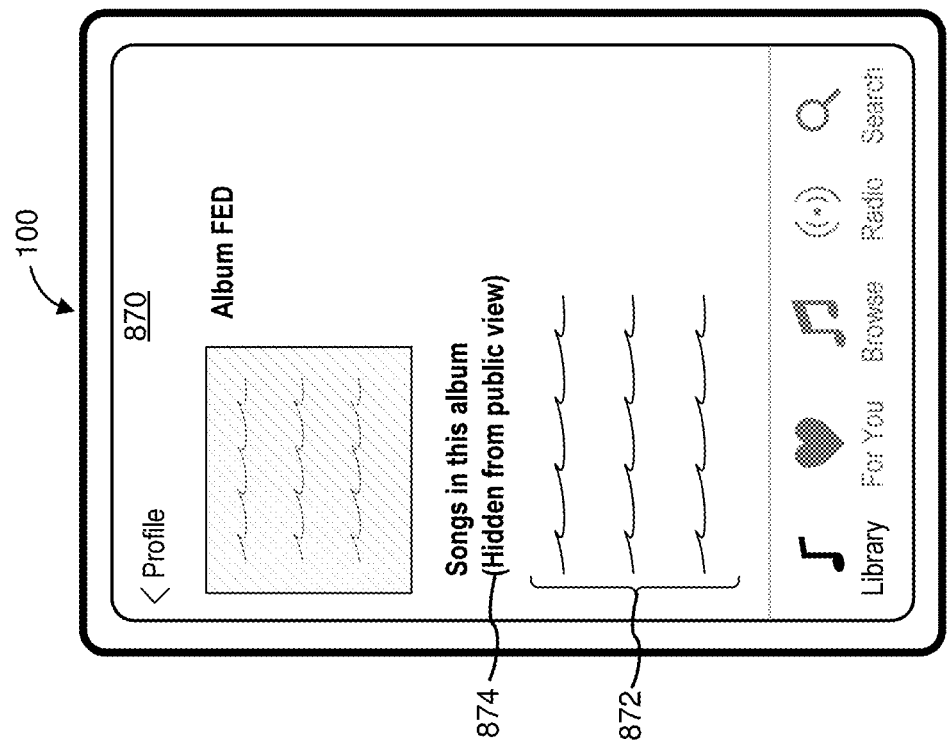
Figure 8W:
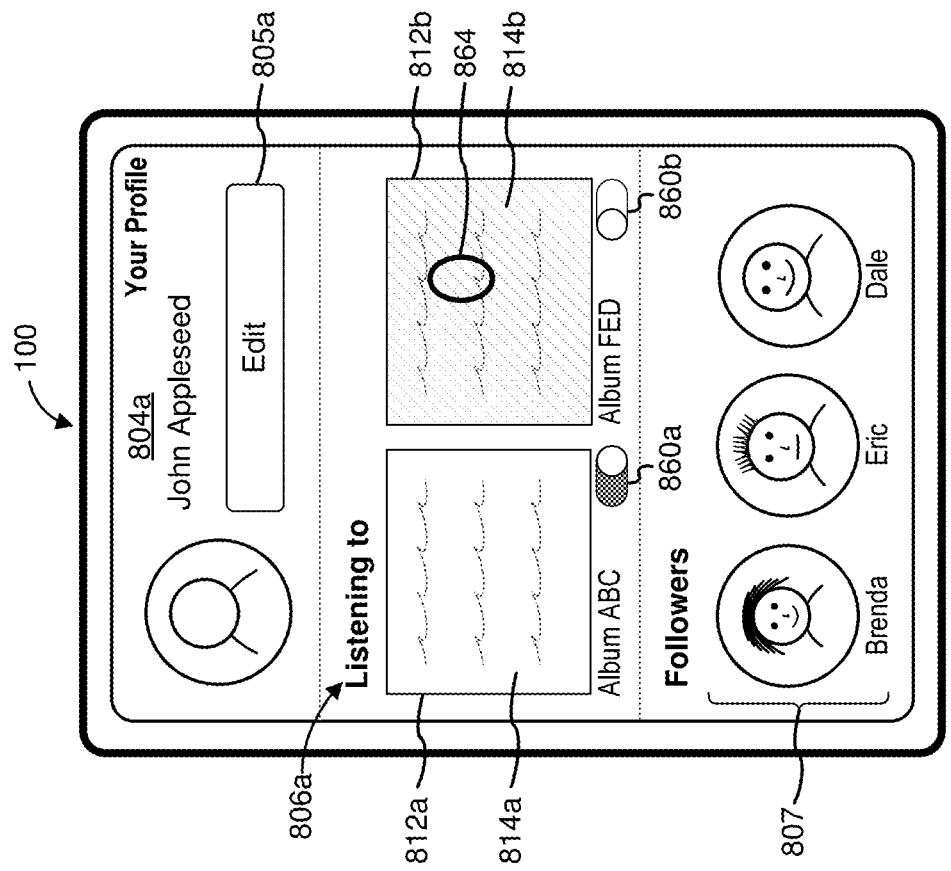

FIGS. 8U-8W illustrate a sequence in which the device 100 displays privacy setting affordances that correspond to respective media containers. The affordances, when activated, hide or unhide engagement of the first user with the respective media containers. Referring to FIG. 8U, the device 100 displays privacy setting affordances 860a and 860b for the representations 812a and 812b, respectively. In the example of FIGS. 8U-8W, the privacy setting affordances 812a and 812b include toggle switches with two mutually exclusive positions: an ON position and an OFF position. The ON position indicates that the engagement of the first user with the respective media container is not hidden. The OFF position indicates that the engagement of the first user with the respective media container is hidden. In some embodiments, the privacy setting affordances 860a and 860b are, by default, in the ON position. As such, in such embodiment, by default, the engagement of the first user with the media container is not hidden from other users. In the example of FIG. 8V, the device 100 receives a user input 862 at a location corresponding to the privacy setting affordance 860b for the representation 812b of 'Album FED'. The user input 862 corresponds to a request to switch the privacy setting affordance 860b from the ON position to the OFF position. The user input 862 corresponds to a request to hide the engagement of the first user with 'Album FED' from other users. As illustrated in FIG. 8W, in response to receiving the user input 862, the device 100 hides the engagement of the first user with 'Album FED'. In FIG. 8W, the privacy setting affordance 860b is in the OFF position indicating that the engagement of the first user with 'Album FED' is hidden from other users. Moreover, in FIG. 8W, the representation 812b has the shaded background 814b (e.g., instead of the clear background 814a) to indicate that engagement with 'Album FED' is hidden. Displaying privacy setting affordances (e.g., the privacy setting affordances 860a and 860b) for media containers allows the first user to selectively hide/unhide engagement of the first user with particular media containers thereby improving the controllability of the device 100 and providing a higher level of privacy to the first user. Displaying the privacy setting affordances enhances the operability of the device and makes the user-device interface more efficient (e.g., by reducing the need for a sequence of user inputs corresponding to a request to hide engagement of the first user with a media container) which, additionally, reduces power usage and improves battery life of the device by enabling the user to use the device more quickly and efficiently.

In the example of FIG. 8W, the device 100 receives a user input 864 at a location corresponding to the representation 812b for 'Album FED'. The user input 864 corresponds to a request to view more information about 'Album FED'. For example, the user input 864 corresponds to a request to view a list of individual media items (e.g., songs) that are in 'Album FED'. As illustrated in FIG. 8X, in response to receiving the user input 864, the device 100 displays an album screen 870 that displays information regarding 'Album FED'. For example, the album screen 870 displays representations 872 for songs that are in 'Album FED'. The album screen 870 also includes an indication 874 indicating that engagement of the first user with the individual songs is hidden from other users. The engagement of the first user with the individual songs in 'Album FED' is hidden because the first user chose to hide the engagement of the first user with 'Album FED'. More generally, in various embodiments, when the user chooses to hide engagement of the user with a particular media container, then the engagement of the user with individual media items in that particular media container is also hidden. By hiding the engagement of the user with individual media items when the user has chosen to hide the engagement with the media container, the device 100 reduces the need for a sequence of user inputs corresponding to requests for hiding engagement with the individual media items thereby improving the efficiency of the device 100 and providing a better user experience.

FIGS. 9A-9F illustrate a flow diagram of a method 900 of enrolling and/or selectively sharing music with other users. The method 900 is performed at a device (e.g., the device 100 in FIG. 1A, or the device 300 in FIG. 3) with one or more processors, non-transitory memory, a display, and one or more input devices. In some embodiments, the display is a touch-screen display and the one or more input devices are on or integrated with the display. In some embodiments, the display is separate from the one or more input devices. Some operations in method 900 are, optionally, combined and/or the order of some operations is, optionally, changed.

Figure 9A:
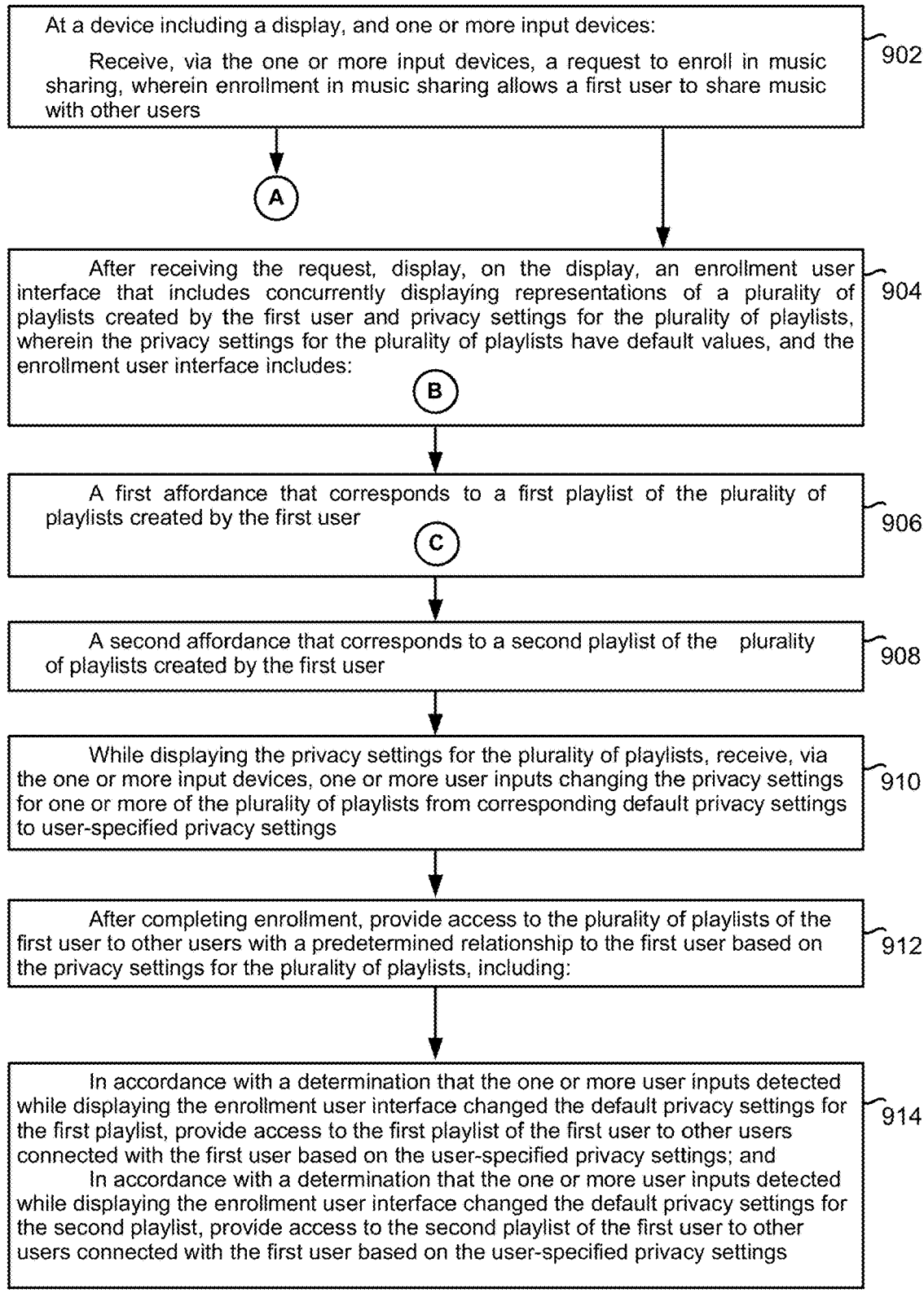

As described below, the method 900 provides a way to enroll in music sharing, and/or selectively share music with other users. Referring to FIG. 9A, the device receives (902), via the one or more input devices, a request to enroll in music sharing. In some embodiments, the enrollment in music sharing allows a first user to share music with other users. As an example, in FIG. 5A, the device 100 receives the user input 506 at a location corresponding to the affordance 504a.

After receiving the request, the device displays (904), on the display, an enrollment user interface that includes concurrently displaying representations of a plurality of playlists created by the first user and privacy settings for the plurality of playlists. As an example, in FIG. 5D, the device 100 displays the playlist sharing screen 524 that includes the representations 524a, 524b and 524c of playlists and respective privacy affordances 526a, 526b and 526c. The privacy settings for the plurality of playlists have default values. As an example, in FIG. 5D, the privacy affordances 526a, 526b and 526c are in the OFF position indicating that, by default, the corresponding playlists are not being shared with other users. The enrollment user interface includes a first affordance (906) that corresponds to a first playlist of the plurality of playlists created by the first user (e.g., a first toggle switch for a first playlist, for example, the privacy affordance 526a shown in FIG. 5D) and a second affordance (908) that corresponds to a second playlist of the plurality of playlists created by the first user (e.g., a second toggle switch for a second playlist, for example, the privacy affordance 526b shown in FIG. 5D). Displaying the first affordance and the second affordance allows the user to selectively mark the first playlist and the second playlist as private or public thereby providing an intuitive and user-friendly experience for sharing music with other users. Displaying the first and second affordances enhances the operability of the device and makes the user-device interface more efficient (e.g., by reducing the need for a sequence of user inputs corresponding to a request to explicitly share the playlists with various users) which, additionally, reduces power usage and improves battery life of the device by enabling the user to use the device more quickly and efficiently.

While displaying the privacy settings for the plurality of playlists, the device receives (910), via the one or more input devices, one or more user inputs changing the privacy settings for one or more of the plurality of playlists from corresponding default privacy settings to user-specified privacy settings (e.g., a user input activating one or more of the first affordance and the second affordance and/or toggling the first toggle switch ON and leaving the second toggle switch OFF). As an example, in FIG. 5E, the device 100 receiving the user input 528 to change the privacy setting of the 'Work' playlist from private to public. In some embodiments, a private playlist is a playlist that is not shared with any other user. In some embodiments, a public playlist is a playlist that is shared with one or more other users (e.g., visible on a user profile of the first user in a music sharing service such as the music recommendation engine described herein). As shown in FIG. 5D, in some embodiments, the default privacy setting is "private" for all playlists. However, in some embodiments, the default privacy setting is "public" for all of the playlists. In some embodiments, the default privacy setting is "my followers" for all playlists. In some embodiments, the default privacy setting depends on the content of the playlists or other user settings. In some embodiments, playlists that are marked as public are accessible to other users that have a predetermined relationship with the user of the device 100. In some embodiments, the playlists that are marked as public are presented as music recommendations to the other users. As an example, in FIG. 5F, since the 'Work' playlist is marked as public, the 'Work' playlist is accessible to other users that have the predetermined relationship with the user. In some embodiments, playlists that are marked as private are not accessible to the other users that have the predetermined relationship with the user of the device 100. In some embodiments, the playlists that are marked as private are not presented as music recommendations to the other users. As an example, in FIG. 5F, since the 'Date Nite' and 'Gym' playlists are marked as private, the 'Date Nite' and 'Gym' playlists are not accessible to others users that have the predetermined relationship with the user of the device 100. In some embodiments, the predetermined relationship refers to the user of the device 100 being connected to the other users via a music recommendation engine. The user inputs allow the user to selectively mark the first playlist and the second playlist as private or public thereby providing an intuitive and user-friendly experience for sharing music with other users.

After completing enrollment, the device provides (912) access to the plurality of playlists of the first user to other users with a predetermined relationship to the first user (e.g., other users who follow the user, other users specifically identified by the user, and/or other users who have a bi-directional "friend" relationship with the user or are otherwise connected to the user) based on the privacy settings for the plurality of playlists. As an example, in FIG. 5F, the device 100 provides other users with the predetermined relationship to the first user with access to the 'Work' playlist, but not the 'Date Nite' and 'Gym' playlists. Providing access to the playlists based on the privacy settings of the playlists allows the device to selectively provide access to some playlists while denying access to other playlists thereby providing the user more control over which playlists are publicly shared. Providing access to the playlists based on the privacy settings of the playlists enhances the operability of the device and makes the user-device interface more efficient (e.g., by reducing the need for a sequence of user inputs corresponding to a request to explicitly share the playlists with various users) which, additionally, reduces power usage and improves battery life of the device by enabling the user to use the device more quickly and efficiently.

The privacy settings for the plurality of playlists includes (914), in accordance with a determination that the one or more user inputs detected while displaying the enrollment user interface changed the default privacy settings for the first playlist, the device provides access to the first playlist of the first user to other users connected with the first user based on the user-specified privacy settings (e.g., the first playlist is made public if the first toggle switch is turned ON). As an example, in FIG. 5F, the device 100 provides access to the 'Work' playlist to other users based on the privacy affordance 526b being in the ON position. In accordance with a determination that the one or more user inputs detected while displaying the enrollment user interface changed the default privacy settings for the second playlist, the device provides access to the second playlist of the first user to other users connected with the first user based on the user-specified privacy settings (e.g., the second playlist is made private if the second toggle switch is turned OFF). As an example, in FIG. 5F, the device 100 does not provide access to the 'Gym' playlist to other users based on the privacy affordance 526c being in the OFF position. Providing access to the playlists based on the user-specified settings for the playlists allows the device to selectively provide access to some playlists while denying access to other playlists thereby providing the user more control over which playlists are publicly shared.

Figure 9B:
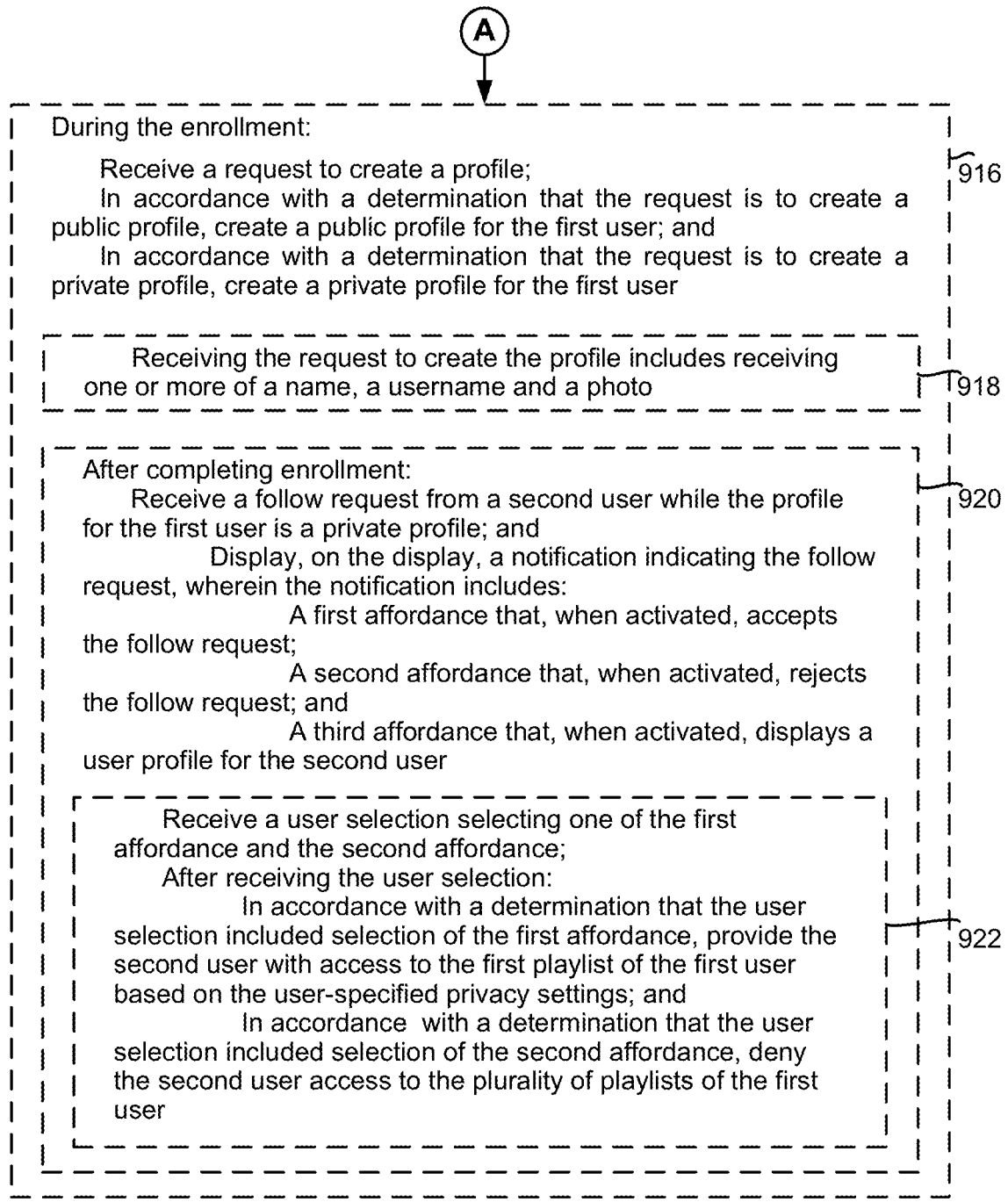

Referring to FIG. 9B, in some embodiments, during the enrollment, the device receives (916) a request to create a profile. In accordance with a determination that the request is to create a public profile, the device creates a public profile for the first user. In accordance with a determination that the request is to create a private profile, the device creates a private profile for the first user. In some embodiments, a public profile is a profile that can be viewed by any member of a music sharing service (e.g., by any member that receives music recommendations from the music recommendation engine described herein). In some embodiments, a private profile is a profile that can be viewed only by members of the music sharing service that have been approved by the first user (e.g., by other users that have the predetermined relationship with the first user). As an example, in FIG. 5M, the profile creation screen 508 includes a private profile affordance 548 that provides the user with an option to create a private profile. In the example of FIG. 5M, the private profile affordance 548 is in the ON position indicating that the user has chosen to create a private profile. In some embodiments, receiving the request to create the profile includes (918) receiving one or more of a name, a username and a photo. As an example, in FIG. 5B, the profile creation screen 508 includes various data fields 510 that allow the user to provide information regarding the user (e.g., name, username, etc.). Providing the option to create a private profile allows the user to restrict access to shared music of the user thereby providing the user more control and a better user experience.

In some embodiments, after completing enrollment, the device receives (920) a follow request from a second user (e.g., a user that is not in a predetermined relationship with the first user) while the profile for the first user is a private profile. In response to receiving the follow request, the device displays (920), on the display, a notification indicating the follow request. As an example, in FIG. 5O, the device 100 displays the follow request notification 556 indicating that the device 100 has received a follow request from a second device corresponding to a second user. The notification includes a first affordance (e.g., an accept button, for example, the accept affordance 560c shown in FIG. 5P) that, when activated, accepts the follow request, a second affordance (e.g., a reject button, for example, the reject affordance 560a shown in FIG. 5P) that, when activated, rejects the follow request, and a third affordance (e.g., a view profile button, for example, the view profile affordance 560b shown in FIG. 5P) that, when activated, displays a user profile for the second user. Displaying the follow request notification provides the user an option to view follow requests from other users and decide whether to accept or reject the follow requests thereby providing the user more control over which other users can access the user's shared music. Displaying the follow request notification enhances the operability of the device and makes the user-device interface more efficient (e.g., by reducing the need for a sequence of user inputs corresponding to a request view follow requests from other users) which, additionally, reduces power usage and improves battery life of the device by enabling the user to use the device more quickly and efficiently.

In some embodiments, the device receives (922) a user selection selecting one of the first affordance and the second affordance. After receiving the user selection (e.g., in response to receiving the user selection or receiving the user selection followed by a confirmation of the selection), in accordance with a determination that the user selection included selection of the first affordance (e.g., the accept affordance 560c shown in FIG. 5P), the device provides (922) the second user with access to the first playlist of the first user based on the user-specified privacy settings and (e.g., provide the second user access to the public playlists of the first user) and, in accordance with a determination that the user selection included selection of the second affordance (e.g., the reject affordance 560a shown in FIG. 5P), the device denies (922) the second user access to the plurality of playlists of the first user. The first and second affordances provide the user an option to accept or reject follow requests from other users thereby providing the user more control over which other users can access the user's shared music.

Referring to FIG. 9C, in some embodiments, during the enrollment, the device displays (924), on the display, a plurality of representations of other users that do not have a predetermined relationship with the first user. As an example, in FIG. 5I, the device 100 displays representations 536a, 536b and 536c for other users that do not have the predetermined relationship with the first user. In some examples, the device 100 displays representations for users that are not connected to the first user but who are recommended for the predetermined relationship with the first user due to shared social contacts via one or more social networks. For example, the device 100 displays recommendations for users that are friends with, follow, or are followed by the first user on a social network. In some examples, the device 100 displays representations for users for which the device 100 stores contact information (e.g., a phone number, an email address, or the like) in an address book on the device 100. The device displays, on the display, relationship affordances corresponding with the other users (e.g., the follow affordances 538a, 538b and 538c shown in FIG. 5I). Each respective relationship affordance, when activated, triggers the establishment of the predetermined relationship with the user corresponding with the affordance. Displaying the representations of other users that do not have a predetermined relationship with the first user provides the first user with an option to establish the predetermined relationship with the other users and access music shared by the other users (e.g., receive music recommendations that include music shared by other users) thereby reducing the need for a sequence of user inputs corresponding to manually requesting music of the other users. Displaying the representations of the other users enhances the operability of the device and makes the user-device interface more efficient (e.g., by reducing the need for a sequence of user inputs corresponding to requesting music from the other users) which, additionally, reduces power usage and improves battery life of the device by enabling the user to use the device more quickly and efficiently.

In some embodiments, the device displays (926), on the display, a plurality of representations of other users that do not have a predetermined relationship with the first user. The representations of the other users are selected for inclusion in the plurality of representations of other users based on a comparison of music preferences of the first user to music preferences of a plurality of candidate users other than the first user. As an example, in FIG. 5V, the device 100 displays representations 576c of contacts that have similar music taste 578 as the first user. The device displays a first subset, less than all, of the candidate users are included in the plurality of representations users based on the similarity of their music preferences to the music preferences of the first user (e.g., the representations 576c in FIG. 5V represent a subset of the representations 576a shown in FIG. 5T). The device displays a second subset, less than all, of the candidate users are excluded from the plurality of representations of users based on the similarity of their music preferences to the music preferences of the first user and. The users in the first subset of the candidate users have music preferences that are closer to music preferences of the first user than the users in the second set of candidate users. Displaying representations of other users that have music preferences that are similar to music preferences of the first user allow the first user to connect with other users that have similar music preferences. Displaying representations of other users with music preferences that are similar to the first user enhances the operability of the device and makes the user-device interface more efficient (e.g., by reducing the need for a sequence of user inputs corresponding to a request to view user profiles of other users in order to discern their music preferences) which, additionally, reduces power usage and improves battery life of the device by enabling the user to use the device more quickly and efficiently.

In some embodiments, the device displays (928), on the display, a plurality of representations of other users that do not have a predetermined relationship with the first user. Displaying the representations of the other users includes arranging (e.g., sorting) the representations of the other users based on a degree of similarity between the music preference of the first user and the music preferences of the other users that do not have a predetermined relationship with the first user. As an example, in FIG. 5V, the representations 576c of other users are ordered based on the similar music taste 578 of the other users. Ordering the representations of other users based on the similarity between the music preferences of the other users and the music preferences of the first user allows the first user to connect with other users that have similar music preferences.

In some embodiments, the device displays (930), on the display, a plurality of representations of other users that do not have a predetermined relationship with the first user. Displaying the representations of the other users includes concurrently displaying a graphical indication of the music preferences of a first user of the other users along with information identifying the first user and a graphical indication of the music preferences of a second user of the other users along with information identifying the second user. As an example, in FIG. 5V, the similar music taste 578 are graphical indications of music preferences of other users. In some embodiments, the graphical indication of the music preferences of a respective user indicates artists that the respective user listens to frequently. In some embodiments, the graphical indication of the music preferences of a respective user indicates genres of music that the respective user listens to frequently. In some embodiments, the graphical indication of the music preferences of a respective user includes a representation of content items, artists, and genres that the respective user listens to frequently and that the first user also listens to frequently (e.g., indications of shared musical taste between the first user and the respective user). Displaying the graphical indications of the music preferences of the other users provides the first user more information to decide whether the first user want to establish the predetermined relationship with the other users thereby providing a better user experience. Indicating the music preferences enhances the operability of the device and makes the user-device interface more efficient (e.g., by reducing the need for a sequence of user inputs corresponding to a request to view user profiles of other users in order to discern their music preferences) which, additionally, reduces power usage and improves battery life of the device by enabling the user to use the device more quickly and efficiently.

In some embodiments, the device displays (932), on the display, a plurality of representations of other users that do not have a predetermined relationship with the first user. Displaying the representations of the other users includes selecting the other users based on one or more of a geographic location of the first user (e.g., the other users are within a predefined location relative to the first user, for example, in the same country, the same city, the same state, or within 1 mile, 20 feet, or some other predefined distance) and a social network associated with the device (e.g., the other users are selected if the other users are connected with the first user via a social network application that is installed on the device and/or a social network that is associated with the device). As an example, in FIG. 5U, the device 100 displays representations 576b for other users that are near the device 100 (e.g., the other users are within a predefined location relative to the device 100, for example, in the same country, the same city, the same state, or within 1 mile, 20 feet, or some other predefined distance). Displaying the representations of other users based on their location allows the first user to connect with other users that are nearby.

Figure 9D:
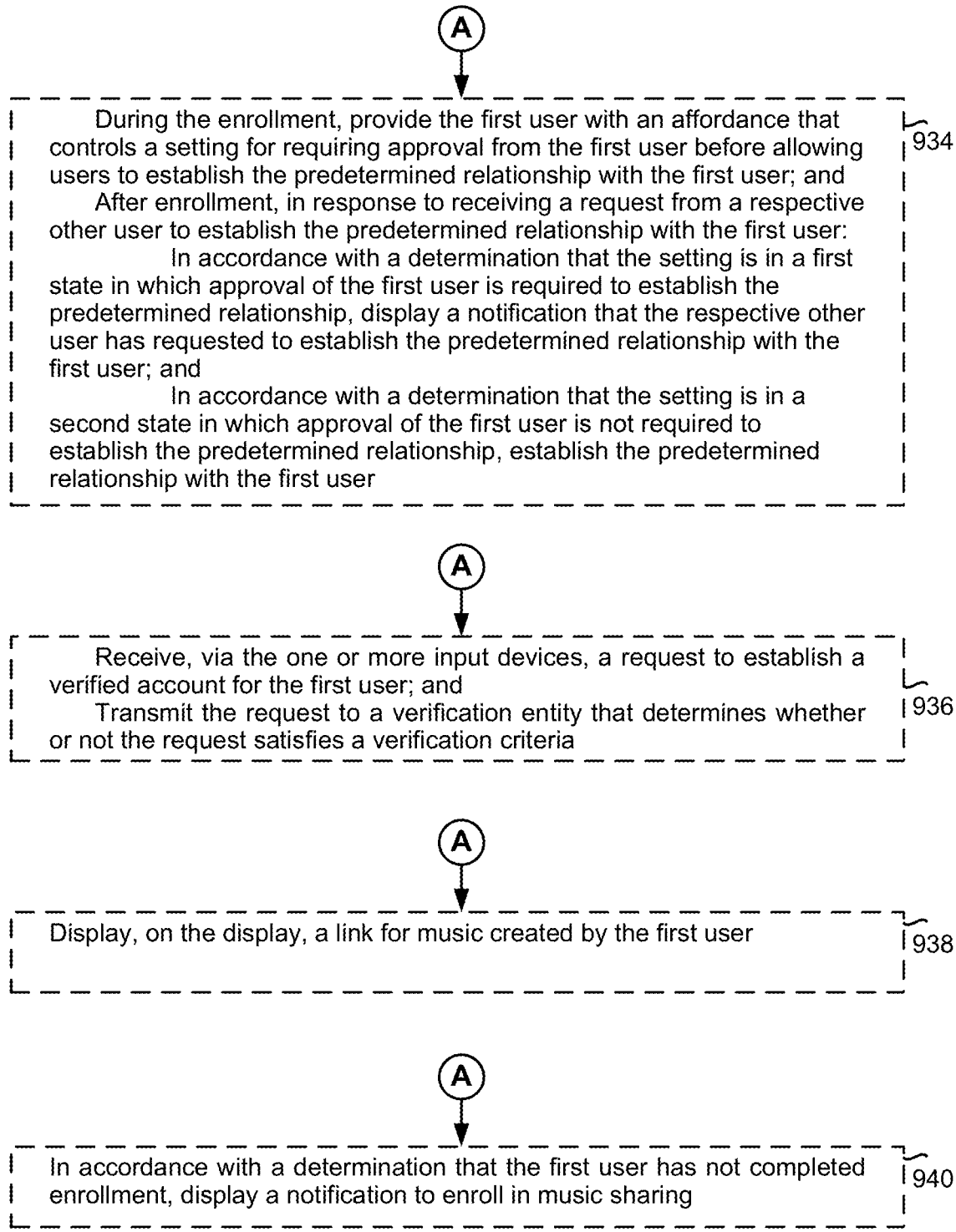

Referring to FIG. 9D, in some embodiments, during the enrollment, the device provides (934) the first user with an affordance that controls a setting for requiring approval from the first user before allowing users to establish the predetermined relationship with the first user. As an example, in FIG. 5M, when the private profile affordance 548 is in the ON position, approval is required from the first user before allowing other users to follow the first user. After enrollment, in response to receiving a request from a respective other user to establish the predetermined relationship with the first user: in accordance with a determination that the setting is in a first state in which approval of the first user is required to establish the predetermined relationship, the device displays (934) a notification that the respective other user has requested to establish the predetermined relationship with the first user. As an example, if the private profile affordance 548 is in the ON position, the device 100 displays the follow request notification 556 indicating that another user has requested to follow the first user. In some embodiments, the notification includes one or more options to accept or decline the request to establish the predetermined relationship with the first user (e.g., the accept affordance 560c and the reject affordance 560a shown in FIG. 5P).

In some embodiments, the notification includes a name of the user who is trying to follow the first user. In some embodiments, the notification includes an option to view the user profile of the user who is trying to follow the first user (e.g., the view profile affordance 560b shown in FIG. 5P). After enrollment, in response to receiving a request from a respective other user to establish the predetermined relationship with the first user, in accordance with a determination that the setting is in a second state in which approval of the first user is not required to establish the predetermined relationship, the device establishes the predetermined relationship with the first user. In some embodiments, the predetermined relationship is established without displaying the notification that the respective other user has requested to establish the predetermined relationship with the first user. As an example, if the private profile affordance 548 (shown in FIG. 5M) is in the OFF position, the device 100 establishes the predetermined relationship without displaying the follow request notification 556 (shown in FIG. 5O). In some embodiments, the predetermined relationship is established in conjunction with displaying a notification that the respective other user has requested to establish the predetermined relationship with the first user. The setting for requiring approval gives the first user more control over which other users can access the music shared by the first user thereby improving the controllability of the device and providing a better user experience.

In some embodiments, the device receives (936), via the one or more input devices, a request to establish a verified account for the first user. In some embodiments, the verified account indicates that the first user is a verified artist. In some embodiments, the verified account indicates that the first user is a verified celebrity. As an example, in FIG. 5Q, the profile creation screen 508 provides the user with an option to request for a verified account. For example, the profile creation screen 508 includes a verify request affordance 562 that the user can select to indicate a request for a verified account. The device transmits the request to a verification entity that determines whether or not the request satisfies a verification criteria. In some embodiments, the verification criterion includes being an artist. In some embodiments, the verification criterion includes having a threshold number of followers. Providing an option to establish a verified account allows the first user to create a user profile that indicates a higher level of authenticity. Providing an option to request a verified account enhances the operability of the device and makes the user-device interface more efficient (e.g., by reducing the need for a sequence of user inputs corresponding to submitting a request to establish a verified account) which, additionally, reduces power usage and improves battery life of the device by enabling the user to use the device more quickly and efficiently.

In some embodiments, the device displays (938), on the display, a link for music created by the first user. In some embodiments, the first user is an artist, and the link is for the artist's most recent album. As an example, in FIG. 5R, the device 100a associated with a second user displays a user profile 564 for a first user. The user profile 564 displays representations 568 of music (e.g., music albums) created by the first user.

In some embodiments, in accordance with a determination that the first user has not completed enrollment, the device displays (940), on the display, a notification to enroll in music sharing. As an example, in FIG. 5L, the device 100 displays the notification 546 that reminds the user to enroll for music sharing. In the example of FIG. 5L, the notification 546 includes a banner that is displayed towards the top of the touch-sensitive display. Displaying the reminder notification provides the user an option to enroll in music sharing even if the user overlooked or forgot to enroll for music sharing before. Reminding the user to enroll for music sharing enhances the operability of the device and makes the user-device interface more efficient (e.g., by reducing the need for a sequence of user inputs corresponding to a request to enroll for music sharing) which, additionally, reduces power usage and improves battery life of the device by enabling the user to use the device more quickly and efficiently.

Referring to FIG. 9E, in some embodiments, prior to displaying the enrollment user interface, the device determines (942) whether or not the first user is subscribed to a subscription-based music streaming service. In response to determining that the first user is subscribed to the subscription-based music streaming service, the device displays (942) the enrollment user interface and, in response to determining that the first user is not subscribed to the subscription-based music streaming service, the device foregoes (942) display of the enrollment user interface. In some embodiments, subscribing to the subscription-based music streaming service provides the user an option to enroll in music sharing.

In some embodiments, prior to displaying the enrollment user interface, the enrollment user interface includes (944) a third affordance that, when activated, changes the default values of the privacy settings for the plurality of playlists (e.g., a third toggle switch that controls the privacy settings for all the playlists). As an example, in FIG. 5G, the device 100 displays the privacy affordance 526d that allows the user to control the privacy setting for all the playlists. The third affordance allows the user to change the privacy settings for all the playlists thereby reducing the need for a sequence of user inputs corresponding to changing the privacy settings for each playlist.

In some embodiments, the representations of the plurality of playlists are scrollable (946). In some embodiments, the default values of the privacy settings for the plurality of playlists indicate that the plurality of playlists are private (948). As an example, in FIG. 5E, by default the privacy affordances 526a, 526b and 526c are in the OFF position indicating that the default values of the privacy setting is private. In some embodiments, the one or more user inputs changes the privacy settings for the first playlist from private to public, and the other users are provided access to the first playlist in response to the privacy settings for the first playlist being changed from private to public (950). As an example, in FIG. 5E, the device 100 receives the user input 528 to change the 'Work' playlist from private to public.

Figure 9F:
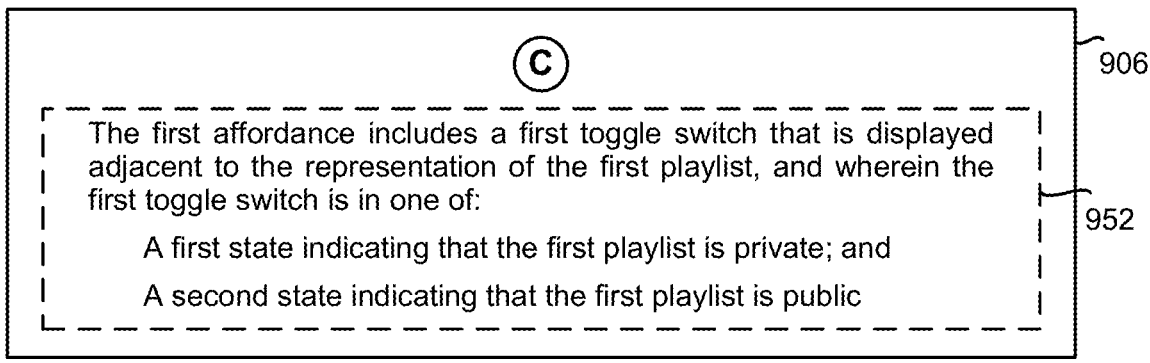

Referring to FIG. 9F, in some embodiments the first affordance includes a first toggle switch that is displayed adjacent to the representation of the first playlist (952). The first toggle switch is in one of a first state indicating that the first playlist is private and a second state indicating that the first playlist is public. In some implementations, the first toggle switch is in the first state (e.g., private position) by default. As an example, in FIG. 5E, the privacy affordance 526a is a toggle switch that is displayed adjacent to the representation 524a for the 'Work' playlist. Moreover, the privacy affordance 526a has an OFF position indicating that the 'Work' playlist is private, and an ON position indicating that the 'Work' playlist is public.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, and 1200) are also applicable in an analogous manner to method 900 described above with respect to FIGS. 9A-9F. For example, the user interfaces, user interface elements, media containers, playlists, profiles, notifications, music preferences, and predetermined relationships, etc., described above with reference to method 900 optionally have one or more of the characteristics of the user interfaces, user interface elements, media containers, playlists, profiles, notifications, music preferences, and predetermined relationships, etc. described herein with reference to other methods described herein (e.g., methods 1000, 1100, and 1200). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 9A-9F are, optionally, implemented by components depicted in FIGS. 1A-1B, or FIG. 3. For example, the receive operation 902 and the receive operation 910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10E illustrate a flow diagram of a method 1000 of providing notifications and engagement markers for music. The method 1000 is performed at an electronic device (e.g., the device 100 in FIG. 1A, or the device 300 in FIG. 3) with one or more processors, non-transitory memory, a display, and one or more input devices. In some embodiments, the display is a touch-screen display and the one or more input devices are on or integrated with the display. In some embodiments, the display is separate from the one or more input devices. Some operations in method 1000 are, optionally, combined and/or the order of some operations is, optionally, changed.

As described below, the method 1000 provides a way to notify and/or provide engagement markers for music. Referring to FIG. 10A, the device displays (1002), on the display, a media browsing user interface for a first user (e.g., for a user that is logged into the music application and/or the device). As an example, in FIG. 6B, the device 100 displays the media browsing user interface 602.

While displaying the media browsing user interface, the device receives (1004), via the one or more input devices, an input that corresponds to a request to display a different view of the media browsing user interface (e.g., a search input, a request to display representations of playlists, albums, artists recommended for the user, and/or a request to display representations of a predetermined set of playlists, albums, or artists). As an example, in FIG. 6A, the device 100 receives the user input 604 that corresponds to a request to display playlists of the user. In response to the input, the device concurrently displays (1004), within the media browsing user interface a plurality of representations of containers of media items. The plurality of representations include a representation of a first media container (e.g., a first playlist/album/song/radio station) and a representation of a second media container (e.g., a second playlist/album/song/radio station). In some embodiments, a media container is a collection of one or more media items that have been grouped together and are represented by a shared graphical representation in the user interface (e.g., a song, a playlist, a radio station, or an album of songs). As an example, in FIG. 6B, the device 100 displays the work playlist representation 606a that represents the 'Work Playlist', the study playlist representation 606b that represents the 'Study Playlist', and the workout playlist representation 606c that represents the 'Workout Playlist'.

In accordance with a determination that the first media container meets engagement criteria for the first user, wherein the engagement criteria for a respective media container include a criterion that other users with whom the first user has a predetermined relationship (e.g., users that the first user follows or is "friends" with) have engaged with media in the respective media container (e.g., within a predetermined time threshold), the device displays (1006) an engagement marker for (e.g., proximate to, overlaid on, or otherwise visually associated with) the representation of the first media container to indicate that users with which the first user has the predetermined relationship have engaged with one or more media items in the first media container. In some embodiments, the engagement marker indicates which user engaged with the container (e.g., engagement marker includes a picture of the other user). As an example, in FIG. 6B, the device 100 displays the engagement marker 608a for the 'Work Playlist'. In the example of FIG. 6B, the engagement marker 608a includes the badge 610a representing a first other user that is engaging with the 'Work Playlist'. Displaying the engagement marker for a representation of a media container provides an intuitive and user-friendly experience to obtain information regarding engagement of other users with the media container. Displaying engagement markers for media containers enhances the operability of the device and makes the user-device interface more efficient (e.g., by reducing the need for a sequence of user inputs corresponding to a request to display representations of media container that other users are engaging with) which, additionally, reduces power usage and improves battery life of the device by enabling the user to use the device more quickly and efficiently.

In accordance with a determination that the first media container does not meet the engagement criteria for the first user, the representation of the first media container is displayed (1008) without displaying an engagement marker for the representation of the first media container (e.g., forgoing displaying an engagement marker for the representation of the first media container). As an example, in FIG. 6B, the device 100 displays the study playlist representation 606b and the workout playlist representation 606c without engagement markers, for example, because the 'Study Playlist' and the 'Workout Playlist' do not meet the engagement criteria for the first user (e.g., other users with which the first user has the predetermined relationship are not engaging with the 'Study Playlist' and the 'Workout Playlist'). Displaying a representation of a media container without displaying the engagement marker indicates that other users with which the first user has the predetermined relationship are not engaging with the media container.

In accordance with a determination that the second media container meets engagement criteria for the first user, the device displays (1010) an engagement marker for (e.g., proximate to, overlaid on, or otherwise visually associated with) the representation of the second media container to indicate that users with which the first user has the predetermined relationship have engaged with one or more media items in the second media container. In some embodiments, the engagement marker indicates which user engaged with the container (e.g., engagement marker includes a picture of the other user). In accordance with a determination that the second media container does not meet the engagement criteria for the first user, the representation of the second media container is displayed without displaying an engagement marker for the representation of the second media container (e.g., forgoing displaying an engagement marker for the representation of the second media container). As an example, in FIG. 6D, the device 100 displays the engagement marker 608c for the workout playlist representation 606c. The engagement marker 608c includes the second badge 610b representing the second other user. Displaying engagement markers in association with media containers serves an intuitive and user-friendly way to indicate which media containers satisfy the engagement criteria. Including badges for different users in the engagement marker for a media container enhances the operability of the device and makes the user-device interface more efficient (e.g., by reducing the need for a sequence of user inputs corresponding to a request to display representations of other users that are engaging with the media container) which, additionally, reduces power usage and improves battery life of the device by enabling the user to use the device more quickly and efficiently.

Figure 10B:
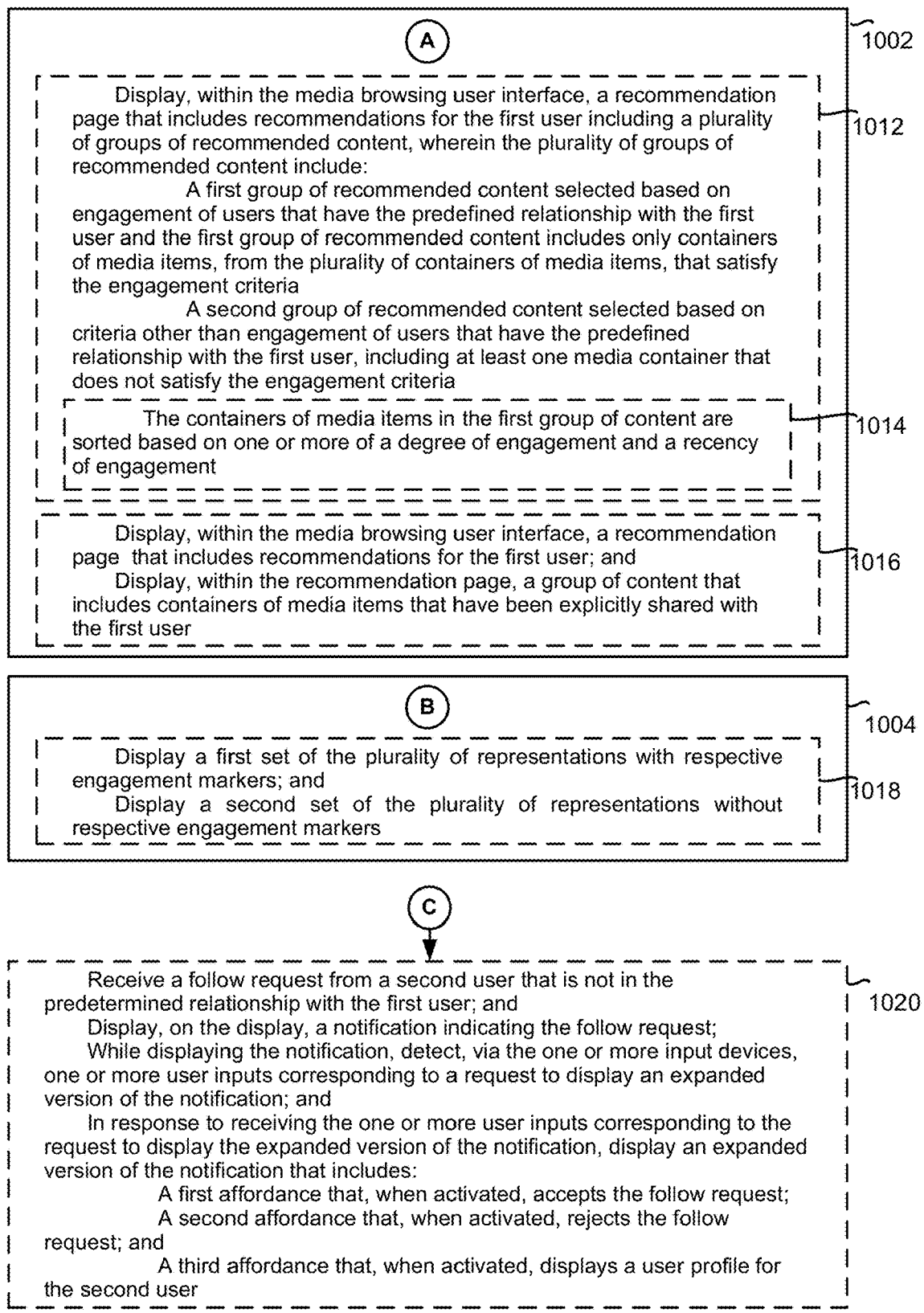

Referring to FIG. 10B, in some embodiments, the device displays (1012), within the media browsing user interface, a recommendation page (e.g., "For You page") that includes recommendations for the first user including a plurality of groups of recommended content. The plurality of groups of recommended content includes a first group of recommended content selected based on engagement of users that have the predefined relationship with the first user. The first group of recommended content includes only containers of media items, from the plurality of containers of media items that satisfy the engagement criteria (e.g., the first group of recommended content does not include media items that do not satisfy the engagement criteria). As an example, in FIG. 6M, the device 100 displays a media recommendation screen 640 that includes a social recommendation section 642 that recommends media containers that satisfy an engagement criteria for the user of the device 100. The plurality of groups of recommended content include a second group of recommended content selected based on criteria (e.g., a taste profile of the first user, recently played media of the first user, newly released content that matches a taste profile of the first user) other than engagement of users that have the predefined relationship with the first user, including at least one media container that does not satisfy the engagement criteria. In some embodiments, the second group of recommended content does not include any containers of media items that satisfy the engagement criteria. As an example, in FIG. 6N, the curated recommendation section 650 includes recommendations of media containers that do not satisfy the engagement criteria. Displaying the first group of recommended content allows the user to explore music that other users are engaging with, and displaying the second group of recommended content allows the user to explore music that other users may are be engaging with thereby providing diverse music recommendations. Displaying the first group of recommended content enhances the operability of the device and makes the user-device interface more efficient (e.g., by reducing the need for a sequence of user inputs corresponding to a request to display representations of media containers that other users are engaging with) which, additionally, reduces power usage and improves battery life of the device by enabling the user to use the device more quickly and efficiently.

In some embodiments, containers of media items in the first group of content are sorted (1014) based on one or more of a degree of engagement (e.g., frequency of interaction) and a recency of engagement (e.g., recency of interaction). As an example, in FIG. 6M, the representations 644a, 644b and 644c are ordered based on the number of badges that their respective engagement markers 646a, 646b and 646c, respectively, include. Sorting the media containers based on the degree of engagement allows the user to easily view media containers that are associated with the highest degree of engagement.

In some embodiments, the device displays (1016), within the media browsing user interface, a recommendation page (e.g., "For You page") that includes recommendations for the first user, and displays (1016), within the recommendation page, a group of content that includes containers of media items that have been explicitly shared with the first user (e.g., via messages and/or directly through the music app). Displaying media containers that have been explicitly shared with the first user provides the first user with an option to engage with the explicitly shared media containers.

In some embodiments, concurrently displaying the plurality of representations of containers of media items includes (1018) displaying a first set of the plurality of representations with respective engagement markers and displaying a second set of the plurality of representations without respective engagement markers. In some embodiments, the first set includes two or more containers of media items that meet the engagement criteria for the first user. In some embodiments, the second set includes two or more containers of media items that do not meet the engagement criteria for the first user. In some embodiments, the library displays the plurality of representations. Some of the representations have engagement markers, whereas other representations do not have engagement markers, for example, as illustrated in FIGS. 6C-6D, which enables a user to quickly look through media items or media containers in the user's media library or suggested media items or media containers to identify media items or containers that are being engaged with by other users that the first user is following.

In some embodiments, the device receives (1020) a follow request from a second user that is not in the predetermined relationship with the first user and displays (1020), on the display, a notification indicating the follow request (e.g., the follow request notification 556 shown in FIG. 5O). While displaying the notification, the device detects (1020), via the one or more input devices, one or more user inputs corresponding to a request to display an expanded version of the notification (e.g., a hard press, swipe, or tap on the notification). In response to receiving the one or more user inputs corresponding to the request to display the expanded version of the notification, the device displays (1020) an expanded version of the notification (e.g., the expanded version 560 shown in FIG. 5P). The expanded version of the notification includes: a first affordance (e.g., an accept button, for example, the accept affordance 560*c*) that, when activated, accepts the follow request, a second affordance (e.g., a reject button, for example, the reject affordance 560*a*) that, when activated, rejects the follow request; and a third affordance (e.g., a view profile button, for example, the view profile affordance 560*b*) that, when activated, displays a user profile for the second user. In some embodiments, the expanded version of the notification includes one button selected from the accept button, the reject button, and the view profile button. In some embodiments, the expanded version of the notification includes two buttons selected from the accept button, the reject button, and the view profile button. Displaying the notification provides a visual indication to the first user that another user has requested to establish the predetermined relationship with the first user. Displaying the expanded version of the notification provides the first user with options to accept or reject the request.

Referring to FIG. 10C, in some embodiments, the device displays (1022), on the display, a notification (e.g., a banner notification, for example, similar to the follow request notification 556 shown in FIG. 5O) indicating that at least one of the other users has engaged with (e.g., liked/loved/added to their library/downloaded/shared) one or more media items in one or more of the plurality of containers of media items.

In some embodiments, the engagement marker for the representation of the first media container indicates (1024) a type of engagement that at least one of the other users had with the first container of media items. As an example, in FIG. 6G, the device 100 displays an engagement type indicator 620*c* indicating that 'Brenda' likes the 'Work Playlist'. As another example, in FIG. 6H, the device 100 displays an engagement type indicator 620*b* indicating that 'Eric' loves the 'Work Playlist'. In accordance with a determination that the type of engagement is a first type of engagement (e.g., liked, loved, downloaded, listened to), the engagement marker includes a first symbol indicative of the first score (e.g., if the other user liked a media item, then the engagement marker includes a like symbol). Indicating the type of engagement provides additional information to the first user regarding the engagement of other users. Indicating the type of engagement enhances the operability of the device and makes the user-device interface more efficient (e.g., by reducing the need for a sequence of user inputs corresponding to a request to view the type of engagement) which, additionally, reduces power usage and improves battery life of the device by enabling the user to use the device more quickly and efficiently.

In some embodiments, in accordance with a determination that the type of engagement is a first type of engagement (e.g., liked, loved, downloaded, listened to), the engagement marker includes (1026) a first symbol indicative of the first score (e.g., if the other user liked a media item, then the engagement marker includes a like symbol). As an example, in FIG. 6G, the engagement type indicator 620*c* includes a thumbs-up symbol indicating that 'Brenda' liked the 'Work Playlist'. In accordance with a determination that the type of engagement is a second type of engagement (e.g., liked, loved, downloaded, listened to) different from the first type of engagement, the engagement marker includes (1026) a second symbol that is different from the first symbol (e.g., if the other user loved a media item, then the engagement marker includes a heart symbol). As an example, in FIG. 6H, the engagement type indicator 620*b* includes a heart symbol indicating that 'Eric' loved the 'Work Playlist'. Utilizing different symbols to indicate different types of engagement provides an intuitive and user-friendly way to indicate the type of engagement. Indicating the type of engagement enhances the operability of the device and makes the user-device interface more efficient (e.g., by reducing the need for a sequence of user inputs corresponding to a request to view the type of engagement) which, additionally, reduces power usage and improves battery life of the device by enabling the user to use the device more quickly and efficiently In some embodiments, in accordance with a determination that the type of engagement includes the at least one of the other users assigning a third score to the first media container, the engagement marker does not include (1028) a third symbol indicative of the third score, the third score being less than the first score (e.g., if the other user disliked the media item, then the engagement marker does not indicate that the other user disliked the media item).

In some embodiments, the device determines (1030) whether the other users (e.g., friends of the first user, for example, users that are connected to the first user via a music recommendation network) have engaged with (e.g., listened to/liked/loved/added to their playlist) one or more of the first media container and the second media container. In some embodiments, the device receives an indication that a second device corresponding to another user played media items from one or more of the first media container and the second media container.

In some embodiments, the engagement criteria for determining that a respective other user has engaged with a respective media container includes (1032) a criterion that is met when the device receives an indication that a second device has played the respective media container more than a threshold amount indicating that the respective other user has listened to (e.g., repeatedly listened to) the respective media container more than the threshold amount (e.g., a threshold number of times a threshold duration, a threshold number of times within a predetermined amount of time). As an example, in FIG. 6B, the first badge 610a within the engagement marker 608a indicates that the first other user represented by the first badge 610a has listened to the 'Work Playlist'. In some embodiments, the engagement criteria includes a criterion that is met when the device receives an indication that the second device associated with the respective other user has explicitly indicated a preference for the respective media container (e.g., marked the media container or a media item within the respective media container as liked or loved, or assigned a score/rating the respective media container or a media item within the respective media container that is greater than a threshold score). As an example, in FIGS. 6G, the engagement type indicator 620c indicates that 'Brenda' has explicitly indicated a preference for the 'Work Playlist' (e.g., that 'Brenda' likes the 'Work Playlist'). In some embodiments, the engagement criteria includes a criterion that is met when the device receives an indication that the second device associated with the respective other user has received an input that corresponds to a request to add the respective media container or a media item from the respective media container to a media library. In some embodiments, the engagement criteria includes a criterion that is met when the device receiving an indication that the second device associated with the respective other user has received an input that corresponds to a request to add the respective media container or a media item from the respective media container to a playlist. In some embodiments, the engagement criteria includes a criterion that is met when the device receives an indication that the second device associated with the respective other user has downloaded the respective media container or a media item from the respective media container. Including different criterion in the engagement criteria allows the device 100 to indicate different types of engagements. Indicating different types of engagements enhances the operability of the device and makes the user-device interface more efficient (e.g., by reducing the need for a sequence of user inputs corresponding to a request to view the type of engagement) which, additionally, reduces power usage and improves battery life of the device by enabling the user to use the device more quickly and efficiently.

Referring to FIG. 10D, in some embodiments, the engagement criteria for determining that a respective other user has engaged with a respective media container includes (1034) a criterion that is met when a number of interactions of the other users with the respective media container meets a threshold quantity of interactions (e.g., a number or frequency of interactions with the respective media container). In some embodiments, the number of interactions includes interactions of the same type (e.g., only listening). In some embodiments, the number of interactions includes interactions of different types (e.g., listening, downloaded, liking). In some embodiments, if the respective other user has had less than the threshold quantity of interactions with the respective media container, the respective other user is not identified as having engaged with the respective media container.

In some embodiments, in accordance with a determination that the engagement criteria includes an explicit criteria (e.g., liking/loving/adding to library/explicitly sharing), the device determines (1036) whether the number of interactions is greater than a first threshold (e.g., one interaction). In accordance with a determination that the engagement criteria includes an implicit criteria (e.g., listening), the device determines (1036) whether the number of interactions is greater than a second threshold, wherein the second threshold is greater than the first threshold (e.g., five or more interactions).

In some embodiments, the device displays (1038) a badge indicating that other users engaged with the one or more media items in the first media container. In some embodiments, the badge does not indicate which specific users engaged with the media container. As an example, in FIG. 6I, the device 100 displays the generic badge 610x representing a group of other users that engaged with the 'Work Playlist'. The device detects (1038), via the one or more input devices, a user input on the badge, and, in response, to detecting the user input on the badge, displays (1038) selectable affordances corresponding with the other users that engaged with the one or more media items in the first media container, each selectable affordance corresponds with a respective one of the other users. As an example, in FIG. 6L, the device 100 detects the user input 632 and displays the list 636 of users that are engaging with the 'Work Playlist'. Displaying affordances corresponding to the other users that are engaging with the media container allows the first user to see which other users are engaging with the media container. Displaying affordances corresponding to the other users that are engaging with the media container enhances the operability of the device and makes the user-device interface more efficient (e.g., by reducing the need for a sequence of user inputs corresponding to a request to view which other users are engaging with the media container) which, additionally, reduces power usage and improves battery life of the device by enabling the user to use the device more quickly and efficiently.

In some embodiments, the device displays (1040), via the one or more input devices, a user input activating one of the selectable affordances, and, in response to detecting the user input activating the one of the selectable affordances, displays (1040) a user profile for a respective one of the other users that engaged with one or more media items in the first media container. In some embodiments, the user profile displays media containers (e.g., playlists) of the respective one of the other users. In some embodiments, the user profile displays representations of users that have a predetermined relationship with the respective one of the other users (e.g., people who are following the respective one of the other users and/or people whom the respective one of the other users is following). As such, displaying selectable affordances of other users allows the first user to view user profiles for the other users that are engaging with music shared by the first user. Displaying the selectable affordances of other others enhances the operability of the device and makes the user-device interface more efficient (e.g., by reducing the need for a sequence of user inputs corresponding to a request to view user profiles for the other users that are engaging with the media shared by the first user) which, additionally, reduces power usage and improves battery life of the device by enabling the user to use the device more quickly and efficiently.

Figure 10E:
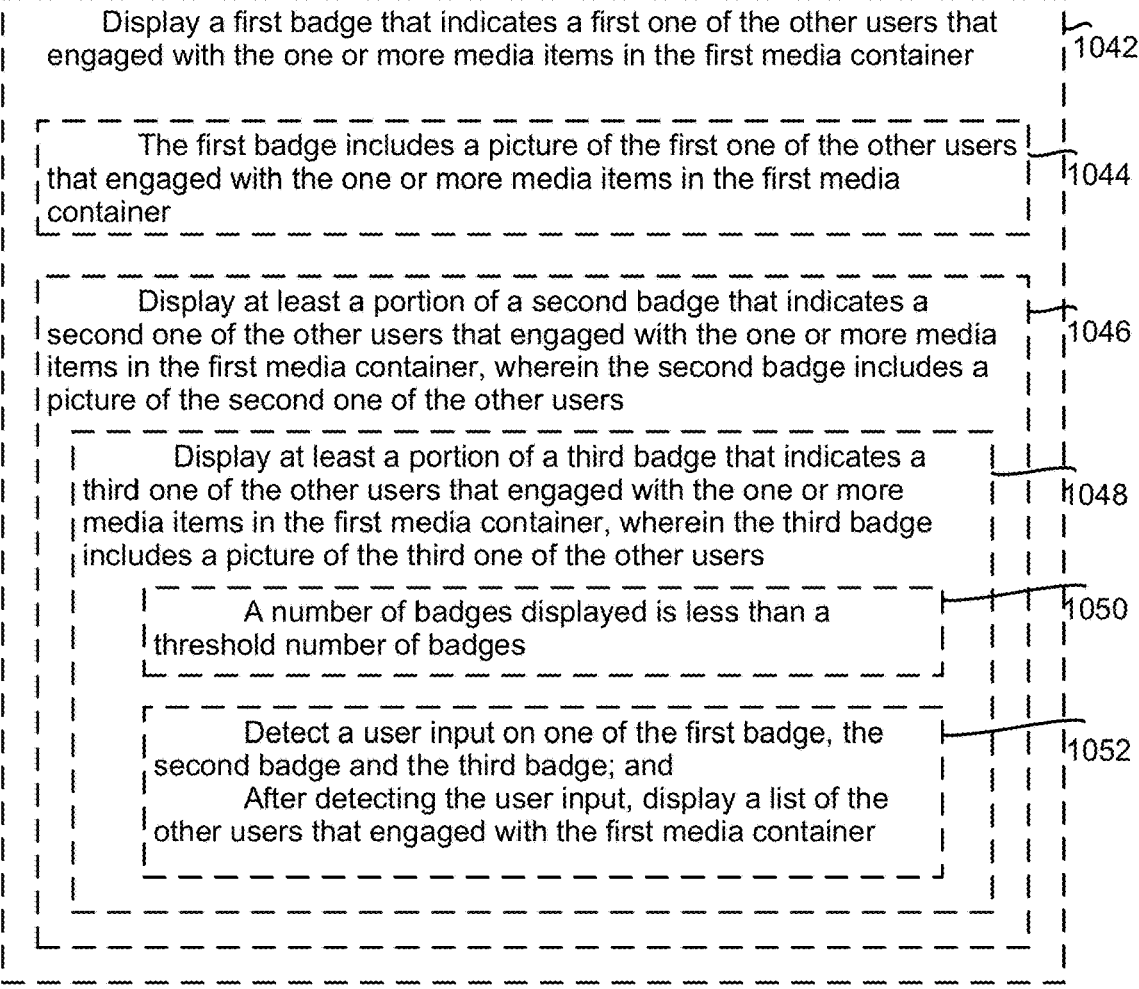
Figure 10E:
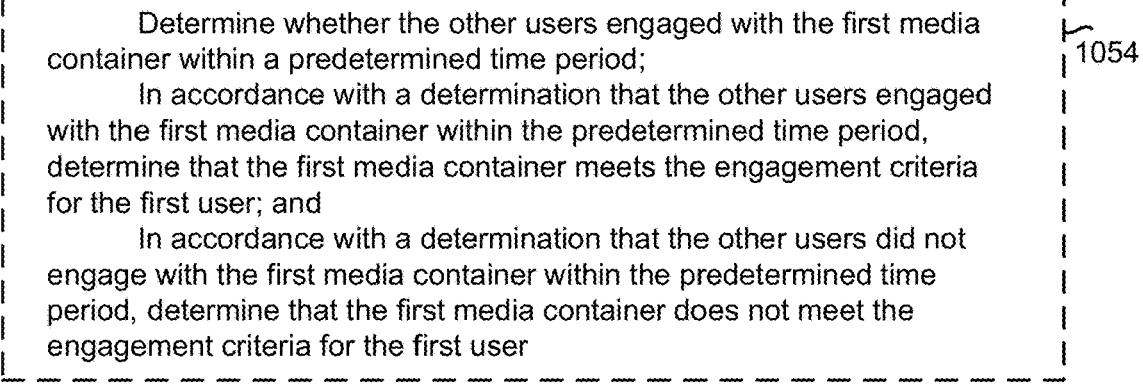

Referring to FIG. 10E, in some embodiments, the device displays (1042) a first badge that indicates a first one of the other users that engaged with the one or more media items in the first media container. In some embodiments, the first badge includes (1044) a picture (e.g., profile picture) of the first one of the other users that engaged with the one or more media items in the first media container. As an example, in FIG. 6B, the first badge 610a includes a picture representing the first other user that is engaging with the 'Work Playlist'. Displaying a picture representing the other user makes it easier for the first user to recognize the other users that are engaging with music shared by the first user. Displaying a picture representing the other user enhances the operability of the device and makes the user-device interface more efficient (e.g., by reducing the need for a sequence of user inputs corresponding to a request to display the picture representing the other user) which, additionally, reduces power usage and improves battery life of the device by enabling the user to use the device more quickly and efficiently.

In some embodiments, the device displays (1046) at least a portion of a second badge that indicates a second one of the other users that engaged with the one or more media items in the first media container. The second badge includes a picture of the second one of the other users. In some embodiments, the device displays (1048) at least a portion of a third badge that indicates a third one of the other users that engaged with the one or more media items in the first media container, wherein the third badge includes a picture of the third one of the other users. In some embodiments, a number of badges displayed (1050) is less than a threshold number of badges (e.g., less than four badges). As an example, in FIGS. 6E-6F, the device 100 displays three badges in the 'Work Playlist' representation 606a even though there are four users engaging with the 'Work Playlist'. Limiting the number of badges avoids cluttering the user interface and improves the legibility of the limited number of badges that are displayed.

In some embodiments, the device detects (1052) a user input on one of the first badge, the second badge and the third badge and after detecting the user input, displays (1052) a list of the other users that engaged with the first media container. As an example, in FIG. 6L, the device 100 detects the user input 632.

In some embodiments, the device determines (1054) whether the other users engaged with the first media container within a predetermined time period (e.g., within the last 7 days). In accordance with a determination that the other users engaged with the first media container within the predetermined time period, the device determines (1054) that the first media container meets the engagement criteria for the first user. In accordance with a determination that the other users did not engage with the first media container within the predetermined time period (e.g., the other users engaged with the first media container before the predetermined time period), the device determines (1054) that the first media container does not meet the engagement criteria for the first user. In some embodiments, the engagement criteria take into account the age of interactions with the media items based on other rules. For example, recent interactions with media items are optionally weighted more than older interactions with media items, so that interactions with older media items contribute less to the determination as to whether a media item or a media container met engagement criteria.

It should be understood that the particular order in which the operations in FIGS. 10A-10E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1200) are also applicable in an analogous manner to method 1000 described above with respect to FIGS. 10A-10E. For example, the user interfaces, user interface elements, media containers, playlists, profiles, notifications, music preferences, and predetermined relationships, etc., described above with reference to method 1000 optionally have one or more of the characteristics of the user interfaces, user interface elements, media containers, playlists, profiles, notifications, music preferences, and predetermined relationships, etc. described herein with reference to other methods described herein (e.g., methods 900, 1100, and 1200). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 10A-10E are, optionally, implemented by components depicted in FIGS. 1A-1B, or FIG. 3. For example, the receive operation 1004 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 11A-11D illustrate a flow diagram of a method 1100 of displaying representations of media containers that are marked as having been recently played by a user (e.g., by a user account associated with the device). The method 1100 is performed at an electronic device (e.g., the device 100 in FIG. 1A, or the device 300 in FIG. 3) with a one or more processors, non-transitory memory, a display, and one or more input devices. In some embodiments, the display is a touch-screen display and the one or more input devices are on or integrated with the display. In some embodiments, the display is separate from the one or more input devices. Some operations in method 1100 are, optionally, combined and/or the order of some operations is, optionally, changed.

Referring to FIG. 11A, the device displays (1102), on the display, a media browsing user interface for a media application (e.g., the media browsing user interface 702 shown in FIG. 7A). While displaying the media browsing user interface, the device receives (1102), via the one or more input devices, a request to display recently played media containers (e.g., recently played playlists, recently played albums, recently played radio stations, and/or recently played media items). As an example, in FIG. 7A, the device 100 receives the user input 706 at a location corresponding to the affordance 704*b*. In response to receiving the request to display the recently played media containers, the device displays (1102) a plurality of representations of media containers that are marked as having been recently played by a user (e.g., played by a user account associated with the device). As an example, in FIG. 7B, the device 100 displays the recently played section 710 that includes representations 712 and 712*a* for two media containers that have been recently played by the user of the device 100 (e.g., played by the user account associated with the device 100). The plurality of representations of media containers include a first media container that was generated based on a verbal instruction (e.g., a verbal utterance recorded and interpreted by a virtual assistant) requesting playback of media that matched a portion of the verbal instruction. In some embodiments, receiving the verbal instruction occurs prior to displaying the media browsing user interface (e.g., receiving the verbal instruction while displaying a home screen and/or receiving the verbal instruction while displaying a user interface generated by another application such as a browser application). As an example, in FIG. 7B, the representation 712*a* for 'Album DEF' includes the verbal indicator 714 indicating that the device 100 played 'Album DEF' in response to receiving a verbal instruction 720*a*. Displaying a representation for a media container that was played in response to a verbal instruction allows the user to play the media container later without uttering the same verbal instruction again thereby improving the efficiency of the device and providing a better user experience. Displaying a representation of a media container that was played in response to a verbal instruction enhances the operability of the device and makes the user-device interface more efficient (e.g., by reducing the need for a subsequent verbal instruction that is identical to the previous verbal instruction) which, additionally, reduces power usage and improves battery life of the device by enabling the user to use the device more quickly and efficiently.

In some embodiments, the first media container includes (1104) a representation of the verbal instruction that was used to generate the first media container. In some embodiments, the representation of the verbal instruction includes at least a portion of the verbal instruction. As an example, in FIG. 7D, the representation 712*a* includes at least a portion 721*a* of the verbal instruction 720*a*. Including a representation of the verbal instruction helps the user remember which verbal instruction caused the device 100 to play the media container.

In some embodiments, the first media container includes (1106) media items that are selected in accordance with a media taste profile of the user. As an example, in FIGS. 7M-7N, the device 100 plays media items that satisfy a media taste profile of the user in response to receiving the verbal instruction 720*e*. Playing music that satisfies a media taste profile of the user reduces the need for a sequence of user inputs corresponding to manually selecting the media items that the user likes thereby improving the efficiency of the device and providing a better user experience. Playing a media container in accordance with a media taste profile of the user enhances the operability of the device and makes the user-device interface more efficient (e.g., by reducing the need for a sequence of user inputs corresponding to manually selecting media items that satisfy a taste of the user) which, additionally, reduces power usage and improves battery life of the device by enabling the user to use the device more quickly and efficiently.

In some embodiments, the first media container includes (1108) media items that other users are engaging with (e.g., listening to, liking/loving, downloading, and/or explicitly sharing). In some embodiments, the other users have a predetermined relationship with the user (e.g., the other users are connected to the user). As an example, in FIGS. 7O-7P, the device receives a verbal instruction 720*f* that corresponds to a request to play music that other users are engaging with (e.g., "play my friends' music"). Playing music that other users are engaging with reduces the need for a sequence of user inputs corresponding to manually selecting the music that other users are engaging with thereby improving the efficiency of the device and providing a better user experience. Playing media items that other users are engaging with enhances the operability of the device and makes the user-device interface more efficient (e.g., by reducing the need for a sequence of user inputs corresponding to requesting, from other users, media items that the other users are engaging with) which, additionally, reduces power usage and improves battery life of the device by enabling the user to use the device more quickly and efficiently.

In some embodiments, the device receives (1110), via the one or more input devices, a user input on the representation of the first media container (e.g., receive a hard press or a long press). As an example, in FIG. 7Q, the device 100 receives the user input 740 on the representation 712*f*. In response to receiving the user input on the representation of the first media container, the device displays (1110) affordances for other users that affect the first media container by engaging with media items. As an example, in FIG. 7R, the device 100 displays the overlay 742 that includes representations 744 (e.g., affordances, for example, selectable affordances) for other users. The device receives (1110), via the one or more input devices, a user input on one of the affordances that corresponds with one of the other users, and, in response to receiving the user input on the one of the affordances, removes (1110) media items that the one of the other users engaged with from the first media container. The device 100 provides the user with an option to remove a particular user from a group of users that are affecting the contents of a media container.

Figure 11B:
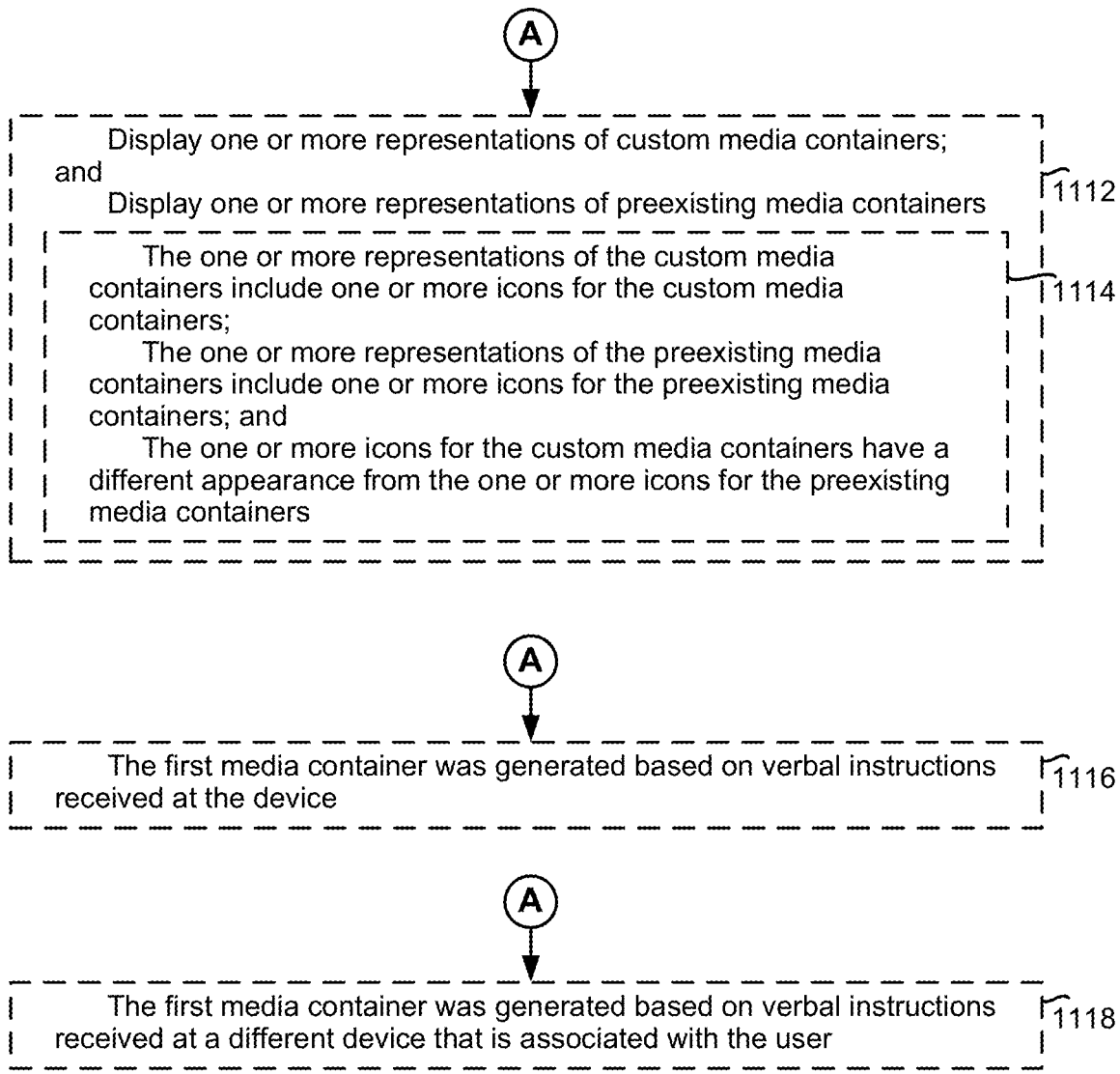

Referring to FIG. 11B, in some embodiments, the device displays (1112) one or more representations of custom media containers (e.g., custom playlists and/or custom radio stations) and displays (1112) one or more representations of preexisting media containers (e.g., preexisting playlists and/or preexisting radio stations). In some embodiments, the one or more representations of the custom media containers include (1114) one or more icons for the custom media containers, the one or more representations of the preexisting media containers include (1114) one or more icons for the preexisting media containers, and the one or more icons for the custom media containers have (1114) a different appearance from the one or more icons for the preexisting media containers (e.g., icons for custom containers have a blurred border). As an example, in FIG. 7F, the device 100 displays a custom container indication 713 in association with the representation 712*b* for the custom 'Hip-Hop' playlist. Varying the appearances of representations for custom media containers helps the user distinguish custom media containers from preexisting media containers. Providing different appearances for representations of custom media containers and representations of preexisting media containers enhances the operability of the device and makes the user-device interface more efficient (e.g., by reducing the need for a subsequent user input on one of the representation in order to discover whether the corresponding media container is a custom media container or a preexisting media container) which, additionally, reduces power usage and improves battery life of the device by enabling the user to use the device more quickly and efficiently.

In some embodiments, the first media container was generated based on verbal instructions received at the device (1116). In some embodiments, the first media container was generated (1118) based on verbal instructions received at a different device that is associated with the user. In some embodiments, the other device is a device without a display or with limited display capabilities such as a stand-alone speaker that has access to the user's music library.

Figure 11C:
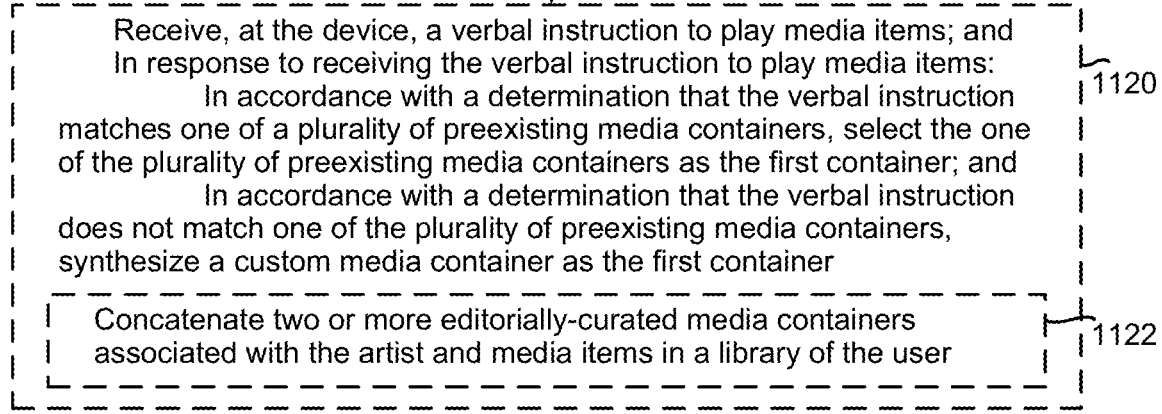
Figure 11C:
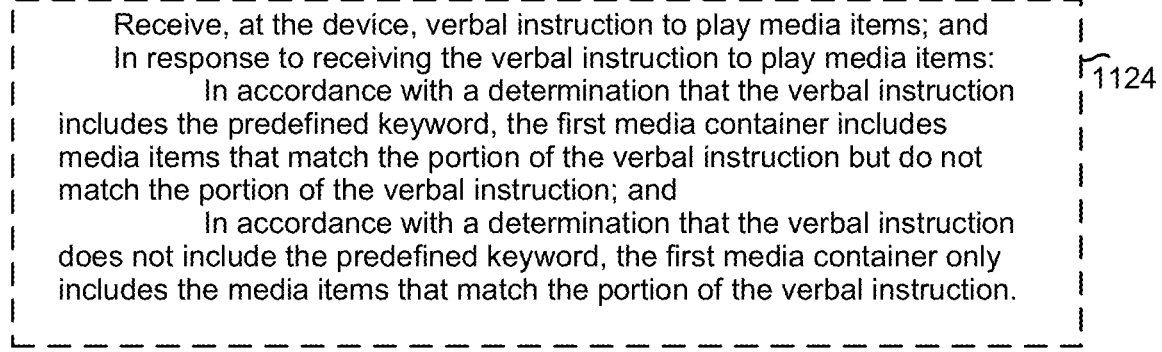

Referring to FIG. 11C, in some embodiments, the device receives (1120), at the device, a verbal instruction to play media items. In response to receiving the verbal instruction to play media items, in accordance with a determination that the verbal instruction matches one of a plurality of preexisting media containers, the device selects (1120) the one of the plurality of preexisting media containers as the first container. As an example, in FIGS. 7C-7D, the device 100 plays 'Album DEF', which is a preexisting media container. In accordance with a determination that the verbal instruction does not match one of the plurality of preexisting media containers, the device synthesizes (1120) a custom media container as the first container. As an example, in FIGS. 7E-7F, the device 100 plays a custom 'Hip-Hop' playlist, which is a custom media container. In some embodiments, the device determines whether or not the verbal instruction matches one of a plurality of preexisting media containers. For example, the device determines whether the verbal instruction includes a portion of the text corresponding to the preexisting media containers. In some embodiments, synthesizing the custom media container includes concatenating (1122) two or more editorially-curated media containers associated with the artist (e.g., two playlists with songs from the artist and, optionally, other media items associated with the artist, for example, the editorially curated playlists are following by "all songs") and media items in a library of the user. As an example, in FIG. 7H, the custom 'Hip-Hop' playlist is a concatenation of editorially-curated playlists 736a and 736b. Synthesizing a custom media container enhances the operability of the device and makes the user-device interface more efficient (e.g., by reducing the need for a sequence of user inputs corresponding to manually creating the custom media container) which, additionally, reduces power usage and improves battery life of the device by enabling the user to use the device more quickly and efficiently.

In some embodiments, the device receives (1124), at the device, verbal instruction to play media items. In response to receiving the verbal instruction to play media items, in accordance with a determination that the verbal instruction includes the predefined keyword, the first media container includes (1124) media items that match the portion of the verbal instruction and related media items that do not match the portion of the verbal instruction. In accordance with a determination that the verbal instruction does not include the predefined keyword, the first media container only includes (1124) the media items that match the portion of the verbal instruction. In some embodiments, the device determines whether or not the verbal instruction includes a predefined keyword (e.g., determining whether the verbal instruction includes the word "radio"). In some embodiments, when the verbal instruction includes the predefined keyword, the first media container also includes media items that match the portion of the verbal instruction and media items that are related to the media items. As an example, in FIGS. 7K-7L, the device 100 receives the verbal instruction 720d including a predefined keyword 728, and the device 100 plays a media container that includes media items that match the verbal instruction 720d (e.g., songs from an artist known as 'apple the rapper') and related media items that do not match the verbal instruction 720d (e.g., songs from other artists that are similar to songs from 'apple the rapper'). Detecting a predefined keyword in a verbal instruction causes the device to play related media items in addition to requested media items thereby allows the user to discover related music. Playing related media items in addition to the media items created by the particular artist enhances the operability of the device and makes the user-device interface more efficient (e.g., by reducing the need for a sequence of user inputs corresponding to effectuating the playback of the related media items) which, additionally, reduces power usage and improves battery life of the device by enabling the user to use the device more quickly and efficiently.

Figure 11D:
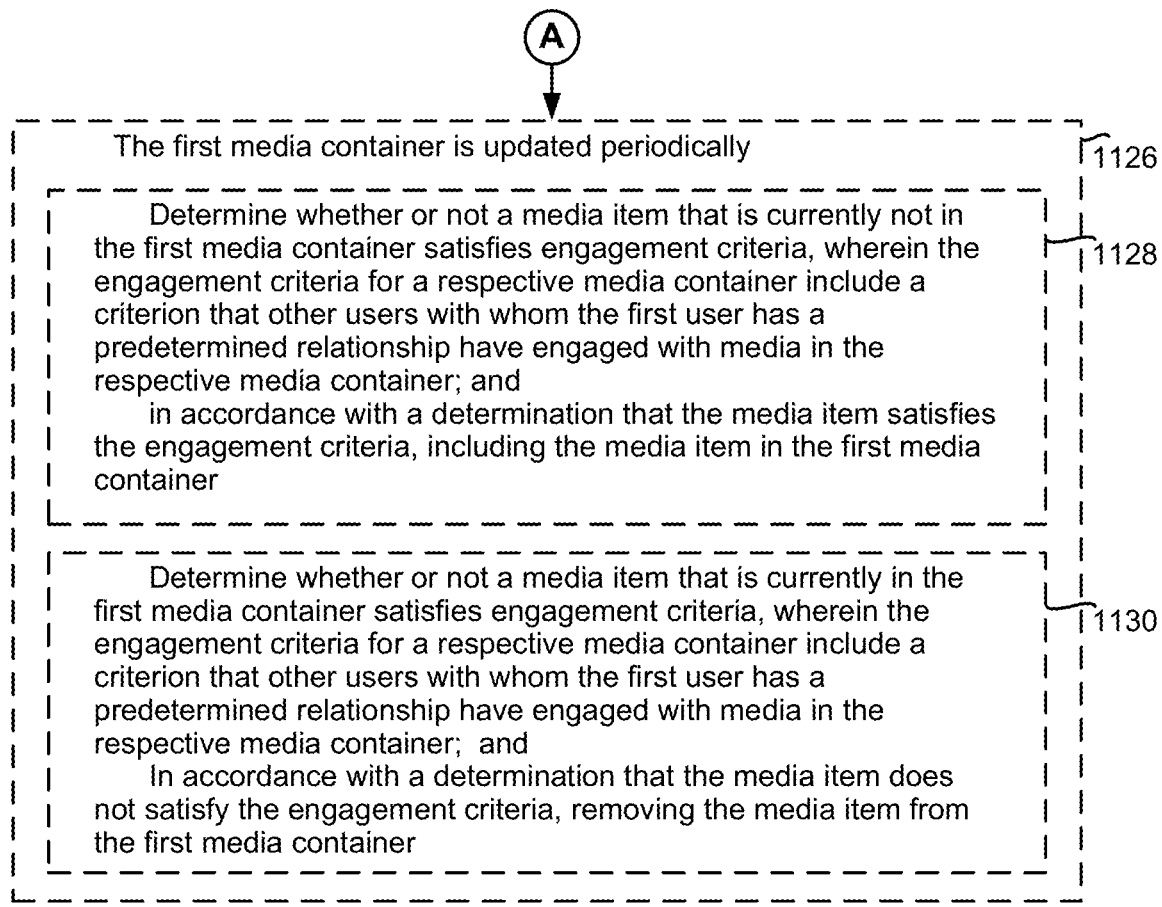

Referring to FIG. 11D, in some embodiments, the first media container is updated (1126) periodically (e.g., weekly/daily/monthly). Updating the media container allows the user to engage with music that is relevant (e.g., music that other users are engaging with).

In some embodiments, the device determines (1128) whether or not a media item that is currently not in the first media container satisfies engagement criteria. The engagement criteria for a respective media container include a criterion that other users with whom the first user has a predetermined relationship (e.g., users that the first user follows or is "friends" with) have engaged with media in the respective media container (e.g., within a predetermined time threshold). In accordance with a determination that the media item satisfies the engagement criteria, the device includes (1128) the media item in the first media container. In some embodiments, the engagement criteria include an engagement threshold (e.g., an engagement frequency threshold and/or an engagement recency threshold). In some embodiments, the media item satisfies the engagement criteria if an amount of engagement with the media item is greater than the engagement threshold. Including a media item in a media container based on the engagement of other users with the media item allows the user to listen to media items that other users are currently engaging with.

In some embodiments, the device determines (1130) whether or not a media item that is currently in the first media container satisfies engagement criteria, wherein the engagement criteria for a respective media container include a criterion that other users with whom the first user has a predetermined relationship (e.g., users that the first user follows or is "friends" with) have engaged with media in the respective media container (e.g., within a predetermined time threshold). In accordance with a determination that the media item does not satisfy the engagement criteria, the device removes (1130) the media item from the first media container. In some embodiments, the engagement criteria include an engagement threshold (e.g., an engagement frequency threshold and/or an engagement recency threshold. In some embodiments, the media item does not satisfy the engagement criteria if an amount of engagement with the media item is less than the engagement threshold. Removing a media item from a media container based on the lack of engagement of other users with the media item allows the user to listen to media items that other users are currently engaging with.

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1200) are also applicable in an analogous manner to method 1100 described above with respect to FIGS. 11A-11D. For example, the user interfaces, user interface elements, media containers, playlists, profiles, notifications, music preferences, and predetermined relationships, etc., described above with reference to method 1100 optionally have one or more of the characteristics of the user interfaces, user interface elements, media containers, playlists, profiles, notifications, music preferences, and predetermined relationships, etc. described herein with reference to other methods described herein (e.g., methods 900, 1000, and 1200). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 11A-11D are, optionally, implemented by components depicted in FIGS. 1A-1B, or FIG. 3. For example, the receive operation 1102 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12E illustrate a flow diagram of a method 1200 of hiding music from public view. The method 1200 is performed at an electronic device (e.g., the device 100 in FIG. 1A, or the device 300 in FIG. 3) with a one or more processors, non-transitory memory, a display, and one or more input devices. In some embodiments, the display is a touch-screen display and the one or more input devices are on or integrated with the display. In some embodiments, the display is separate from the one or more input devices. Some operations in method 1200 are, optionally, combined and/or the order of some operations is, optionally, changed.

As described below, the method 1200 provides a way for a first user to hide engagement of the first user with a particular media container from other users that are in a predetermined relationship with the first user. Referring to FIG. 12A, the device displays (1202), on the display, a media engagement user interface that includes a plurality of representations of containers of media items for which a first user has met engagement criteria. As an example, in FIG. 8A, the device 100 displays a media engagement user interface 802 that includes representations 812*a* and 812*b* for media containers that the first user is listening to. The engagement of the first user with the plurality of containers of media items are visible to other users that have a predetermined relationship to the first user (e.g., as engagement markers in a media browsing user interface as described above or in a user profile for the first user as described above). As an example, in FIG. 8B, the second device 100*a* displays a public version 804 of a user profile, for the first user, which includes the representations 812*a* and 812*b* for the media containers that the first user is listening to.

The device concurrently displays a representation of a first media container (1204) and a representation of a second media container (1206). In some implementations, a container includes a single music item. As an example, FIG. 8A, the device 100 displays the representations 812*a* and 812*b* for two media containers. The device detects (1206), via the one or more input devices, a sequence of one or more inputs that corresponds to a request to hide the engagement of the first user with a respective media container (e.g., user taps on the first container). In some embodiments, a first portion of the sequence of one or more inputs that corresponds to the request to hide the engagement of the first user with the respective media container is detected while displaying, on the display, the representation of media item containers for which the first user has met the engagement criteria. As an example, the device 100 receives the user input 820 (shown in FIG. 8C) corresponding to a request to display the menu 822 (shown in FIG. 8D). After displaying the menu 822, the device 100 receives the user input 826 (shown in FIG. 8E) that corresponds to a request to hide the engagement of the first user with a media container (e.g., with 'Album FED'). Providing the option to hide engagement with a media container provides a higher level of privacy to the first user thereby improving the user experience. Hiding engagement of the first user with a media container enhances the operability of the device and makes the user-device interface more efficient (e.g., by reducing the need for a sequence of user inputs corresponding to a request to delete the media container, or cease participation in music sharing in order to engage with the media container without advertising their engagement with the media container) which, additionally, reduces power usage and improves battery life of the device by enabling the user to use the device more quickly and efficiently.

In response to detecting, via the one or more input devices, the sequence of one or more inputs that corresponds to the request to hide the engagement of the first user with the respective media container, in accordance with a determination that the sequence of one or more inputs corresponded to a request to hide the engagement of the first user with the first media container, the device changes (1208) an appearance of the representation of the first media container without changing the appearance of the representation of the second media container. As an example, in FIGS. 8E-8F, after receiving the user input 826 the device 100 changes an appearance of the representation 812*b*. In the example of FIG. 8F, the representation 812*b* has a shaded background 814*b* (e.g., instead of clear background 814*a*). The change to the representation of the first media container indicates that the engagement of the first user with the first media container is hidden from view by other users with the predetermined relationship to the first user. In some embodiments, the representation of the first container (e.g., with the changed appearance) is displayed concurrently with the representation of the second container. In some embodiments, hiding the engagement of the first user removes engagement markers for the first user on media items in other users' media libraries. In some embodiments, hiding the engagement of the first user removes the media container from a public version of a user profile of the first user, so that other users cannot see that the first user is engaging with the media container. Changing the appearance of the representation makes is easier for the first user to identify which media containers are hidden and which media containers are not hidden thereby improving the user experience. Indicating that engagement with a media container is hidden from other users enhances the operability of the device and makes the user-device interface more efficient (e.g., by reducing the need for a sequence of user inputs corresponding to a request to display whether engagement with the media container is hidden or not) which, additionally, reduces power usage and improves battery life of the device by enabling the user to use the device more quickly and efficiently.

In accordance with a determination that the sequence of one or more inputs corresponded to a request to hide the engagement of the first user with the second media container, the device changes (1210) an appearance of the representation of the second media container without changing the appearance of the representation of the first media container, wherein the change to the appearance of the representation of the second media container indicates that the engagement of the first user with the second media container is hidden from view by the other users with the predetermined relationship to the first user. In some embodiments, the representation of the second container (with the changed appearance) is displayed concurrently with the representation of the first container.

Figure 12B:
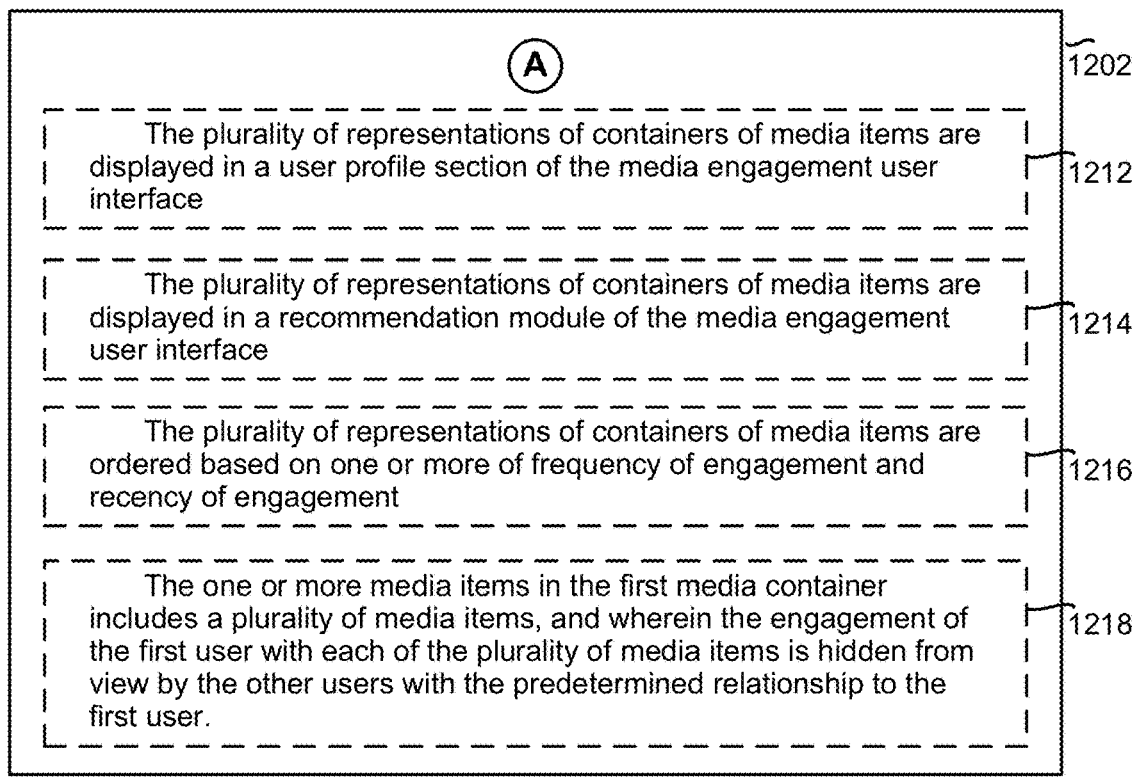

Referring to FIG. 12B, in some embodiments, the plurality of representations of containers of media items are displayed (1212) in a user profile section of the media engagement user interface. As an example, in FIG. 8G, the second device 100*a* displays a public version 804 of the user profile for the first user that includes the representation 812*a* for 'Album ABC', but not the representation 812*b* for 'Album FED' because the first user chose to hide the engagement of the first user with 'Album FED'.

In some embodiments, the plurality of representations of containers of media items are displayed (1214) in a recommendation module of the media engagement user interface (e.g., in the "For You" section). As an example, in FIG. 8Q, the second device 100*a* displays a recommendation module 850 that includes representations 812*b*, 812*d* and 812*e* for media containers that other users are engaging with.

In some embodiments, the plurality of representations of containers of media items are ordered (1216) based on one or more of frequency of engagement and recency of engagement. As an example, in FIG. 8L, the device 100 orders the representations 812*a* and 812*b* based on the recency of engagement of the first user with the corresponding media containers. Ordering representations of media containers based on recency makes it easier for the user to access media containers that the user recently played. Determining the display order for representations of hidden media containers enhances the operability of the device and makes the user-device interface more efficient (e.g., by reducing the need for a user input that corresponds to scrolling through the representations in order to view representations of hidden media containers) which, additionally, reduces power usage and improves battery life of the device by enabling the user to use the device more quickly and efficiently.

In some embodiments, the one or more media items in the first media container includes (1218) a plurality of media items, and wherein the engagement of the first user with each of the plurality of media items is hidden from view by the other users with the predetermined relationship to the first user. Hiding the engagement of the first user with each of the plurality of media items allows the user to hide the engagement with the media container and reduces the need for a sequence of user inputs corresponding to hiding each media item in the media container thereby improving the efficiency of the device and providing a better user experience. Hiding engagement of the first user with each of the plurality of media items enhances the operability of the device and makes the user-device interface more efficient (e.g., by reducing the need for a sequence of user inputs that correspond to hiding the engagement of each of the media items) which, additionally, reduces power usage and improves battery life of the device by enabling the user to use the device more quickly and efficiently.

In some embodiments, the plurality of representations of containers of media items are displayed (1220) in a module of a profile page for the first user (e.g., the listening section 806 shown in FIG. 8G and/or the listening section 806*a* shown in FIG. 8H). The module indicates media items that the first user is listening to (e.g., in the "Listening to" section). In some embodiments, the device presents (1222) at least one of the plurality of containers of media items as a media recommendation to at least one of the other users with whom the first user has the predetermined relationship (e.g., in the recommendation module 850 shown in FIG. 8Q). In some embodiments, after the engagement of the first user with the first media container is hidden from view by the other users with the predetermined relationship to the first user, the device foregoes (1224) presenting the first media container as the media recommendation to the at least one of the other users with whom the first user has the predetermined relationship (e.g., in FIG. 8R, the second device 100*a* forgoes display of the representation 812*b* for 'Album FED' after the first user hides engagement of the first user with 'Album FED'). Hiding engagement with a media container allows the first user to listen to the media container without letting other users know that the first user is listening to the media container thereby providing the first user with a higher level of privacy. Hiding engagement of the first user with a media container enhances the operability of the device and makes the user-device interface more efficient (e.g., by reducing the need for a sequence of user inputs that correspond to deleting the media container or signing out of the device in order to prevent other users from seeing that the first user is engaging with the media container) which, additionally, reduces power usage and improves battery life of the device by enabling the user to use the device more quickly and efficiently.

Figure 12C:
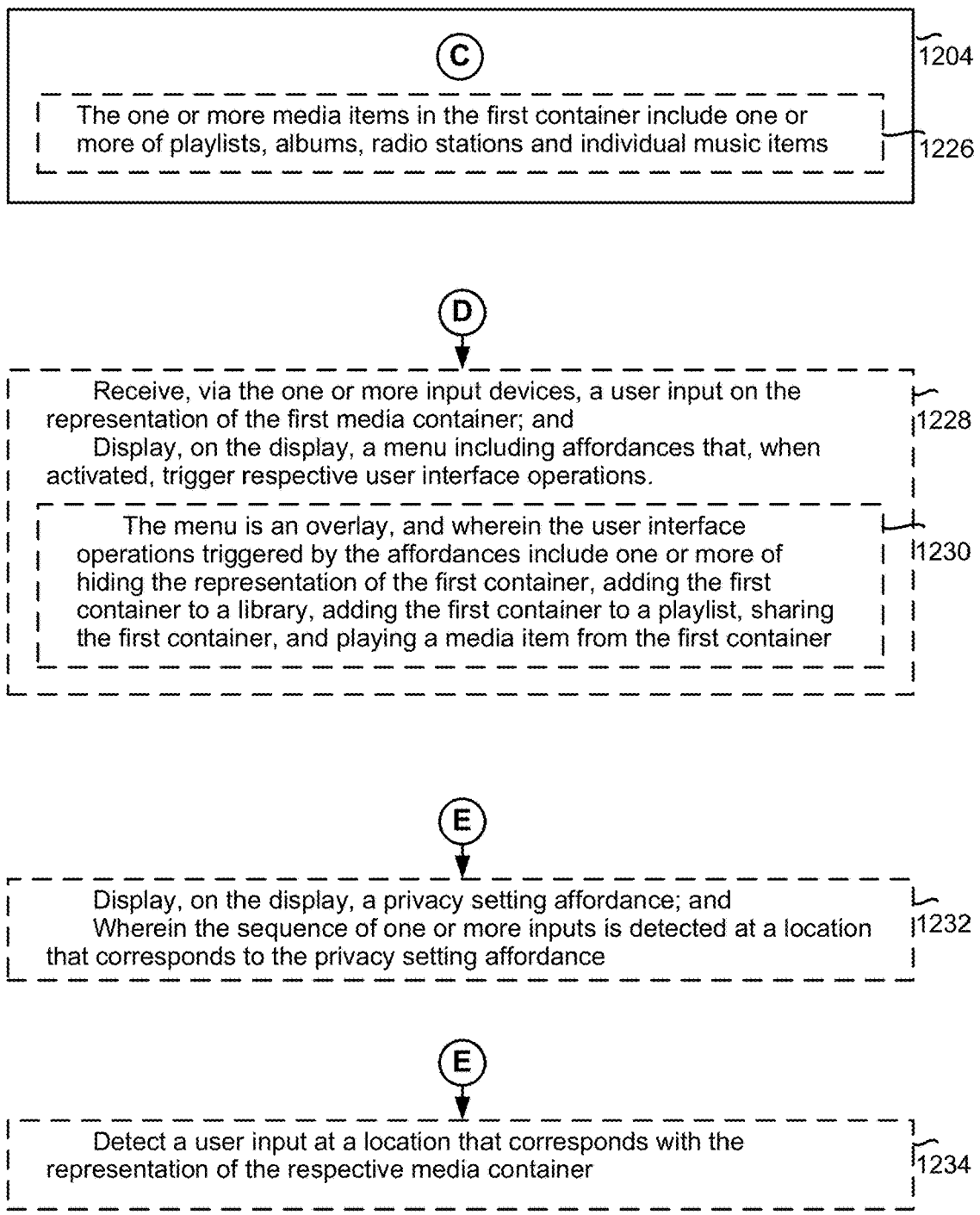

Referring to FIG. 12C, in some embodiments, the one or more media items in the first container include (1226) one or more of playlists, albums, radio stations (e.g., preexisting or curated) and individual music items.

In some embodiments, the device receives (1228), via the one or more input devices, a user input (e.g., a hard/long press) on the representation of the first media container and displays (1228), on the display, a menu including affordances that, when activated, trigger respective user interface operations. As an example, in FIGS. 8M-8N, the device 100 displays the menu 822 in response to receiving the user input

836. In some embodiments, the menu is an overlay, and the user interface operations triggered by the affordances include (1230) one or more of hiding the representation of the first container, adding the first container to a library, adding the first container to a playlist, sharing the first container, and playing a media item from the first container. As an example, in FIG. 8J, the menu 822 includes various affordances 824 that allow the user to perform various operations.

In some embodiments, the device displays (1232), on the display, a privacy setting affordance (e.g., a toggle switch). The sequence of one or more inputs is detected (1232) by the device at a location that corresponds to the privacy setting affordance. In some implementations, the user toggles the switch to hide engagement with the container corresponding with the switch. As an example, in FIG. 8U, the device 100 displays privacy setting affordances 860*a* and 860*b* for representations 812*a* and 812*b*, respectively. The privacy setting affordances allow the first user to selectively hide/unhide engagement of the first user with particular media containers thereby improving the controllability of the device 100 and providing a higher level of privacy to the first user. Displaying the privacy setting affordances enhances the operability of the device and makes the user-device interface more efficient (e.g., by reducing the need for a sequence of user inputs corresponding to a request to hide engagement of the first user with a media container) which, additionally, reduces power usage and improves battery life of the device by enabling the user to use the device more quickly and efficiently.

In some embodiments, the device detects (1234) a user input at a location that corresponds with the representation of the respective media container. In some implementations, the user taps the representation of the container to hide the container.

Figure 12D:
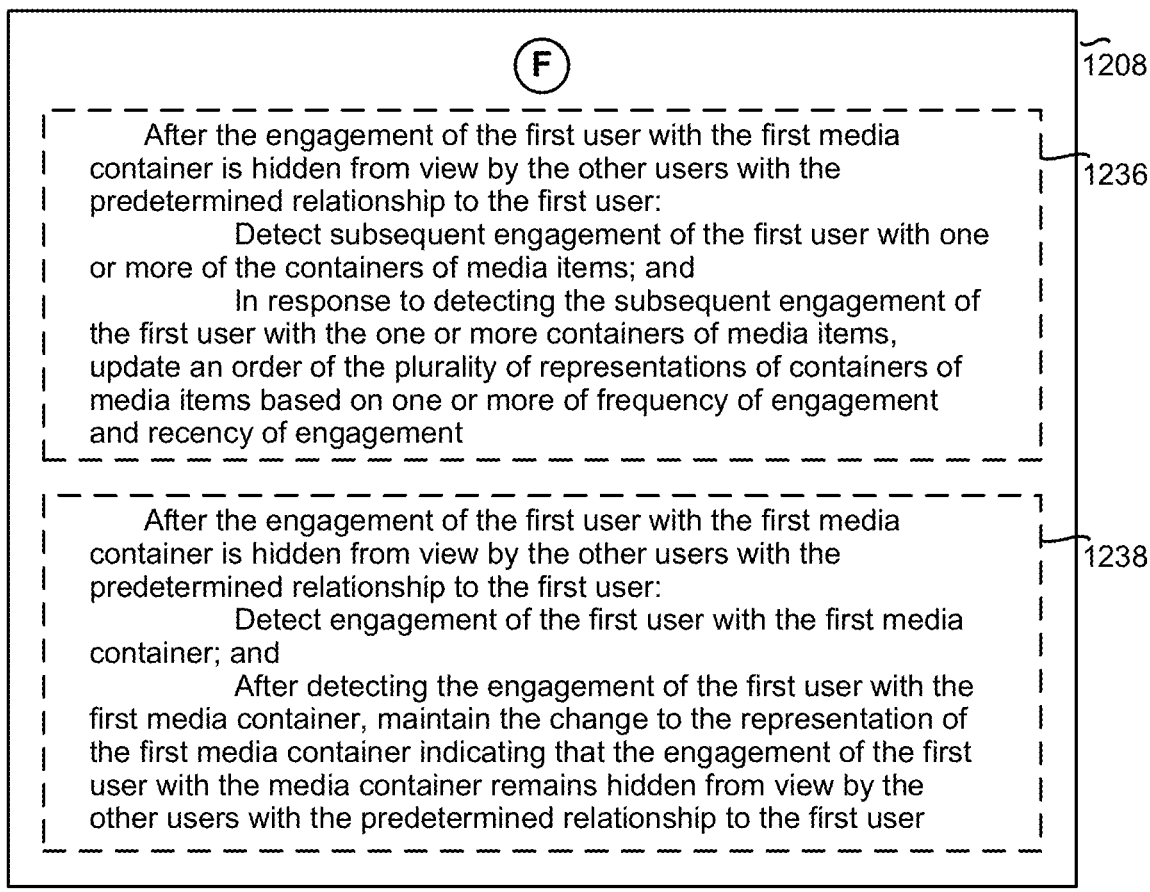

Referring to FIG. 12D, in some embodiments, after the engagement of the first user with the first media container is hidden from view by the other users with the predetermined relationship to the first user, the device detects (1236) subsequent engagement of the first user with one or more of the containers of media items. In response to detecting the subsequent engagement of the first user with the one or more containers of media items, the device updates (1236) an order of the plurality of representations of containers of media items based on one or more of frequency of engagement and recency of engagement (e.g., media container is still available in the user's profile, just hidden from other users). In some embodiments, after the engagement of the first user with the first media container is hidden from view by the other users with the predetermined relationship to the first user, the device detects (1238) engagement of the first user with the first media container and after detecting the engagement of the first user with the first media container, the device maintains (1238) the change to the representation of the first media container indicating that the engagement of the first user with the media container remains hidden from view by the other users with the predetermined relationship to the first user. As an example, in FIGS. 8K-8L, the device 100 updates the position of the representation 812*b* after playing 'Album FED' in response to the user input 834. Updating the position of the representation for the media container after the user engages with the media container makes it easier for the user to engage with the media container on a subsequent attempt thereby providing a better user experience. Updating the position of representations of hidden media containers enhances the operability of the device and makes the user-device interface more efficient (e.g., by reducing the need for a user input that corresponds to scrolling through the representations in order to view representations of hidden media containers) which, additionally, reduces power usage and improves battery life of the device by enabling the user to use the device more quickly and efficiently.

Referring to FIG. 12E, in some embodiments, after the engagement of the first user with the first media container is hidden from view by the other users with the predetermined relationship to the first user, the device foregoes (1240) display of the representation of the first media container on a public version of a profile page for the first user. The public version of the profile page is visible to the other users that have the predetermined relationship with the first user. As an example, in FIG. 8G, the public version 804 of the user profile for the first user forgoes display of the representation 812*b* after the first user hides engagement of the first user with 'Album FED'. In some embodiments, the device maintains (1240) display of the changed representation of the first media container on a private version of the profile page for the first user. The private version of the profile page is only visible to the first user. As an example, in FIG. 8H, the private version 804*a* of the user profile for the first user maintains display of the representation 812*b* after the first user hides engagement of the first user with 'Album FED'. Forgoing display of the representation of a hidden media container from the public version of the user profile provides the first user with more privacy thereby enhancing the user experience.

In some embodiments, after the engagement of the first user with the first media container is hidden from view by the other users with the predetermined relationship to the first user, the device receives (1242), via the one or more input devices, a request to unhide the engagement of the first user with the first media container (e.g., receiving a tap on the representation and/or receiving long/hard press and then tap on 'unhide' affordance in a menu). In response to receiving the request to unhide the engagement, the device reverts (1242) the change in the appearance of the representation of the first media container. The change to the appearance of the representation of the first media container indicates that the engagement of the first user with the first media container is no longer hidden from view by the other users with the predetermined relationship to the first user. As an example, in FIG. 8O, the device 100 receives the user input 838 to unhide the engagement of the first user with 'Album FED'. In response to receiving the user input 838, in FIG. 8P, the device 100 changes the appearance of the representation 812*b* to indicate that engagement of the first user with 'Album FED' is no longer hidden from other users. Changing the appearance of a representation of a media container to indicate that engagement of the first user with the media container is not hidden enhances the operability of the device and makes the user-device interface more efficient (e.g., by reducing the need for a sequence of user inputs that correspond to a request to determine whether or not the engagement of the first user with the media container is hidden) which, additionally, reduces power usage and improves battery life of the device by enabling the user to use the device more quickly and efficiently.

It should be understood that the particular order in which the operations in FIGS. 12A-12E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1100) are also applicable in an analogous manner to method 1200 described above with respect to FIGS. 12A-11E. For example, the user interfaces, user interface elements, media containers, playlists, profiles, notifications, music preferences, and predetermined relationships, etc., described above with reference to method 1200 optionally have one or more of the characteristics of the user interfaces, user interface elements, media containers, playlists, profiles, notifications, music preferences, and predetermined relationships, etc. described herein with reference to other methods described herein (e.g., methods 900, 1000, and 1100). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 12A-12E are, optionally, implemented by components depicted in FIGS. 1A-1B, or FIG. 3. For example, the detect operation 1208 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a device including a display and one or more input devices:
displaying, on the display, a media engagement user interface that includes a plurality of representations of containers of media items for which a first user has met engagement criteria, wherein engagement of the first user with the plurality of containers of media items are visible to other users that have a predetermined relationship to the first user, wherein displaying the media engagement user interface includes concurrently displaying, on the display:
a representation of a first media container; and
a representation of a second media container;
while displaying the media engagement user interface, displaying, on the display, an engagement indicator relative to the first media container indicating that the first user is currently listening to the first media container;
detecting, via the one or more input devices, a sequence of one or more inputs that corresponds to a request to hide the engagement indicator indicating that the first user is currently listening to the first media container, wherein the request to hide the engagement indicator selects a hide affordance displayed within the media engagement user interface, and wherein the hide affordance is associated with the first media container currently being listened to by the first user; and
in response to detecting, via the one or more input devices, the sequence of one or more inputs that corresponds to the request that selects the hide affordance to hide the engagement indicator indicating that the first user with is currently listening to the first media container, changing an appearance of the representation of the first media container without changing the appearance of the representation of the second media container, wherein the change to the representation of the first media container includes not displaying the engagement indicator relative to the first media container to other users with the predetermined relationship to the first user.

2. The method of claim 1, wherein the plurality of representations of containers of media items are displayed in a user profile section of the media engagement user interface.

3. The method of claim 1, wherein the plurality of representations of containers of media items are displayed in a recommendation module of the media engagement user interface.

4. The method of claim 1, wherein the plurality of representations of containers of media items are ordered based on one or more of frequency of engagement and recency of engagement.

5. The method of claim 1, further comprising:
after not displaying the engagement indicator relative to the first media container to other users with the predetermined relationship to the first user:
detecting subsequent engagement of the first user with one or more of the containers of media items; and
in response to detecting the subsequent engagement of the first user with the one or more containers of media items, updating an order of the plurality of representations of containers of media items based on one or more of frequency of engagement and recency of engagement.

6. The method of claim 1, further comprising:
after not displaying the engagement indicator relative to the first media container to other users with the predetermined relationship to the first user:
detecting engagement of the first user with the first media container; and
after detecting the engagement of the first user with the first media container, maintaining the change to the representation of the first media container indicating that the engagement of the first user with the media container remains hidden from view by the other users with the predetermined relationship to the first user.

7. The method of claim 1, wherein the one or more media items in the first media container include one or more of playlists, albums, radio stations and individual music items.

8. The method of claim 1, wherein the plurality of representations of containers of media items are displayed in a module of a profile page for the first user, wherein the module indicates media items that the first user is listening to.

9. The method of claim 8, further comprising:
presenting at least one of the plurality of containers of media items as a media recommendation to at least one of the other users with whom the first user has the predetermined relationship.

10. The method of claim 9, further comprising:
after not displaying the engagement indicator relative to the first media container to other users with the predetermined relationship to the first user:
forgoing presenting the first media container as the media recommendation to the at least one of the other users with whom the first user has the predetermined relationship.

11. The method of claim 1, wherein the one or more media items in the first media container includes a plurality of media items, and wherein the engagement of the first user with each of the plurality of media items is hidden from view by the other users with the predetermined relationship to the first user.

12. The method of claim 1, further comprising:
receiving, via the one or more input devices, a user input on the representation of the first media container; and
displaying, on the display, a menu including affordances that, when activated, trigger respective user interface operations.

13. The method of claim 12, wherein the menu is an overlay, and wherein the user interface operations triggered by the affordances include one or more of hiding the representation of the first media container, adding the first media container to a library, adding the first media container to a playlist, sharing the first media container, and playing a media item from the first media container.

14. The method of claim 1, further comprising:
displaying, on the display, a privacy setting affordance; and
wherein the sequence of one or more inputs is detected at a location that corresponds to the privacy setting affordance.

15. The method of claim 1, further comprising:
after not displaying the engagement indicator relative to the first media container to other users with the predetermined relationship to the first user:
forgoing display of the representation of the first media container on a public version of a profile page for the first user, wherein the public version of the profile page is visible to the other users that have the predetermined relationship with the first user; and
maintaining display of the changed representation of the first media container on a private version of the profile page for the first user, wherein the private version of the profile page is only visible to the first user.

16. The method of claim 1, further comprising:
after not displaying the engagement indicator relative to the first media container to other users with the predetermined relationship to the first user:

receiving, via the one or more input devices, a request to unhide the engagement of the first user with the first media container; and
in response to receiving the request to unhide the engagement, reverting the change in the appearance of the representation of the first media container wherein the change to the appearance of the representation of the first media container indicates that the engagement of the first user with the first media container is no longer hidden from view by the other users with the predetermined relationship to the first user.

17. The method of claim 1, wherein the sequence of the one or more inputs includes a first input and a second input, wherein the first input requests display of the hide affordance within the media engagement user interface, and wherein the second input is directed to a location that corresponds to the hide affordance.

18. The method of claim 17, wherein the first input is directed to a location that corresponds to the representation of the first media container.

19. An electronic device, comprising:
a display;
an input device;
one or more processors;
non-transitory memory; and
one or more programs, wherein the one or more programs are stored in the memory and configured to be executed by the one or more processors, the one or more programs including instructions for:
displaying, on the display, a media engagement user interface that includes a plurality of representations of containers of media items for which a first user has met engagement criteria, wherein engagement of the first user with the plurality of containers of media items are visible to other users that have a predetermined relationship to the first user, wherein displaying the media engagement user interface includes concurrently displaying, on the display:
a representation of a first media container; and
a representation of a second media container;
while displaying the media engagement user interface, displaying, on the display, an engagement indicator relative to the first media container indicating that the first user is currently listening to the first media container;
detecting, via the input device, a sequence of one or more inputs that corresponds to a request to hide the engagement indicator indicating that the first user is currently listening to the first media container, wherein the request to hide the engagement indicator selects a hide affordance displayed within the media engagement user interface, and wherein the hide affordance is associated with the first media container currently being listened to by the first user; and
in response to detecting, via the input device, the sequence of one or more inputs that corresponds to the request that selects the hide affordance to hide the engagement indicator indicating that the first user with is currently listening to the first media container, changing an appearance of the representation of the first media container without changing the appearance of the representation of the second media container, wherein the change to the representation of the first media container includes not displaying the engagement indicator relative to the first media container to other users with the predetermined relationship to the first user.

20. The electronic device of claim 19, wherein the one or more programs further include instructions for:
after not displaying the engagement indicator relative to the first media container to other users with the predetermined relationship to the first user:
detecting engagement of the first user with the first media container; and
after detecting the engagement of the first user with the first media container, maintaining the change to the representation of the first media container indicating that the engagement of the first user with the media container remains hidden from view by the other users with the predetermined relationship to the first user.

21. The electronic device of claim 19, wherein the one or more programs further include instructions for:
after not displaying the engagement indicator relative to the first media container to other users with the predetermined relationship to the first user:
receiving, via the input device, a request to unhide the engagement of the first user with the first media container; and
in response to receiving the request to unhide the engagement, reverting the change in the appearance of the representation of the first media container wherein the change to the appearance of the representation of the first media container indicates that the engagement of the first user with the first media container is no longer hidden from view by the other users with the predetermined relationship to the first user.

22. A non-transitory computer readable storage medium storing one or more programs, the one or more programs comprising instructions, which, when executed by an electronic device with a display, and an input device, cause the electronic device to:
display, on the display, a media engagement user interface that includes a plurality of representations of containers of media items for which a first user has met engagement criteria, wherein engagement of the first user with the plurality of containers of media items are visible to other users that have a predetermined relationship to the first user, wherein displaying the media engagement user interface includes concurrently displaying, on the display:
a representation of a first media container; and
a representation of a second media container;
while displaying the media engagement user interface, display, on the display, an engagement indicator relative to the first media container indicating that the first user is currently listening to the first media container;
detect, via the input device, a sequence of one or more inputs that corresponds to a request to hide the engagement indicator indicating that the first user is currently listening to the first media container, wherein the request to hide the engagement indicator selects a hide affordance displayed within the media engagement user interface, and wherein the hide affordance is associated with the first media container currently being listened to by the first user; and
in response to detecting, via the input device, the sequence of one or more inputs that corresponds to the request that selects the hide affordance to hide the engagement indicator indicating that the first user with is currently listening to the first media container, change an appearance of the representation of the first media container without changing the appearance of the representation of the second media container, wherein the change to the representation of the first media container includes not displaying the engagement indicator relative to the first media container to other users with the predetermined relationship to the first user.

23. The non-transitory computer readable storage medium of claim 22, wherein the one or more programs further cause the device to:
after not displaying the engagement indicator relative to the first media container to other users with the predetermined relationship to the first user:
detect engagement of the first user with the first media container; and
after detecting the engagement of the first user with the first media container, maintain the change to the representation of the first media container indicating that the engagement of the first user with the media container remains hidden from view by the other users with the predetermined relationship to the first user.

24. The non-transitory computer readable storage medium of claim 22, wherein the one or more programs further cause the device to:
after not displaying the engagement indicator relative to the first media container to other users with the predetermined relationship to the first user:
receive, via the input device, a request to unhide the engagement of the first user with the first media container; and
in response to receiving the request to unhide the engagement, revert the change in the appearance of the representation of the first media container wherein the change to the appearance of the representation of the first media container indicates that the engagement of the first user with the first media container is no longer hidden from view by the other users with the predetermined relationship to the first user.

25. The non-transitory computer readable storage medium of claim 22, wherein the one or more media items in the first media container include one or more of playlists, albums, radio stations and individual music items.

* * * * *